(12) United States Patent
Gramm et al.

(10) Patent No.: US 11,910,744 B2
(45) Date of Patent: Feb. 27, 2024

(54) DIFFERENTIAL SPEED STALK ROLLS

(71) Applicant: Kingdom Ag Concepts, Inc., Bremen, IN (US)

(72) Inventors: Richard Gramm, Bremen, IN (US); Corbin Fehr, Morris, MN (US); Austin Bitting, Etna Green, IN (US); Robert Schlipf, Nappanee, IN (US)

(73) Assignee: Kingdom Ag Concepts, Inc., Bremen, IN (US)

( * ) Notice: Subject to any disclaimer, the term of this patent is extended or adjusted under 35 U.S.C. 154(b) by 1036 days.

(21) Appl. No.: 16/964,971

(22) PCT Filed: Feb. 15, 2018

(86) PCT No.: PCT/US2018/018456
§ 371 (c)(1),
(2) Date: Jul. 24, 2020

(87) PCT Pub. No.: WO2019/147291
PCT Pub. Date: Aug. 1, 2019

(65) Prior Publication Data
US 2021/0378174 A1  Dec. 9, 2021

Related U.S. Application Data

(63) Continuation-in-part of application No. 16/279,982, filed on Feb. 19, 2019, now Pat. No. 10,874,052, which is a continuation of application No. PCT/US2017/047863, filed on Aug. 21, 2017.

(60) Provisional application No. 62/621,890, filed on Jan. 25, 2018, provisional application No. 62/621,572, filed on Jan. 24, 2018, provisional application No.
(Continued)

(51) Int. Cl.
| A01D 34/44 | (2006.01) |
| A01D 41/14 | (2006.01) |
| A01D 45/02 | (2006.01) |

(52) U.S. Cl.
CPC ............. *A01D 34/44* (2013.01); *A01D 41/14* (2013.01); *A01D 45/02* (2013.01); *A01D 45/021* (2013.01)

(58) Field of Classification Search
CPC ...... A01D 34/44; A01D 45/025; A01D 41/14; A01D 45/12; A01D 45/021
See application file for complete search history.

(56) References Cited

U.S. PATENT DOCUMENTS 2,103,002 A * 12/1937 Faber ................... A01D 45/025
460/33
3,858,384 A * 1/1975 Maiste ................ A01D 45/025
56/104
(Continued)

FOREIGN PATENT DOCUMENTS

| CA | 2808796 A1 * | 2/2012 | ........... A01D 45/021 |
| CN | 105265095 A * | 1/2016 | ............. A01D 45/02 |

(Continued)

*Primary Examiner* — Arpad F Kovacs
(74) *Attorney, Agent, or Firm* — Thomas J. Oppold; Larkin Hoffman; Daly & Lindgren, Ltd.

(57) ABSTRACT

Differential speed stalk rolls mountable to a row unit of a row crop head. A first stalk roll body has an outer peripheral speed less than the outer peripheral speed of a second stalk roll body in lateral spaced relation. The stalk roll bodies may have modular and interchangeable body segments of different configurations.

24 Claims, 51 Drawing Sheets

Related U.S. Application Data

62/447,418, filed on Jan. 17, 2017, provisional application No. 62/377,259, filed on Aug. 19, 2016.

(56) References Cited

U.S. PATENT DOCUMENTS

| | | | | |
|---|---|---|---|---|
| 4,233,804 A | * | 11/1980 | Fischer | A01D 45/025 56/104 |
| 4,974,402 A | * | 12/1990 | Ostrup | A01D 45/025 56/95 |
| 5,009,061 A | * | 4/1991 | Heuling | A01D 45/025 56/104 |
| 5,040,361 A | * | 8/1991 | Briesemeister | A01D 45/025 56/104 |
| 5,212,935 A | * | 5/1993 | Sanders | A01D 45/021 56/106 |
| 5,404,699 A | * | 4/1995 | Christensen | A01D 45/025 460/33 |
| 5,787,696 A | * | 8/1998 | Wiegert | A01D 45/021 241/260.1 |
| 7,237,373 B2 | * | 7/2007 | Resing | A01D 45/025 56/104 |
| 7,992,371 B2 | * | 8/2011 | Rieck | A01D 45/025 460/28 |
| 2004/0016219 A1 | * | 1/2004 | Calmer | A01D 45/025 56/51 |
| 2012/0042621 A1 | * | 2/2012 | Lohrentz | A01D 45/021 56/109 |
| 2012/0047865 A1 | * | 3/2012 | Lohrentz | A01D 45/025 56/113 |
| 2016/0338268 A1 | * | 11/2016 | Calmer | A01D 45/025 |
| 2017/0311542 A1 | * | 11/2017 | Ehle | A01D 41/14 |

FOREIGN PATENT DOCUMENTS

| | | | | |
|---|---|---|---|---|
| EP | 0369440 B1 | * | 3/1994 | A01D 45/025 |
| EP | 3287001 B1 | * | 10/2020 | A01D 34/44 |
| HU | 189308 B | * | 6/1986 | A01D 43/082 |
| WO | WO-0030427 A1 | * | 6/2000 | A01D 45/025 |
| WO | WO-2014165192 A1 | * | 10/2014 | A01D 45/025 |

* cited by examiner

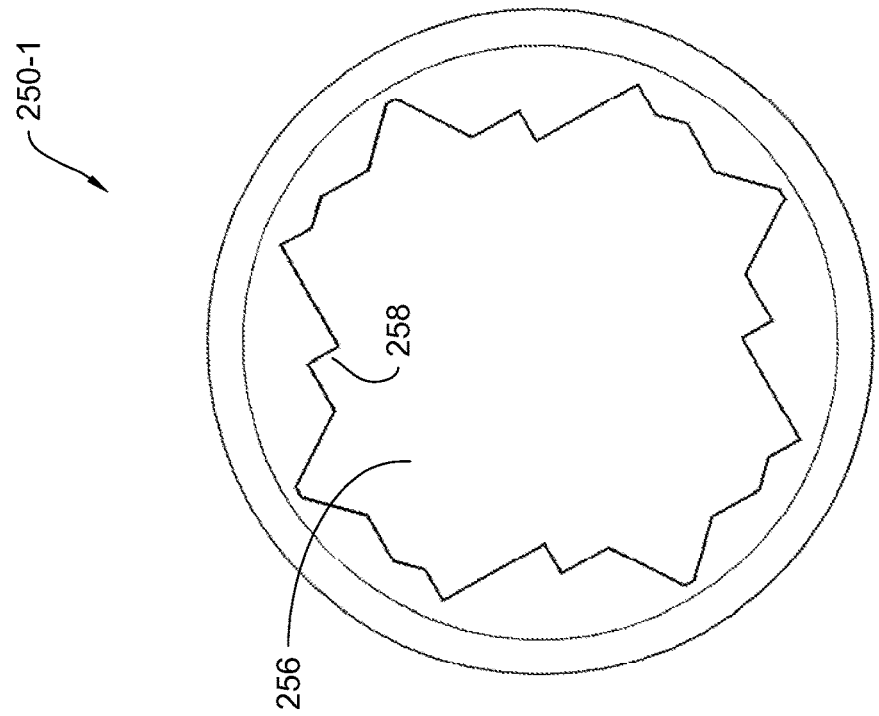
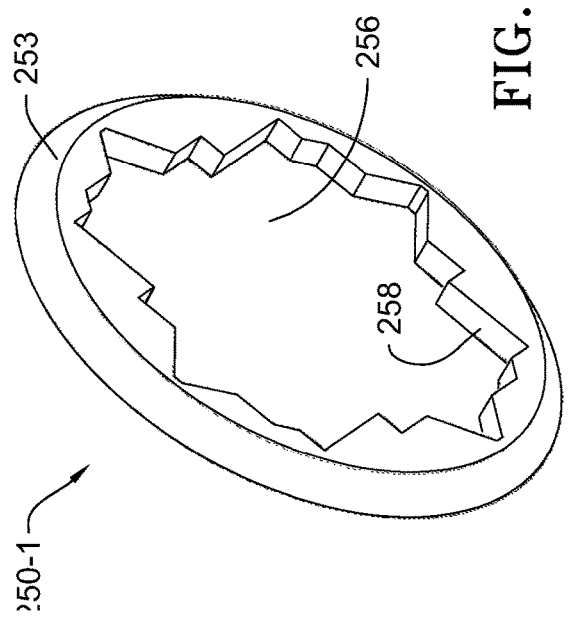
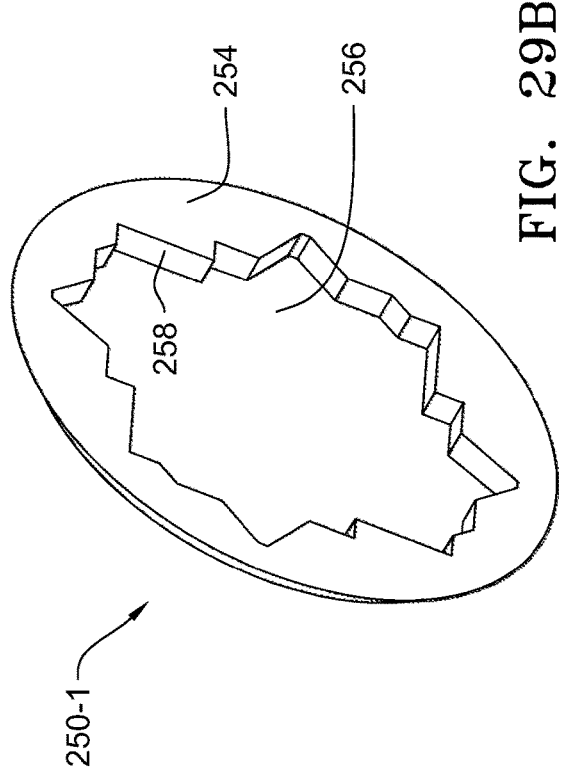

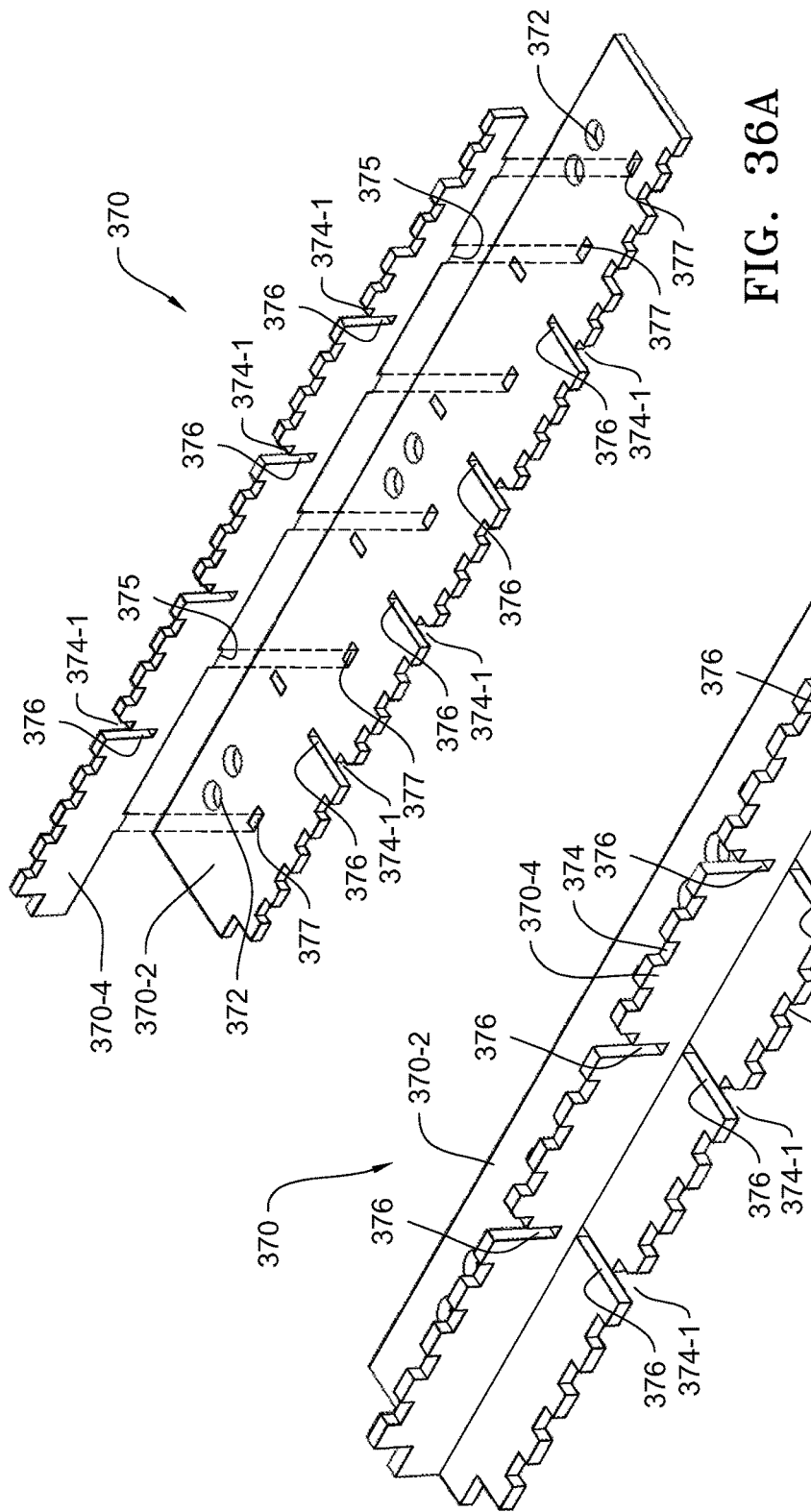
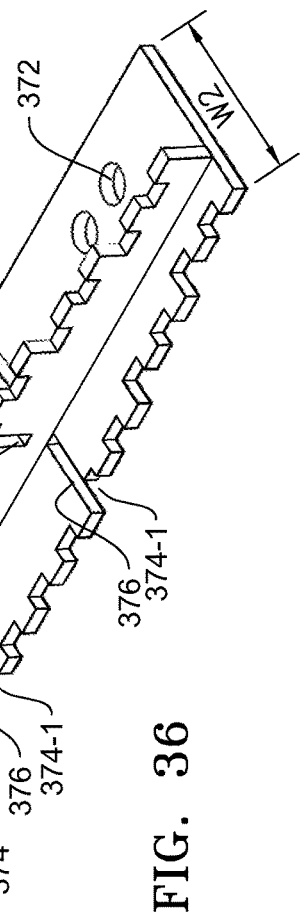

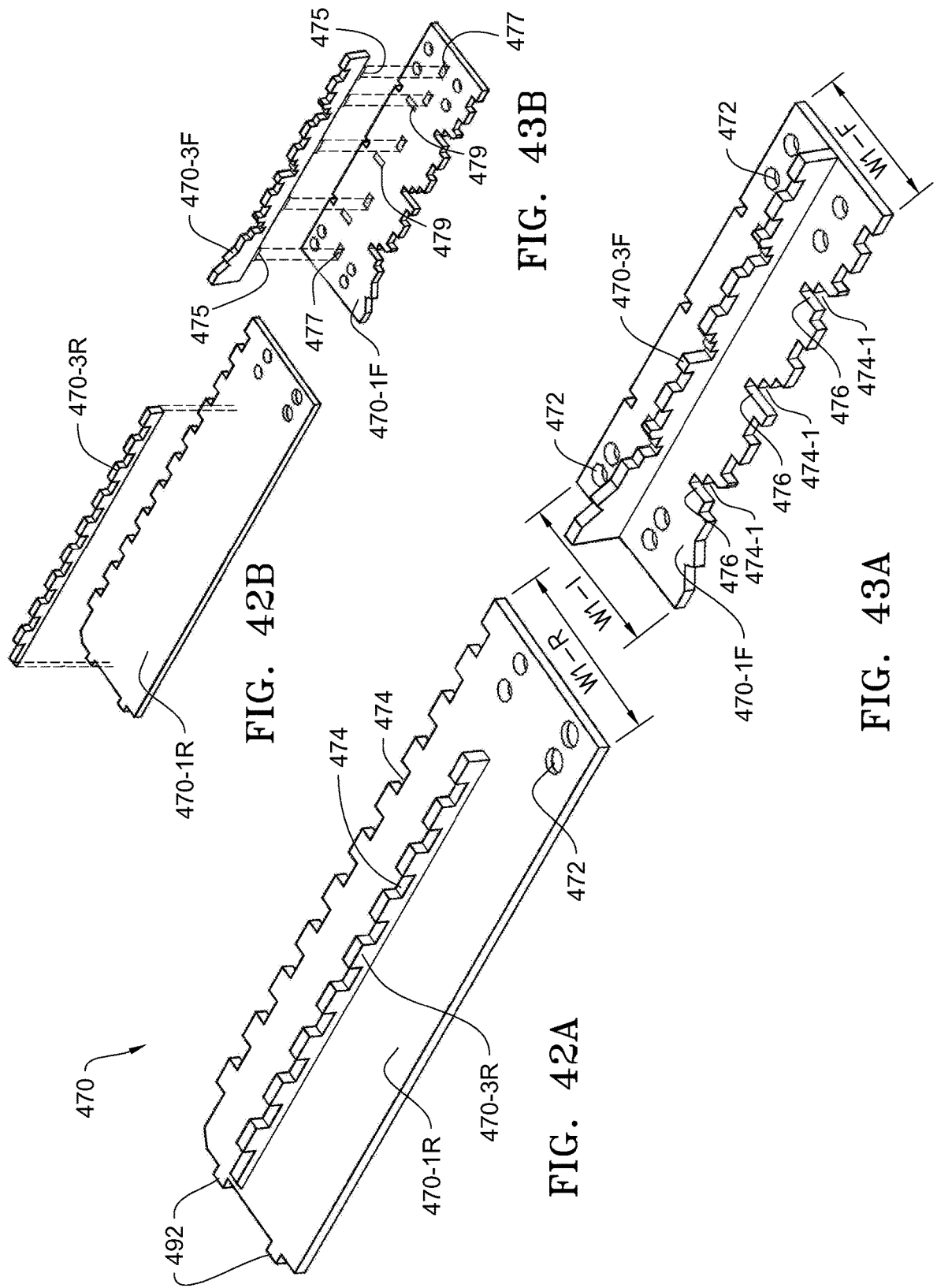

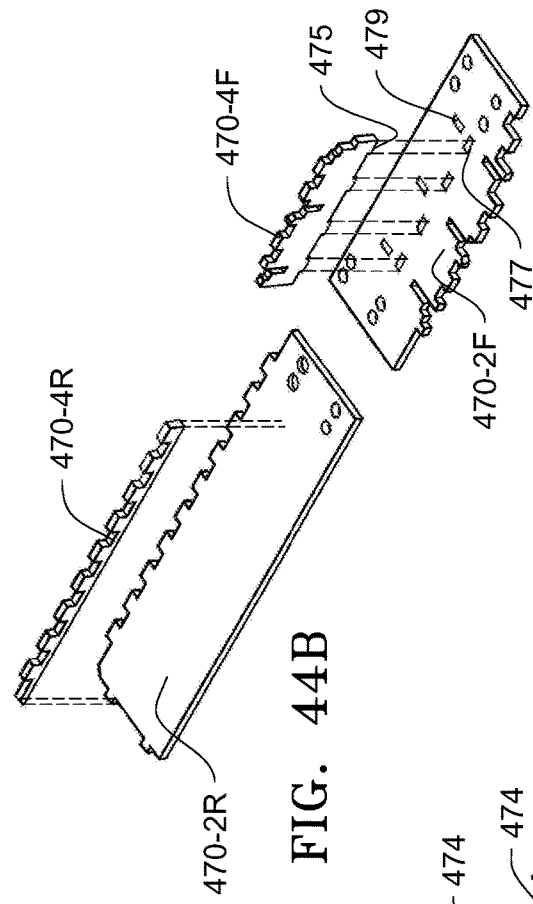
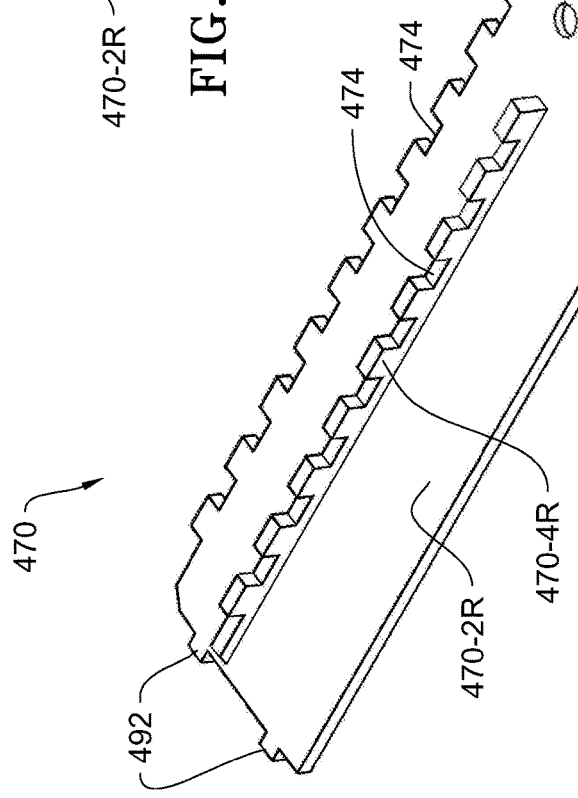
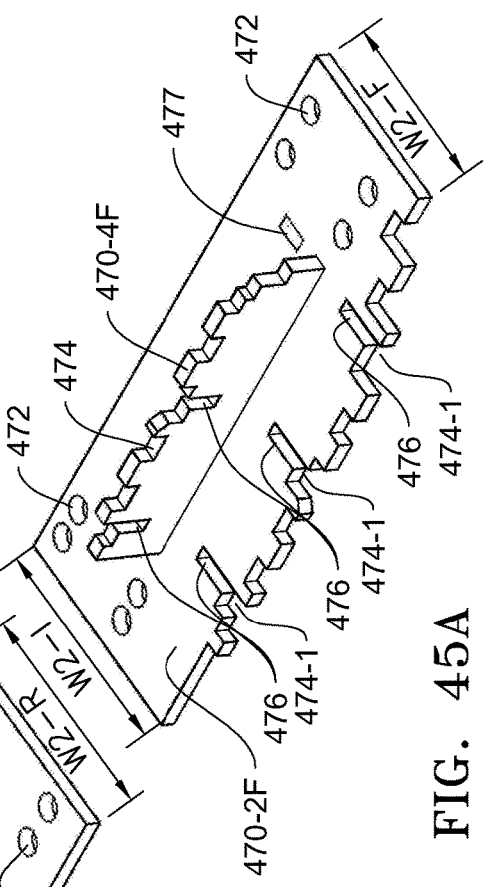
FIG. 44A
FIG. 44B
FIG. 45A
FIG. 45B (Wear areas with sharp flute edges)

(Wear areas with square flute edges)

DIFFERENTIAL SPEED STALK ROLLS

BACKGROUND

Modern conventional agricultural combine harvesters or "combines" utilize removable and interchangeable attachments called "headers" or "heads" which are adapted for harvesting different types of crops. An example of a conventional combine 10 is shown in FIGS. 1-3 having a conventional head 20 attached for harvesting row crops, such as corn. For convenience, and by way of example, when referring to row crop heads for harvesting corn, the row crop head 20 may be referred to as a "corn head". Row crop heads 20 include a plurality of conical shaped crop dividers 22 which extend forwardly and diverge rearwardly. Row unit assemblies 30 are disposed between the adjacent dividers where the rearwardly diverging dividers 22 nearly converge. In FIG. 1, the row crop head or corn head 20 is illustrated with twelve row unit assemblies 30 (e.g., a 12-row corn head) but it should be understood that row crop heads such as corn heads may range from four rows to twenty-four rows or more.

As illustrated in FIG. 3, during corn harvesting operations, the corn head 20 is positioned with the dividers 22 between adjacent corn rows 12 and below the ears of corn 14 on the cornstalks 16. It should be appreciated that as the combine 10 drives forwardly through the field as indicated by the arrow 18 in FIG. 2, the conical, rearwardly diverging shape of the dividers 22 causes the cornstalks 16 within each row 12 to be guided and directed into the row unit assemblies 30 between the adjacent dividers 22. As explained in more detail below, the row unit assemblies 30 separate the corn ears 14 from the cornstalks 16 and convey the separated ears toward the trough 23 and cross-auger 24. The cross-auger 24 augers the separated ears 14 within the trough 23 toward the opening 27 of the feederhouse 26 in the middle of the corn header 20. The feederhouse 26 conveys the ears 14 into the interior of the combine where the corn kernels are separated from the corncob and husks and remaining portions of the cornstalks. Within the combine, the separated kernels pass over a series of screens which separate unwanted crop material and other residue from the kernels. The clean grain is then carried by elevators to a clean grain holding tank while the corncobs, husks and cornstalks which entered the combine are chopped and discharged through the rear of the combine onto the ground.

While there may be differences between the row unit assemblies 30 of different makes and models of corn heads produced by original equipment manufacturers (OEMs), each row unit assembly 30 has similar components and similar operation. Referring to FIGS. 4 and 5, each row unit 30 typically includes a pair of gathering chains 32, 34 with outwardly extending lugs 36. The gathering chains 32, 34 are continuous loops that extend around drive sprockets 38 and idler sprockets 39 (FIG. 5). Rotation of the drive sprockets 38 causes the gathering chains 32, 34 to rotate in adjacent parallel paths such that as the combine 10 drives forwardly through the field, the outwardly extending lugs 36 draw the cornstalks 16 into the row unit 30. Below the rotating gathering chains is a pair of spaced stripper plates 40, 42. The stripper plates 40, 42 are spaced sufficiently apart to define a slot 44 between them defining a longitudinal path of travel along which corn stalks pass as the row unit moves forwardly through the corn field harvesting corn. The slot 44 is sufficiently wide to permit the corn stalks 16 to enter but which is sufficiently narrow so that the corn ears 14 cannot pass through. A pair of rapidly rotating stalk rolls 50, 52 are positioned below stripper plates 40, 42.

As best illustrated in FIG. 6, during harvesting operations, the rotating stalk rolls 50, 52 rapidly pull the corn stalks 16 downwardly through the slot 44 between the stripper plates 40, 42 such that when the corn ears 14 engage the stripper plates 40, 42, the ears 14 are pulled or stripped from the cornstalks 16. As the stalk rolls 50, 52 rotate, the cornstalk 16 is pulled downwardly through the slot 44 and is returned to the field below the header 20 as the combine drives forwardly (FIG. 2). The stripped ears 14 which remain on the stripper plates 40, 42 after the cornstalk 16 is pulled through the slot 44 are then conveyed by the lugs 36 of the gathering chains 32, 34 upwardly and rearwardly to the trough 23 and cross-auger 24. The cross-auger 24 augers the ears 14 within the trough to the feederhouse 26, and the feederhouse 26 feeds the ears 14 into the interior of the combine for shelling and separating the kernels from the corncob as referenced above and as is known in the art.

The art is replete with various configurations of aftermarket and OEM stalk rolls. While the various configurations may serve their intended purpose of harvesting corn, many stalk rolls do not adequately chop and crush the cornstalks, resulting in long sections of cornstalks substantially intact. These long sections of intact cornstalks become very hard and brittle and will not sufficiently breakdown and decompose before the next planting season, thereby limiting their potential benefit to providing soil nutrients for the next year's crop. Tillage operations in the fall and spring before the next season's planting operations may break up the long cornstalks sections into smaller sections, but tillage operations alone are often insufficient to break up the cornstalks into sufficiently small sections to avoid interfering with the next season's planting operations. For example, if the cornstalk sections are too long, they can interfere with planting operations by preventing row cleaners from moving the long cornstalk sections out of the way of the furrow openers of the planter during the next season's planting operations. This can result in excess cornstalk debris remaining in the furrow, which can affect seed planting depth and seed germination.

To overcome the problems associated with long sections of cornstalks remaining in the field, many farmers will go over the field with stalk choppers or flail mowers after harvesting and prior to tilling. However, this requires a separate pass over the field with another implement resulting in additional time and expense of fuel, not to mention the cost of the stalk chopper implement. An additional drawback associated with stalk choppers is that it leaves behind short stalk stubble which can increase tire wear or puncture tires, further increasing costs. Yet another drawback associated with the use of stalk choppers is that the plant material is chopped so fine that it will blow away in the wind or blow into piles which will leave some areas of the soil bare and subject to erosion while other areas of the soil are covered with a thick pile or mat of plant debris which may prevent uniform drying and warming of the soil in the spring, delaying or hindering the planting of the next season's crops or resulting in non-uniform germination of the seed.

To overcome the disadvantages associated with utilizing a separate stalk chopping implement, many corn heads are fitted with stalk choppers below and rearward of the stalk rolls which chop the stalk as the crop is being harvested. While corn heads equipped with stalk choppers overcome some of the disadvantages associated with using separate stalk chopper implements or flail mowers, heads equipped with stalk choppers require increased horsepower and thus more fuel consumption and increased fuel costs. In addition to increased costs, heads equipped with stalk choppers can result in the same disadvantages identified above when the stalks are chopped too finely and producing sharp stalk stubble that can increase tire wear or puncture tires. Additionally, many head mounted stalk choppers produce a buildup of crop debris to one side or the other leaving some areas of the soil bare and while other areas have excess crop debris producing a mat of debris that can trap moisture and suffocate the soil.

Accordingly, there is a need for a stalk roll that will cut or chop the stalks into sufficiently short sections and which crushes or partially shreds the cornstalk so the stalk sections are opened up permitting the stalks to break down and decompose quickly, but that does not chop or shred the stalks so finely as to encourage wind erosion of the formation of detrimental mats of plant material debris. There is also a need for a stalk roll that achieves the advantages of a head mounted stalk chopper by avoiding the need for a separate pass of a stalk chopping implement, but which does not result in short, sharp stubble that can increase tire wear or puncture tires.

Furthermore, the cost of adding a stalk chopper to a corn head can exceed $30,000 for a twelve row corn head. In addition to the initial investment expense, adding a stalk chopper to a corn head increases weight and requires more horsepower to operate than a corn head without stalk choppers, thus burning more fuel and increasing operating costs. Furthermore, adding a stalk chopper increases maintenance costs and the likelihood for downtime because the knives or blades on the stalk choppers must be replaced one or more times per year. Along with all of these added costs, there are all the other problems and disadvantages associated with stalk choppers as identified above. Accordingly, there is a need for a solution to achieve the benefits of cutting or chopping the stalks during a single pass while harvesting, that does not require the large initial investment associated with head mount stalk choppers, and without the added weight and increased fuel consumption associated with head mounted stalk choppers, and without the increase maintenance costs associated with head mount stalk choppers.

BRIEF DESCRIPTION OF THE DRAWINGS

FIGS. 29A-29C are perspective and plan views of the annular knife of the smaller diameter stalk roll of FIG. 24.

FIG. 36 is a perspective view of an embodiment the body segments of the larger diameter stalk roll with intermediate plates attached thereto.

FIG. 36A is an exploded perspective view of the body segment plate of FIG. 36.

FIGS. 42A and 43A are perspective views of an embodiment the body segments of the smaller diameter stalk roll with intermediate plates attached thereto FIGS. 42B and 43B are exploded perspective views of the body segment plates of FIGS. 42A and 43A, respectively.

FIGS. 44A and 45A are perspective views of an embodiment the body segments of the smaller diameter stalk roll with intermediate plates attached thereto FIGS. 44B and 45B are exploded perspective views of the body segment plates of FIGS. 44A and 45A, respectively.

DESCRIPTION

Figure 1:
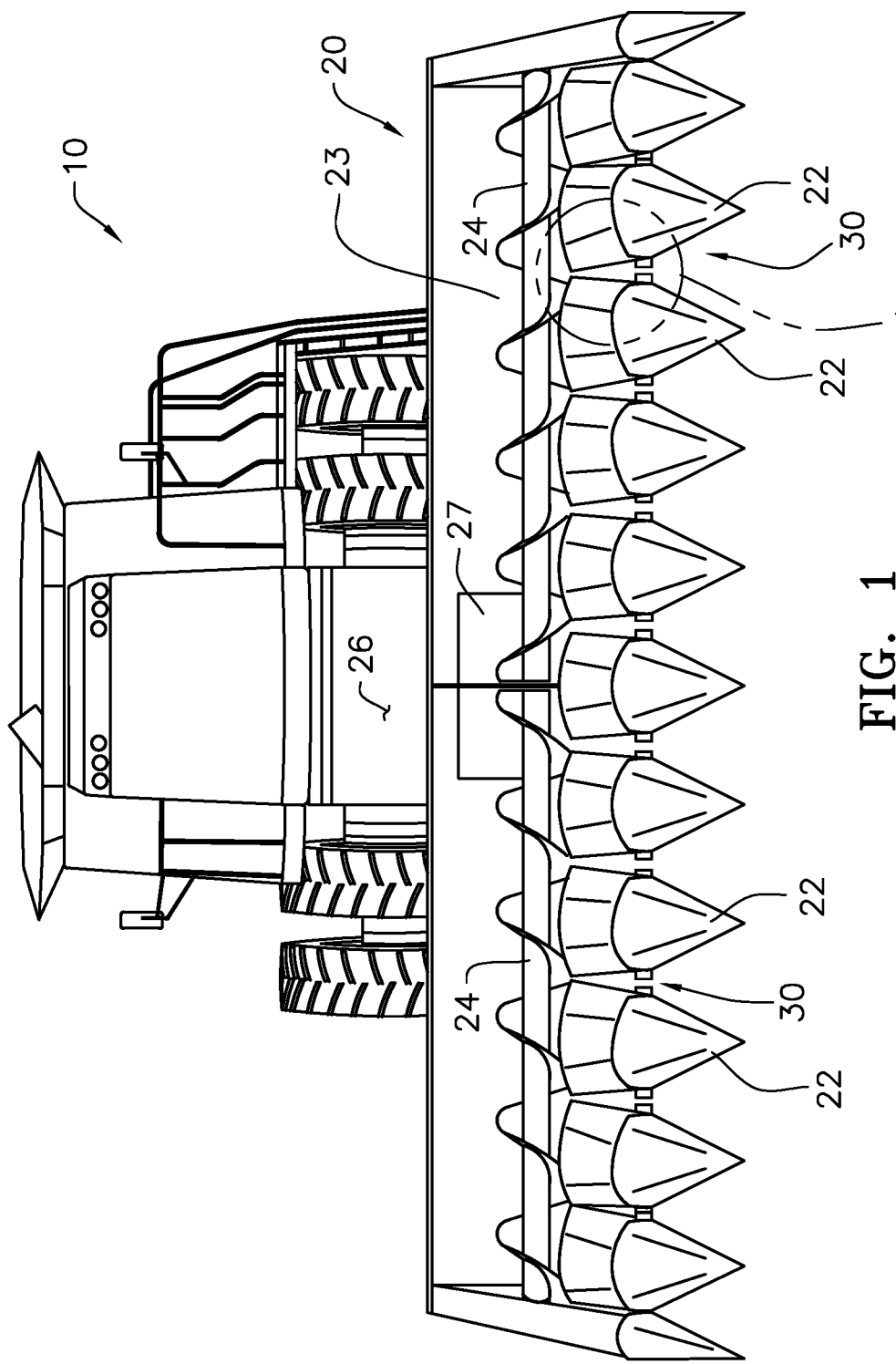
FIG. 1 is a front elevation view of an embodiment of a modern conventional agricultural combine harvester with a corn head attachment.
Figure 2:
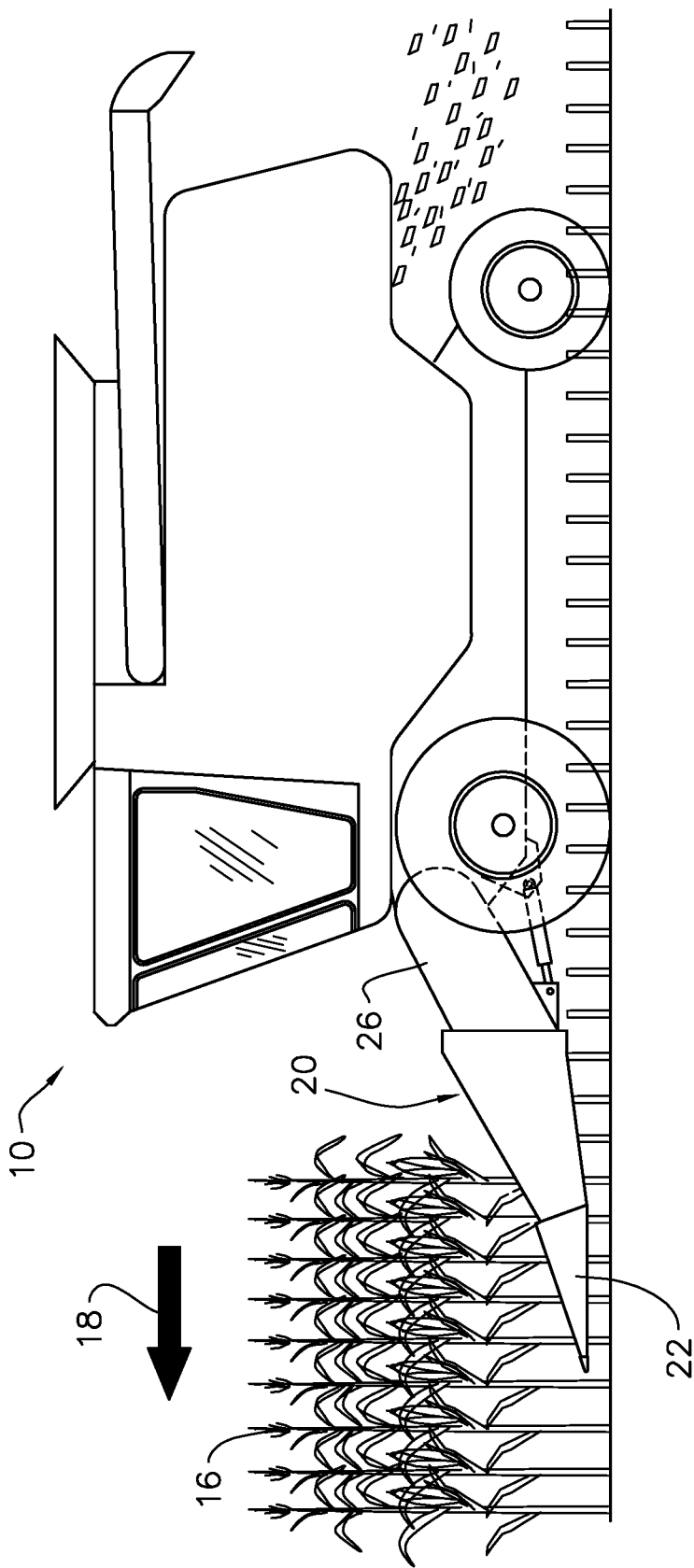
FIG. 2 is a side elevation view of the combine harvester and corn head of FIG. 1.
Figure 3:
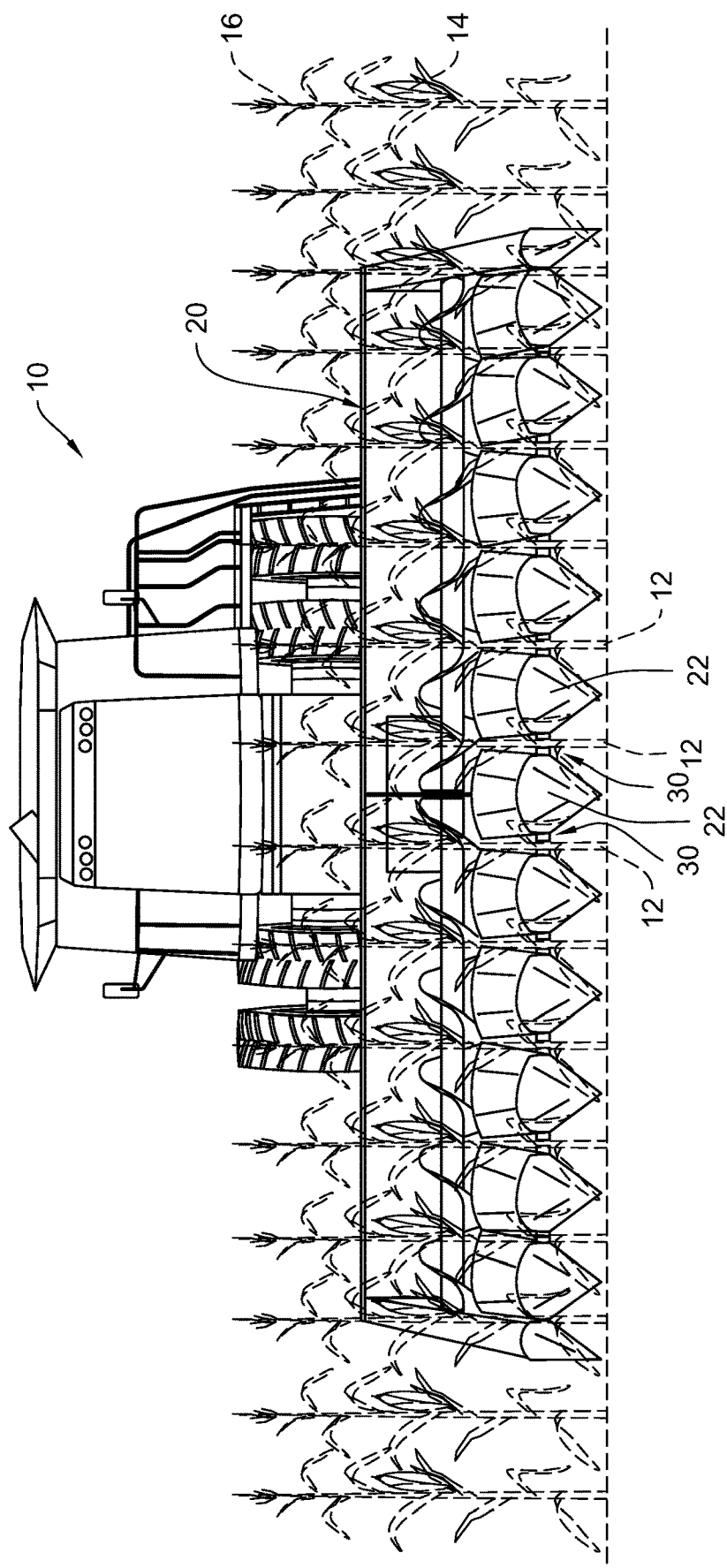
FIG. 3 is the same front elevation view of the combine harvester and corn head of FIG. 1, but shown in a cornfield in harvesting position.
Figure 4:
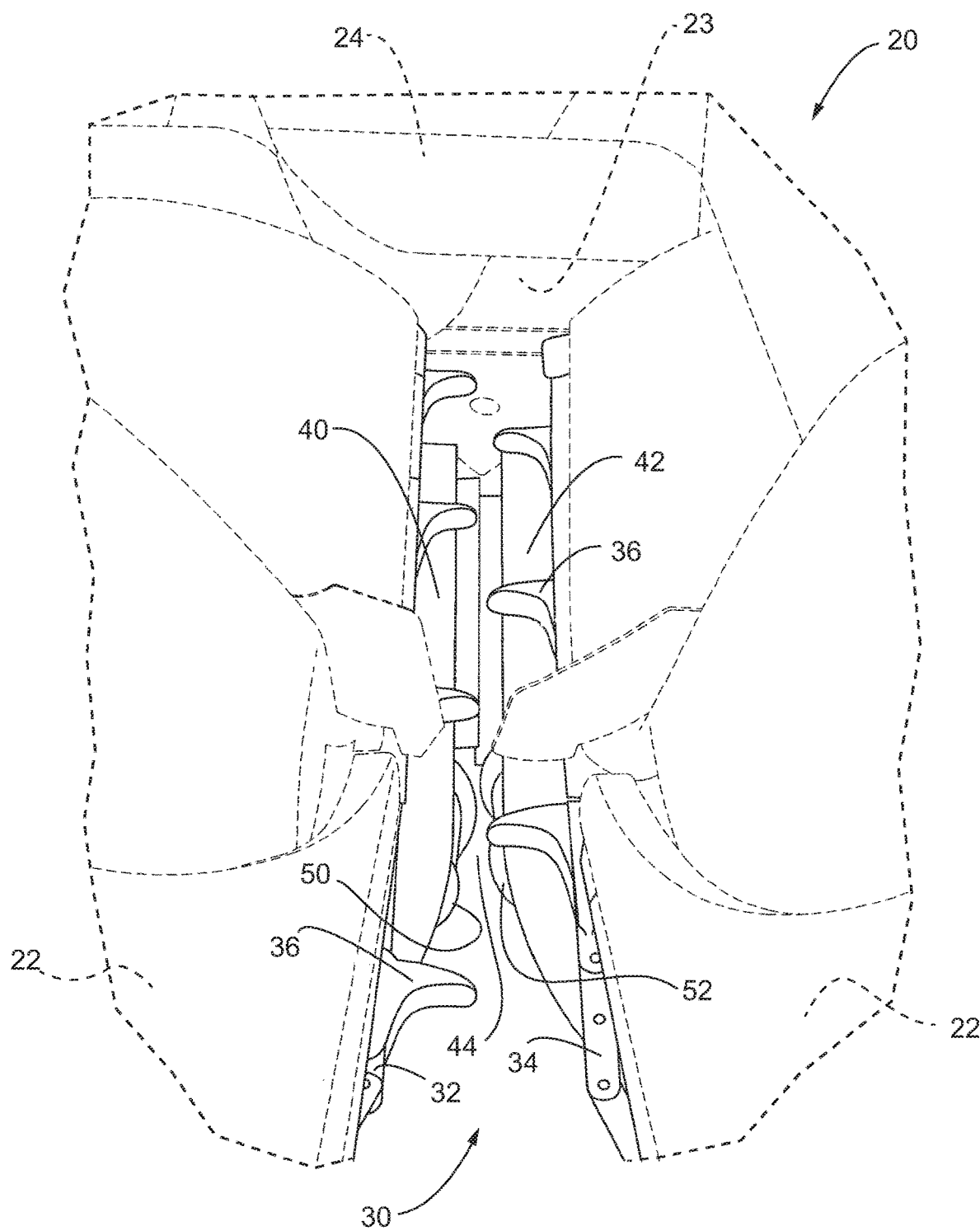
FIG. 4 is an enlarged view of the portion of the row unit assembly circled in FIG. 1 showing parts of the row unit assembly between the crop divider points.
Figure 5:
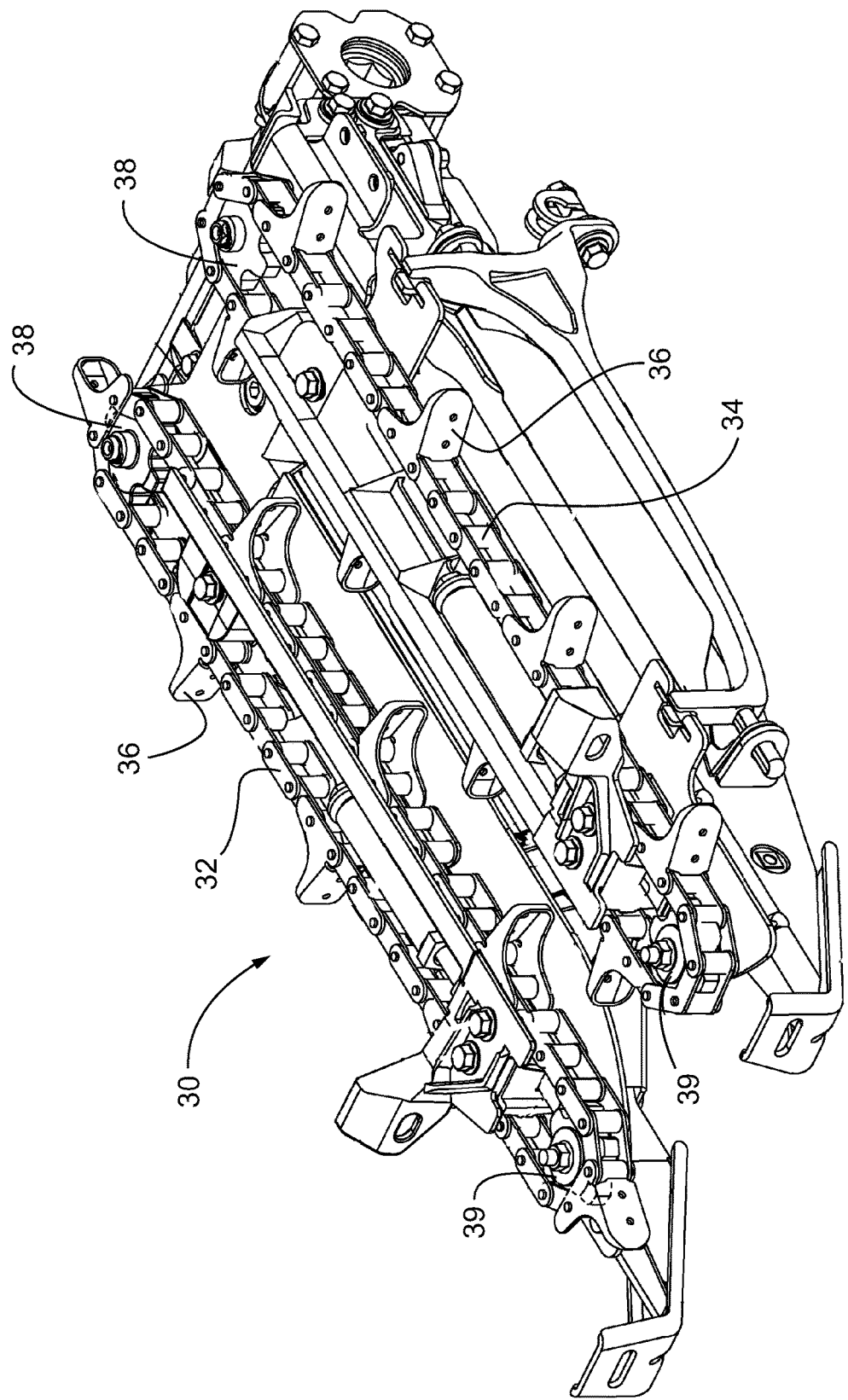
FIG. 5 is a perspective view of a row unit assembly with the crop dividers removed.
Figure 6:
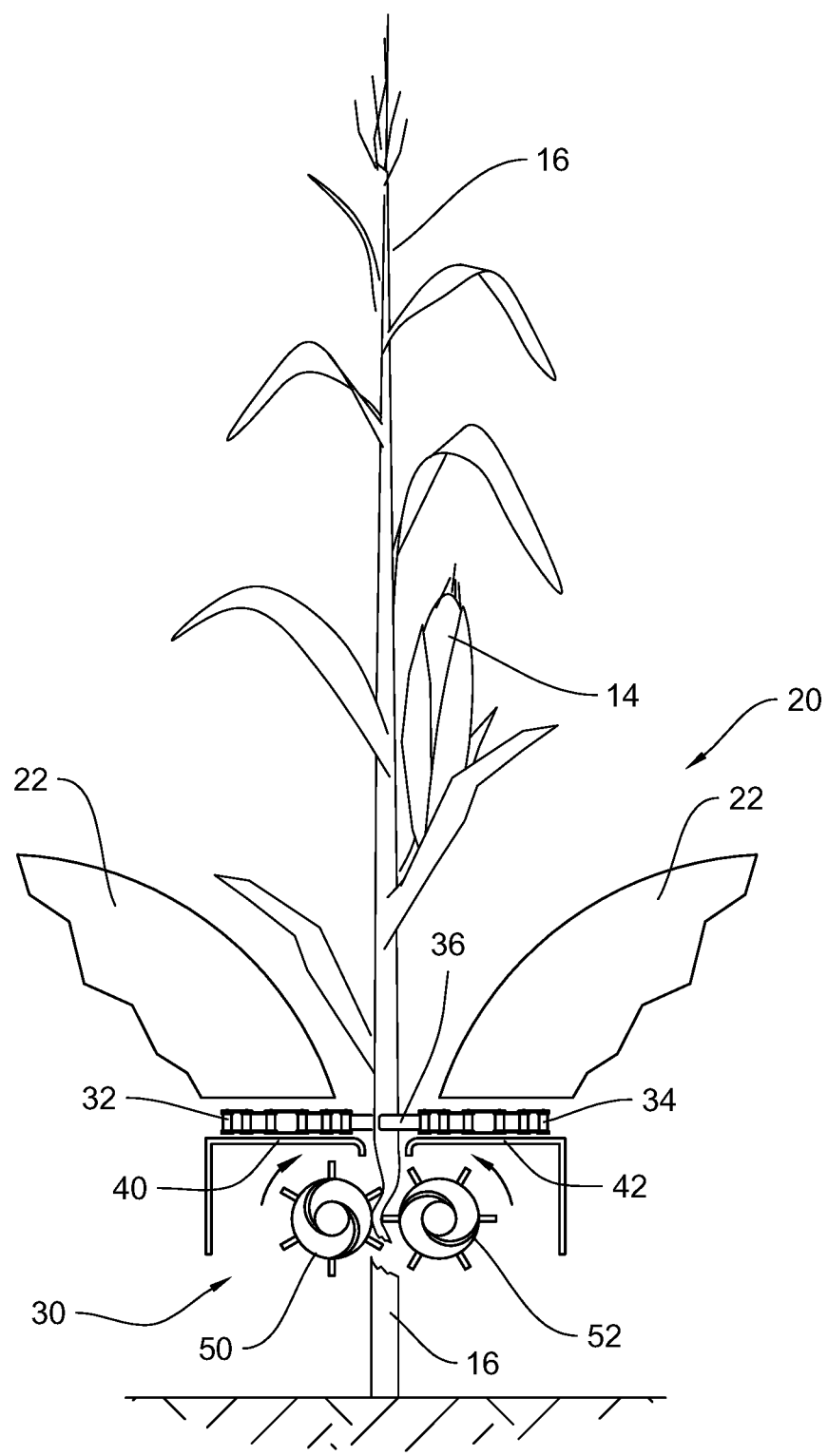
FIG. 6 is a partial front elevation view of the row unit assembly of FIG. 5 depicting the relationship of the row unit relative to a cornstalk during harvesting operations.
Figure 7:
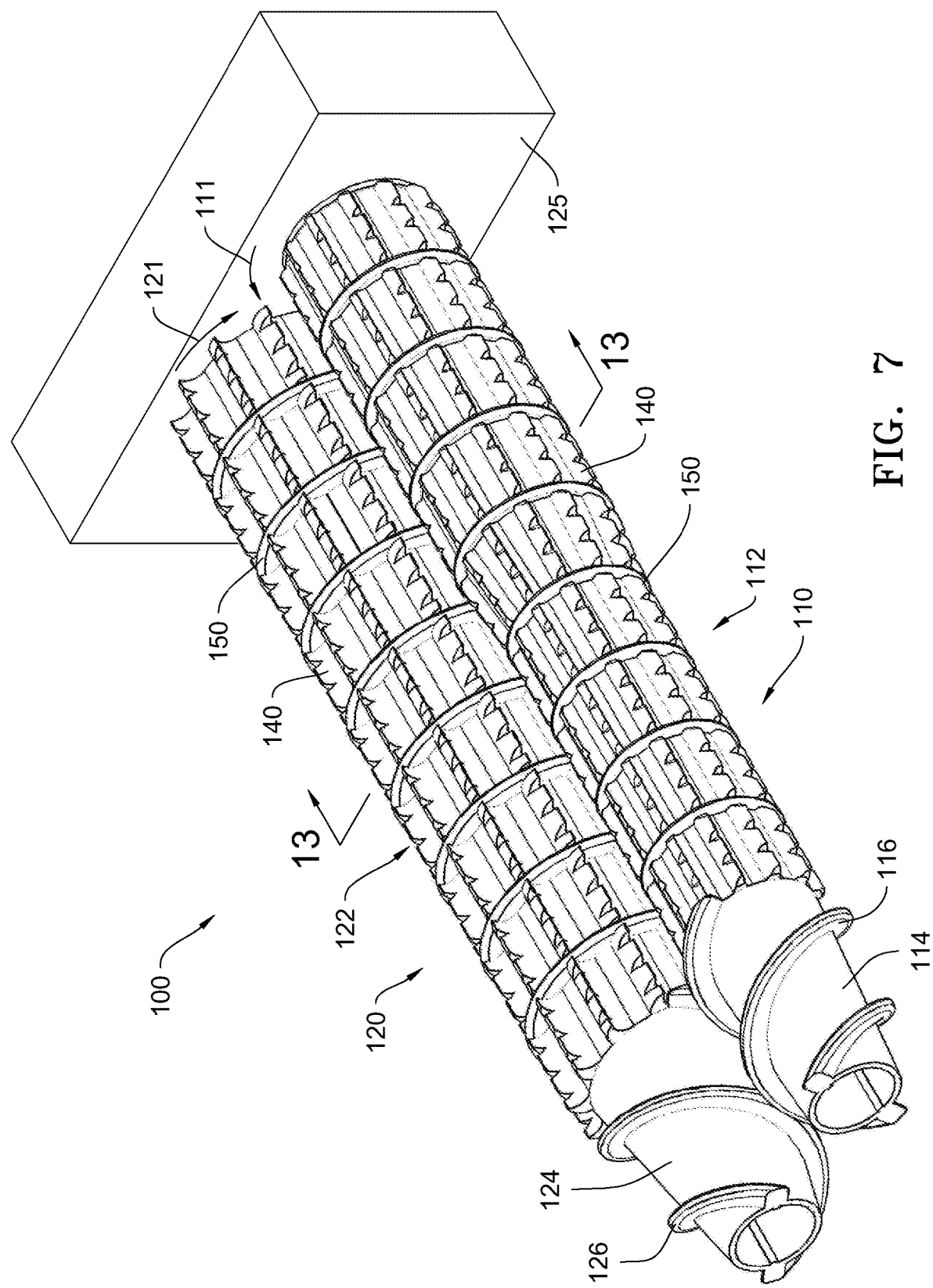
FIG. 7 is a front perspective view of one embodiment of a differential speed stalk roll assembly.
Figure 8:
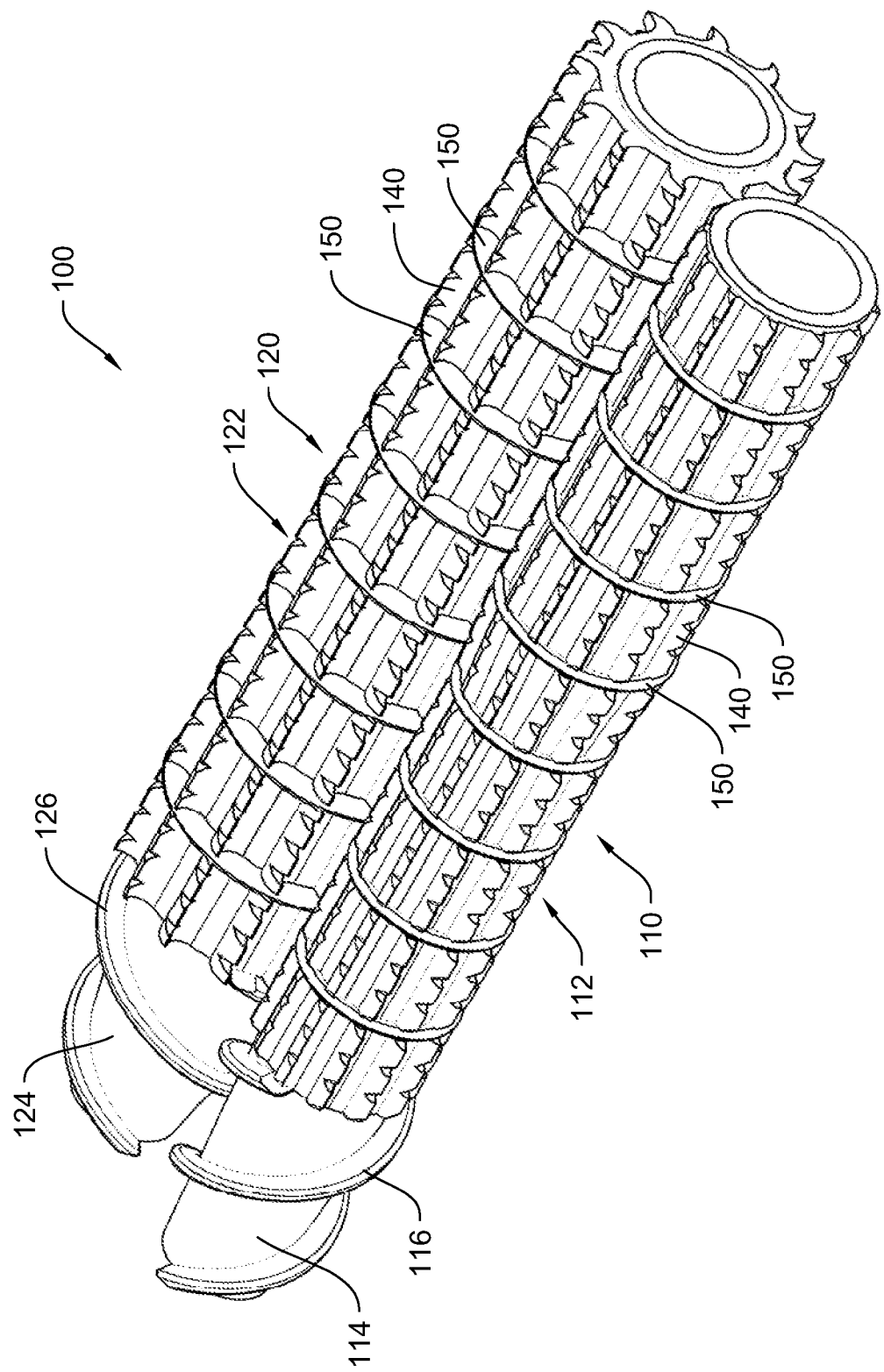
FIG. 8 is a rear perspective view of the differential speed stalk roll assembly of FIG. 7.

Referring now to the drawings wherein like reference numerals designate the same or corresponding parts throughout the several views, FIG. 7 shows an embodiment of a differential speed stalk roll assembly 100, comprising a pair of stalk rolls 110, 120. Each stalk roll 110, 120 is comprised of a main body 112, 122 and a head or nose 114, 124. The head 114, 124 may have helically arranged flights 116, 126 which function as augers to pull the cornstalk rearwardly between the main bodies 112, 122 as the stalk rolls rotate counter to one another as indicated by arrows 111 and 121. Each stalk roll 110, 120 may be formed as a single cast, forged or machined unit with the head 114, 124 and main body 112, 122 formed as integral unit. Alternatively, each stalk roll 110, 120 may be formed by casting, forging, or machining the main body 112, 122 separate from the head 114, 124. Alternatively, each stalk roll body 112, 122, may comprise modular body segments (discussed later) with each modular body segments cast, forged, machined or otherwise fabricated as an interchangeable unit. The modular body segments may be cylindrical or conical segments or plate steel or bar stock segments which are welded or bolted together.

Figure 14A:
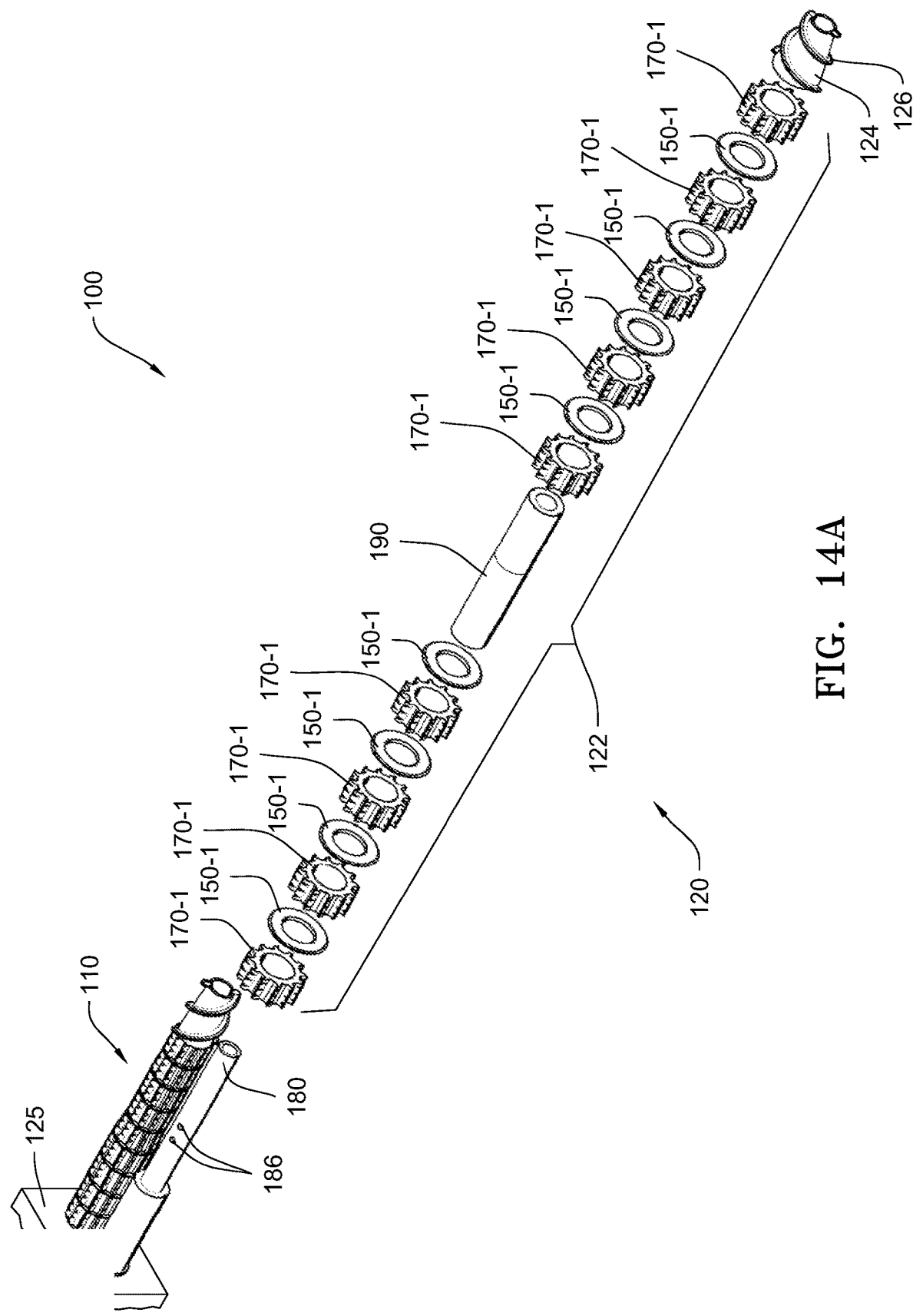
FIG. 14A is a partially exploded perspective view of the differential speed stalk roll assembly of FIG. 7.
Figure 14B:
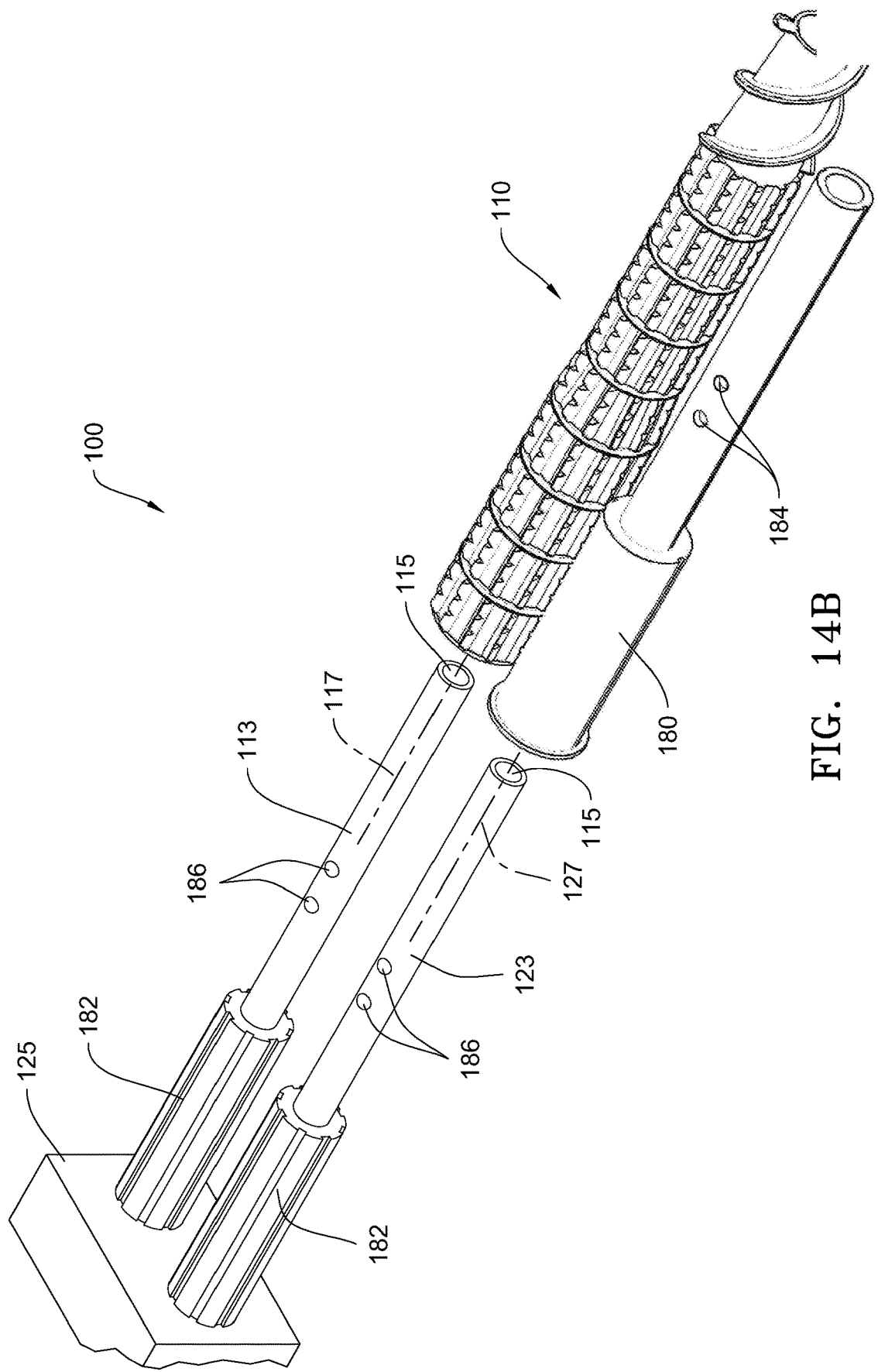
FIG. 14B is an enlarged partial exploded perspective view of the differential speed stalk roll assembly of FIG. 7 showing the shafts.

As best illustrated in FIG. 14B, each stalk roll 110, 120 receives and is rigidly secured to laterally spaced shafts 113, 123 coupled to a gearbox 125 which drives rotation of the shafts 113, 123 about their respective longitudinal axis 117, 127. The gearbox 125 of each row unit 30 is operably driven by the combine 10 to which the head 20 is mounted as understood by those of skill in the art. The shafts 113, 123 may be cantilevered from the gearbox 125 such that their forward ends are unsupported, or the forward ends of the shafts 113, 123 may be supported from brackets or frame members on the head 20. The gearbox 125 may be configured to drive the shafts 113, 123 such that they rotate together, but in opposite direction, at the same speed of rotation or revolutions per minute (RPM). Alternatively, the gearbox 125 may be configured so each shaft 113, 123 is capable of rotating at different RPMs.

The stalk rolls 110, 120 may include an internal cavity that is keyed to matingly receive splines on the outer periphery of the shafts 113, 123 so the stalk rolls are rotationally fixed to the shafts and longitudinally restrained with respect to the shafts by roll pins, or threaded connectors extending through the main body and into the shafts 113, 123. Alternatively, or in addition, the stalk rolls 110, 120 may be longitudinally restrained with respect to the shafts 113, 123 by threaded connectors which extend through bores in the forward ends of the heads 114, 124 and are threadably received by internally threaded bores in the forward ends of the shafts 113, 123.

In one embodiment of the differential speed stalk roll assembly 100, one of the stalk rolls (the first stalk roll 110) has a smaller diameter than the other stalk roll (the second stalk roll 120). Either stalk roll comprising the pair of stalk rolls may be the larger diameter stalk roll. It should be appreciated that if shafts 113, 123 rotate at the same RPM, both the shaft and the stalk roll rotationally secured thereto, will have the same RPMs, but the outer periphery of the stalk roll body 112, 122, will move at a greater speed than the outer periphery of the smaller diameter shafts 113, 123. Likewise, even though both stalk roll bodies 112, 122 are rotating at the same RPM, it should be appreciated that the outer peripheral speed of the larger diameter stalk roll body will be greater than the outer peripheral speed of the smaller diameter stalk roll body.

It has been found that when two adjacent stalk rolls are rotating with a differential in outer peripheral speeds, cornstalks passing between the differential speed stalk rolls will be more effectively shredded or opened up along the length of the cornstalk which exposes the core and fractures the hard outer hull or shell of the cornstalk, thereby promoting faster breakdown and decomposition of the cornstalk than if the cornstalk is simply cut or chopped into smaller pieces but leaving the hard hull or shell of the cornstalk unfractured or unshredded. Furthermore, it has been found that when using differential speed stalk rolls, the portion of the stalk stubble that remains projecting above the ground is partially exploded or shredded well below the point that the stalk is broken or snapped off by the stalk rolls, such that the remaining stalk stubble will not cause as much tire wear and is less likely to puncture tires due to the partially exploded or shredded stubble ends. This also allows faster breakdown and decomposition of the stalk stubble.

It should be appreciated that a differential speed between the stalk rolls can also be achieved using the same diameter stalk rolls by modifying the gearbox 125 to cause one of the shafts 113, 123 to have a greater RPM than the adjacent shaft 113, 123. The stalk roll attached to the shaft 113, 123 having a greater RPM will necessarily have a greater outer peripheral speed than the same diameter stalk roll mounted to the other shaft 113, 123 rotating at a slower RPM.

It has been determined that a pair of stalk rolls having a differential speed between their respective outer peripheries within a range of about ten percent (10%) to about fifty percent (50%) produces desirable shredding of the cornstalks. A ratio between the smaller diameter stalk roll and the larger diameter stalk between a range of 1:1.1 and 1:1.6 will produce the differential speeds within the above range.

The outer peripheries of the main bodies 112, 122 include radially spaced flutes 140 which serve to bite into or grip the cornstalk as the flutes rotate to pull the cornstalk downwardly toward the stripper plates 40, 42 for stripping the ears 14 from the stalks 16. As the flutes 140 grip and bite into the stalks, the differential speeds of the rotating stalk rolls rip, shred and crush the stalks as the stalks pass between the outer peripheries or outer surfaces of the adjacent stalk rolls. The flutes 140 may be continuous or longitudinally intermittent. The outer tip or edge of the flutes 140 may include a plurality of spaced notches or teeth 174 (see e.g., FIGS. 17, 19-21) resulting in serrated edge flutes. The spacing, width and depth of the notches or teeth 174 may vary. It has been found that serrated edge flutes produce more effective shredding of the cornstalks than straight edge or non-serrated edge flutes, and that deeper and wider notches will produce more aggressive shredding. It may be desirable to provide deeper and wider notches 174 on the stalk roll with the greater outer peripheral speed to produce more aggressive shredding. Additionally, the flutes 140 may be curved or hooked or radially straight. Thus, it should be appreciated that the particular configuration of the flutes 140 may vary depending on crop moisture levels, brittleness of the stalks, weather and other crop conditions.

Figure 13:
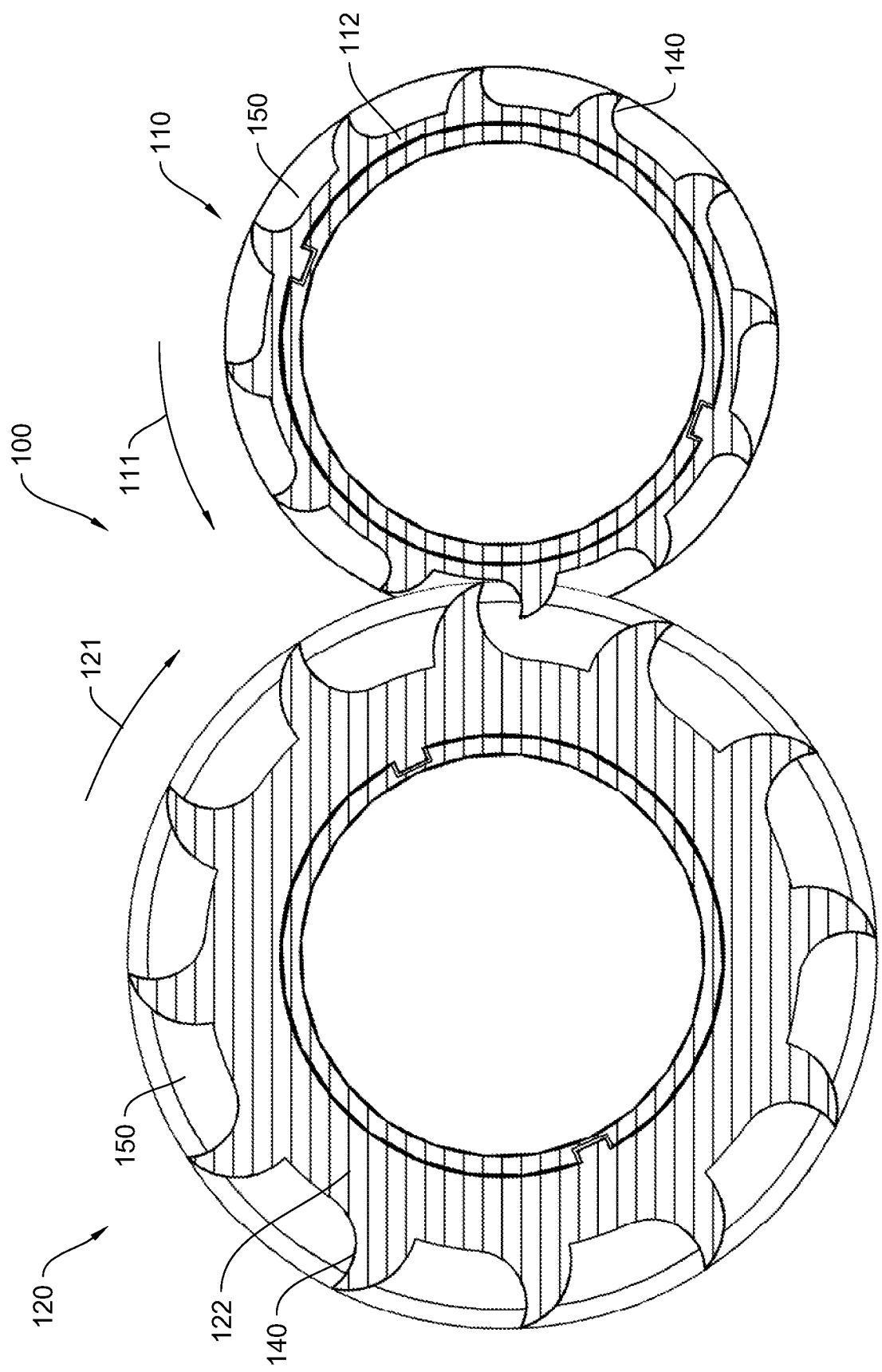
FIG. 13 is a cross-sectional view of the stalk rolls as viewed along lines 13-13 of FIG. 7.

FIG. 13 is a cross-sectional view of the stalk roll assembly 100 as viewed along lines 13-13 of FIG. 7 to best illustrate one particular configuration of the flutes 140 on the pair of stalk rolls 110, 120. In this embodiment, the first stalk roll 110 includes a plurality of radially spaced flutes 140 that are curved upwardly or away from the direction of rotation of the first stalk roll 110 as indicated by arrow 111. The plurality of radially spaced flutes 140 of the second stalk roll 120 are curved downwardly or toward the direction of travel of the stalk roll 120 as indicated by arrow 121. In this embodiment, it should be appreciated that the tips of the downwardly curved flutes 140 of the second stalk roll 120 (having the greater outer peripheral speed due to its larger diameter) will grip or bite into one side of the cornstalk as the second stalk roll 120 rotates, while the tips of the upwardly curved flutes 140 of the first stalk roll 110 (rotating at a slower outer peripheral speed due to the smaller diameter stalk) will grip or bite into the opposite side of the cornstalk producing an internal shearing force within the cornstalk. Thus, this differential speed and opposing gripping action of the flutes 140 between the first and second stalk rolls 110, 120 results in a more aggressive shredding of the cornstalk to more thoroughly open up or fracture the outer hull or shell of the cornstalk along its length resulting in more efficient breakdown and decomposition of the cornstalk.

Figure 48:
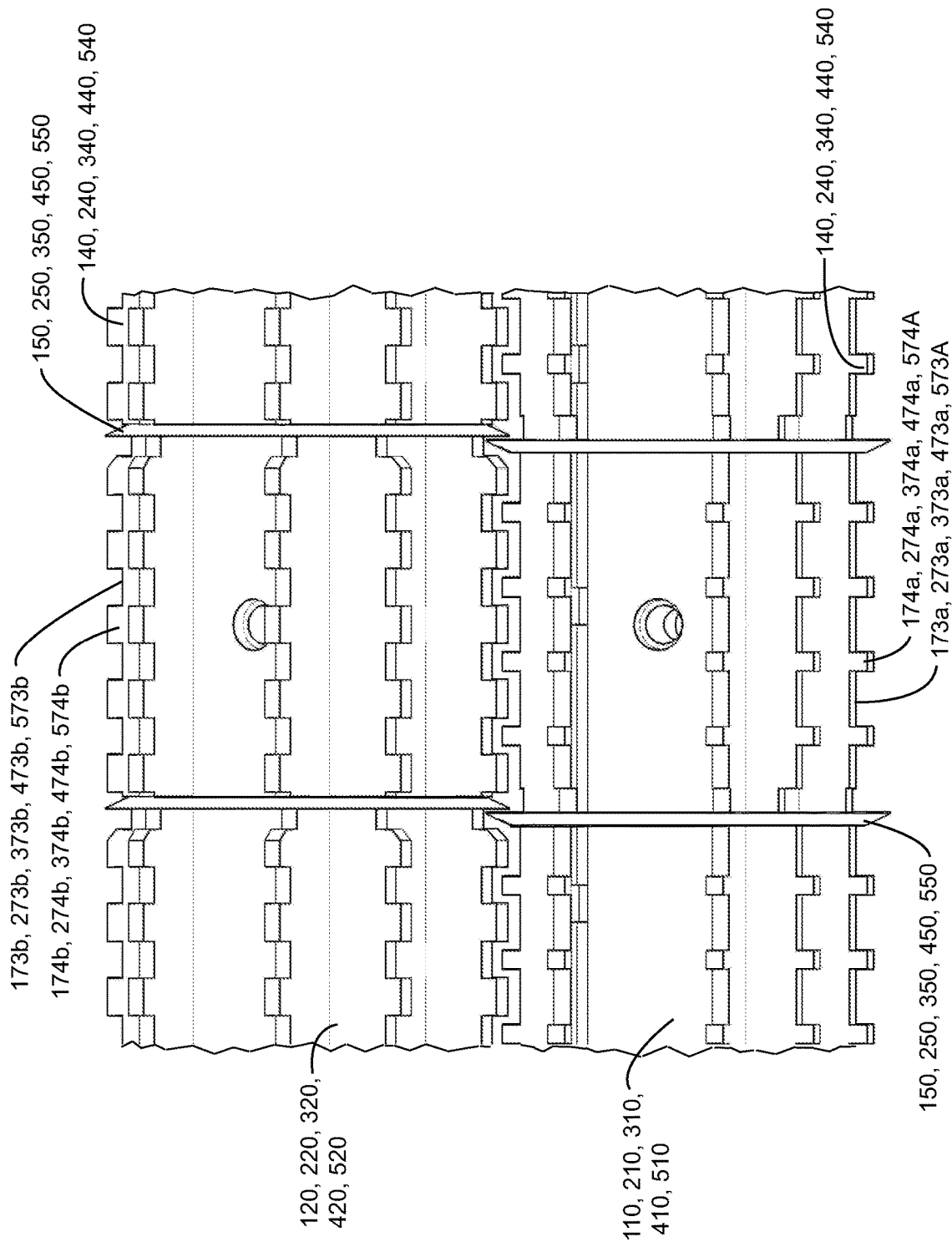
FIG. 48 is a top plan view of an embodiment of the stalk roll assemblies with interlocking teeth.

It should be appreciated that in embodiments in which the lateral spacing of the stalk rolls 110, 120 and the size of the respective bodies 112, 122 are such that the flutes 140 of the first and second stalk rolls 110, 120 overlap one another, the number of flutes 140 and the radial spacing of the flutes may be matched and oriented such that the flutes are timed to avoid the flutes contacting or interfering with one another as they rotate. Additionally, or alternatively, as shown in FIG. 48, the teeth 174 of the flutes 140 of one of the stalk rolls may be longitudinally offset with the teeth 174 of the flutes 140 of the adjacent stalk roll such that the teeth of one of the stalk rolls are received within the valleys 173 between the teeth of the adjacent stalk roll, resulting in "interlocking" teeth. As shown in FIG. 48, one of the stalk rolls has narrower teeth 174a with wider valleys 173a and the other stalk roll as wider teeth 174b with narrower valleys 173b. As the interlocking teeth rotate past one another, the narrower teeth 174a are received within the narrower valleys 173b of the adjacent stalk roll and the wider teeth 174b are received in the wider valleys 173a of the adjacent stalk roll.

Figure 9:
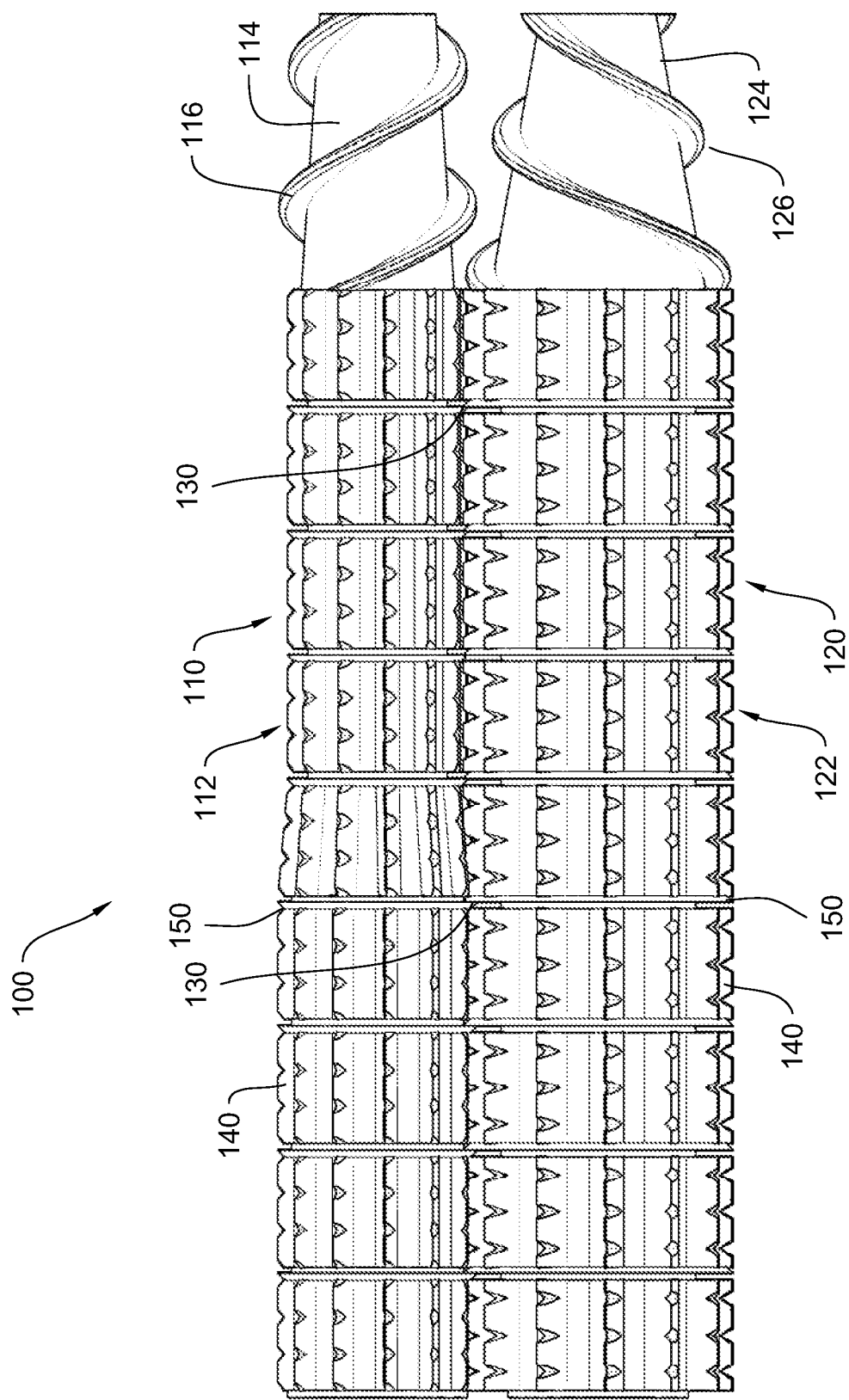
FIG. 9 is a top view of the differential speed stalk roll assembly of FIG. 7.
Figure 10:
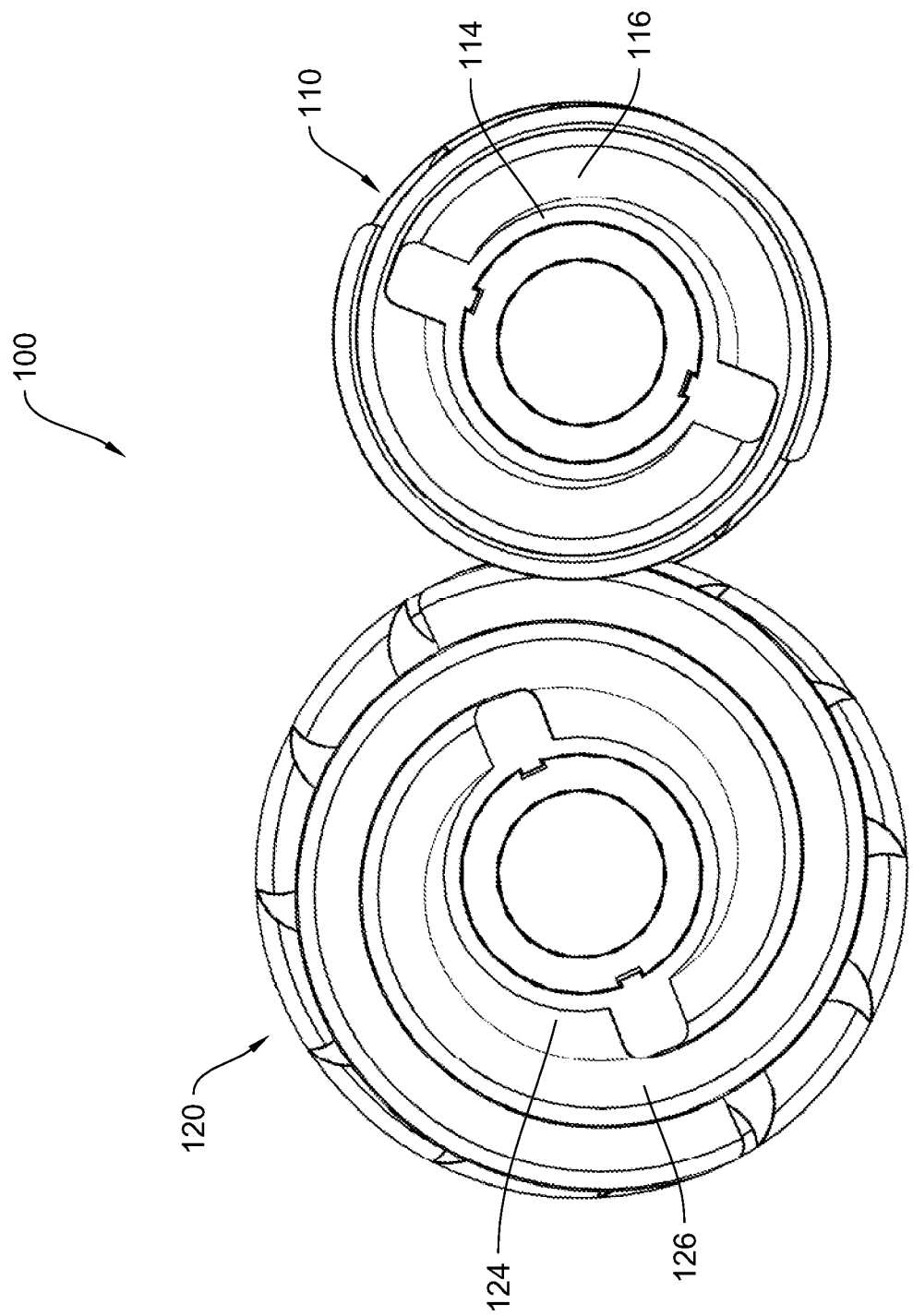
FIG. 10 is a front elevation view of the differential speed stalk roll assembly of FIG. 7.
Figure 11:
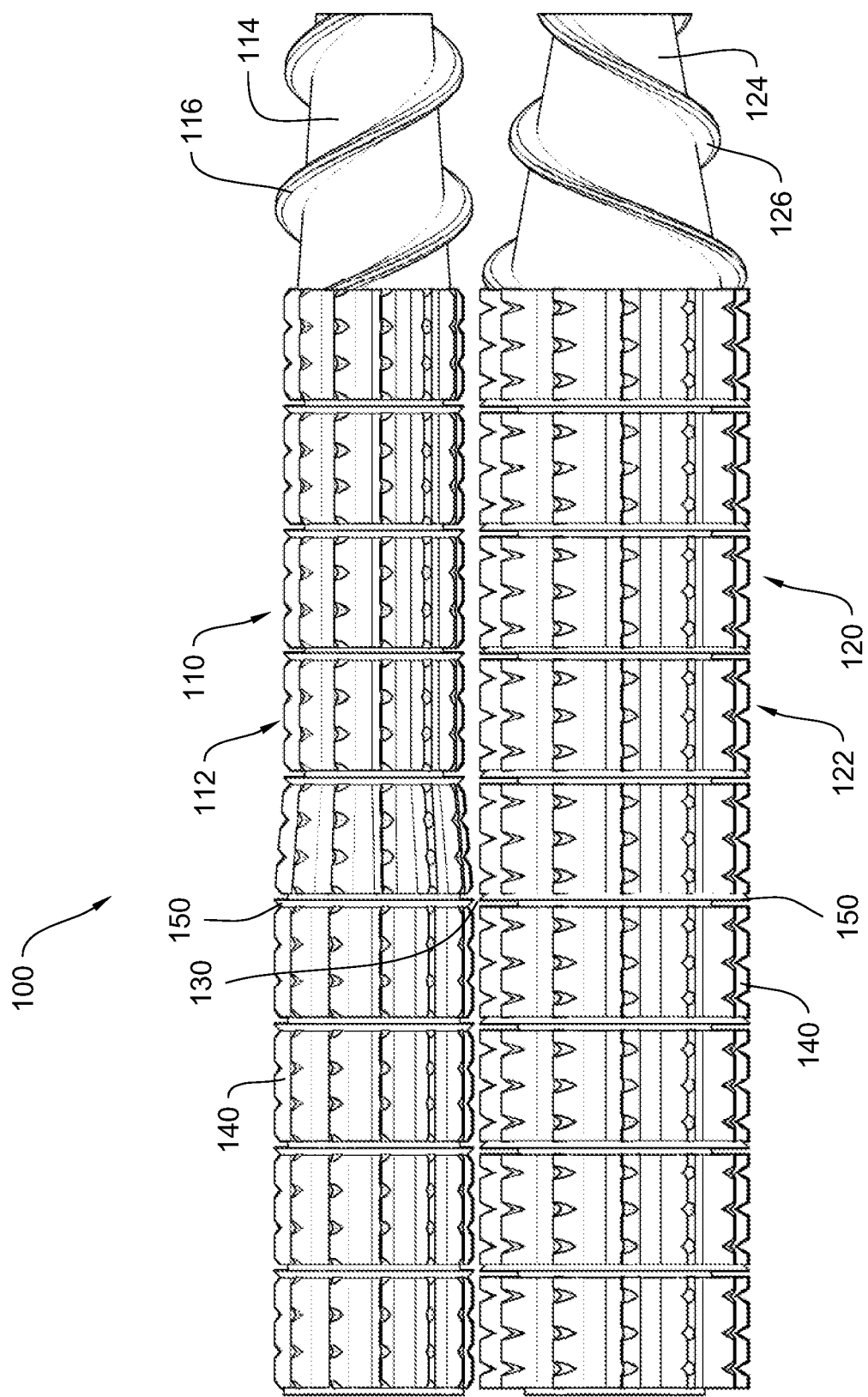
FIG. 11 is a top view of the differential speed stalk roll assembly of FIG. 7 with the stalk rolls having a greater laterally spacing.
Figure 12:
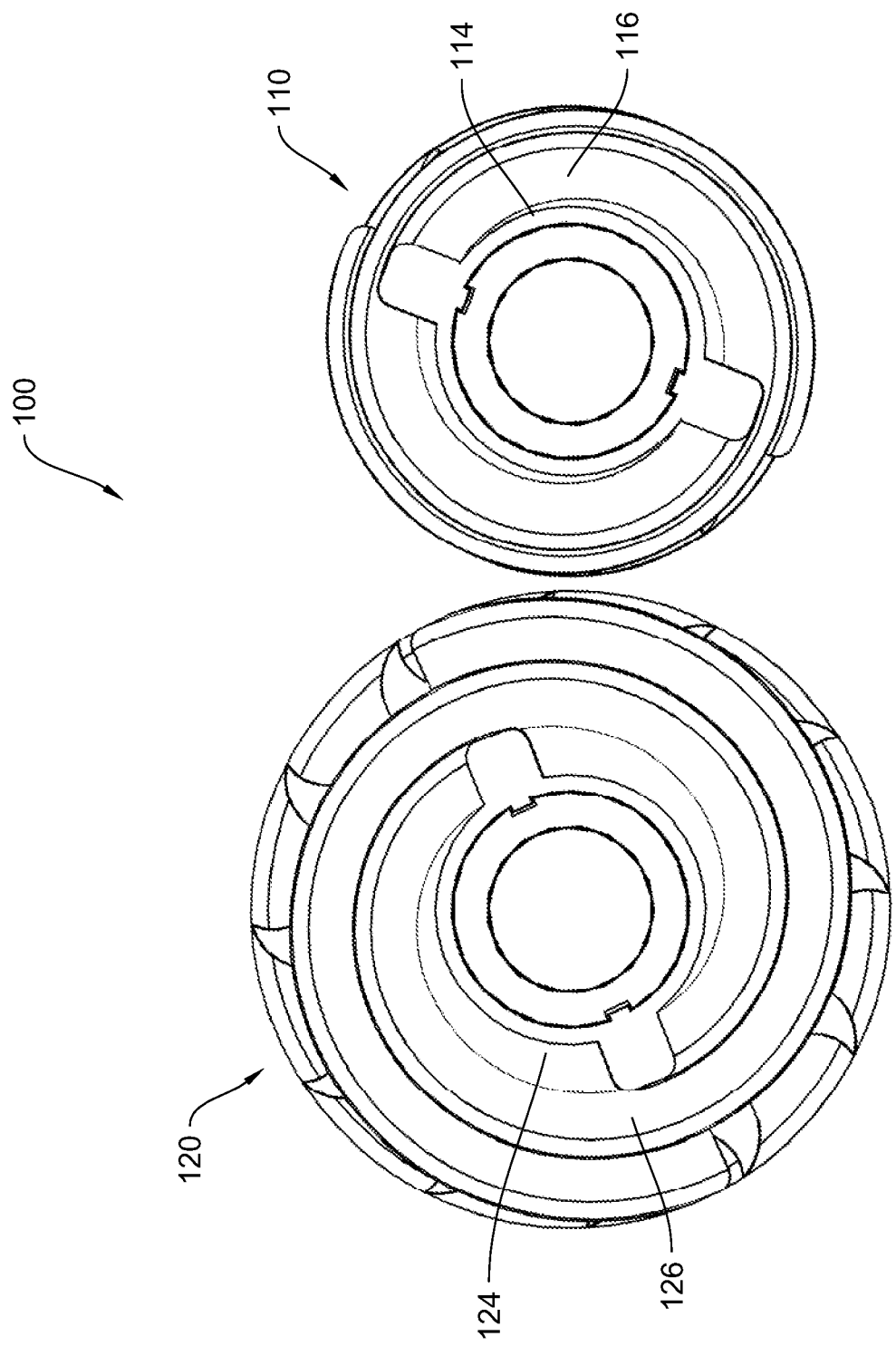
FIG. 12 is a front elevation view of the differential speed stalk roll assembly of FIG. 11.

Furthermore, it may be desirable to have a wider spacing between the main bodies 112, 122 of the stalk rolls stalk rolls (e.g., compare FIGS. 9 and 10 with FIGS. 11 and 12), or to have a wider spacing at the forward or leading end of the stalk roll bodies and a narrow spacing or overlapping flutes at the rearward or trailing end of the stalk roll bodies to ensure that the thinner tassel ends of the stalks are shredded as effectively as the larger stalk sections as the stalks move downwardly and rearwardly along the length of the stalk rolls as the header advances forward.

Additionally, it may be desirable to have more or less speed differential between the rotating stalk rolls depending on crop conditions or it may be desirable to have varying speed differentials along the length of the stalk rolls by varying the diameters between the respective first and second stalk rolls, or switching along the length of the stalk rolls between sides having the greater outer peripheral speeds.

While many of these variables can be achieved by swapping and interchanging the entire stalk roll or the main bodies of the stalk rolls with replacement stalk rolls or main bodies having the desired diameters, flute configurations, etc., in the embodiment discussed in more detail later, the main body may comprise a plurality of modular body segments that are separately interchangeable and replaceable to achieve the desired stalk roll configurations to achieve the best results based on varying crop conditions and other variables.

In addition to a stalk roll assembly that shreds the stalk along its length, it is also desirable to cut, chop or pinch the stalk into sections that are approximately four to twelve inches in length because such lengths are sufficiently long that they can be readily swept away by row cleaners during planting operations, but yet are sufficient short that the sections will readily break down and decompose, provided there is at least some fracturing or shredding of the hard outer shell of the cornstalk along the section.

To achieve the desirable stalk section lengths, pinch points 130 are spaced along the length of the main body, to pinch off, cut or sever the stalks as they are pulled downwardly and rearwardly between the stalk rolls. One embodiment of a pinch point 130 is provided by longitudinally aligned knife blades 150 which form a cutting plane substantially normal to the longitudinal axis 117, 127 of the shafts 113, 123. Depending on the construction of the stalk rolls, the knife blades 150 may be cast as an integral part with the main body and subsequently machined to produce a sharp cutting edge. Alternatively, for fabricated constructions, the knife blades 150 may be fabricated and welded to the structure comprising the main body of the stalk rolls. In yet another alternative embodiment, and as discussed in more detail later, the knife blades 150 may be modular annular blades disposed between body segments or received within slots of body segments.

Referring to FIG. 13, in one embodiment, the knife blades 150 have an outer diameter that is substantially the same as the outer diameter of the tips of the flutes. It has been found that under some embodiments and configurations of the of the stalk roll bodies 112, 122, if the outer diameter of the knife blades 150 is greater than the outer diameter of the tips of the flutes, the knife blades may act as a wall obstructing the rearward movement of the cornstalks between the stalk rolls. However, as discussed later, in other embodiments and configurations of the stalk roll bodies 112, 122, the outer diameter of the knife blades 150 may be greater than the outer diameter of the tips of the flutes without obstructing the rearward movement of the cornstalks between the stalk rolls, and in fact, in some embodiments, having the knife blade diameters larger than the stalk body diameters improves the shearing or cutting of the stalks so they are completely severed into the desired stalk segment lengths.

Figure 15:
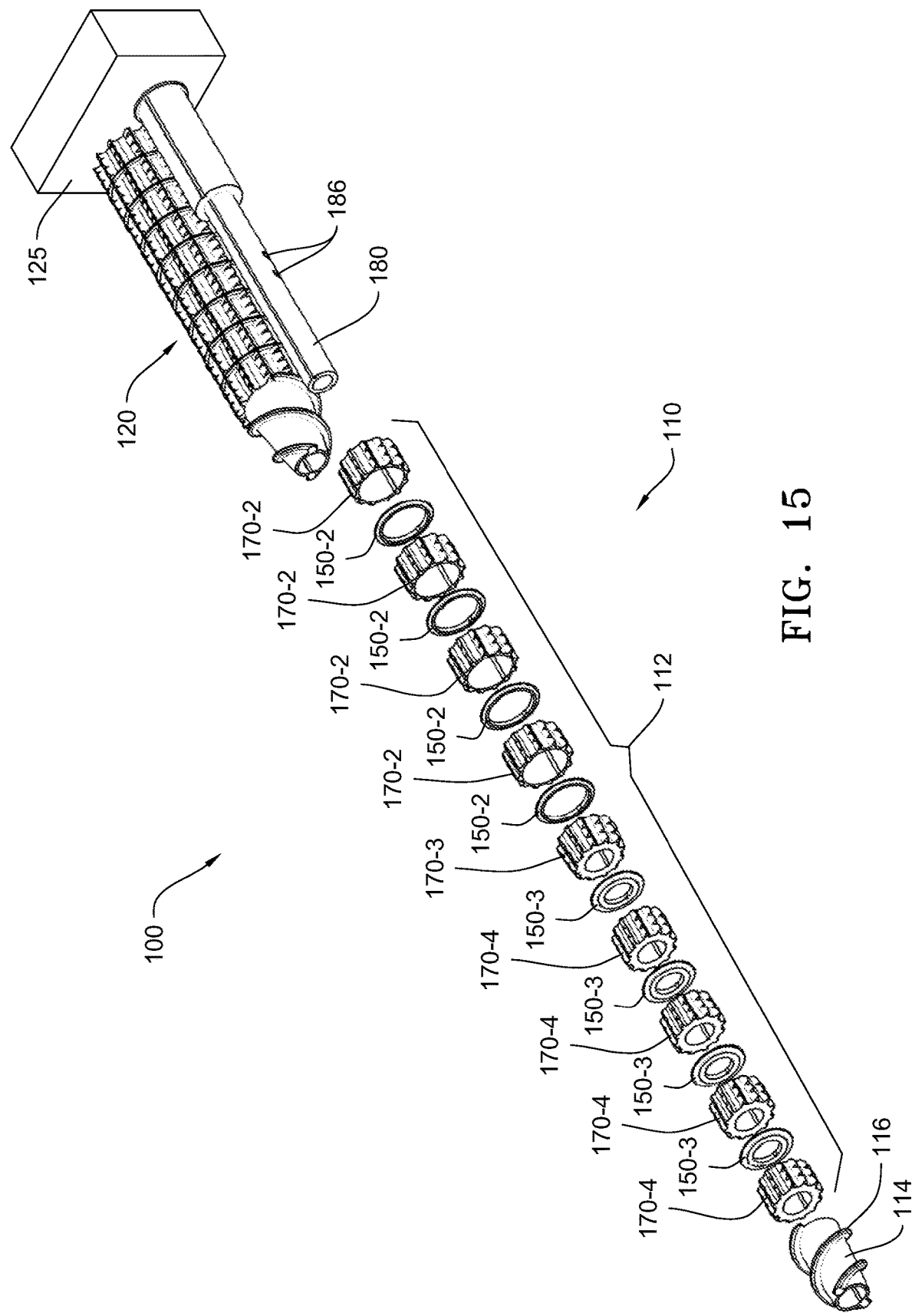
FIG. 15 is another partially exploded perspective view of the differential speed stalk roll assembly of FIG. 7.

FIGS. 14A, 14B and 15 are exploded views of the stalk rolls 110, 120 showing one embodiment in which the stalk rolls comprise a plurality of body segments 170 disposed between annular knife blades 150. Enlarged views of each of the various body segments 170-1, 170-2, 170-3, 170-4 and the annular knife blades 150-1, 150-2, 150-3 as identified in FIGS. 14A, 14B and 15 are provided in FIGS. 17-23. The body segments 170 and annular knife blades 150 are received onto a sleeve 180. The sleeve 180 has an internal configuration (not shown) that matingly receives the external configuration of the shafts 113, 123, including a keyed internal periphery that matingly receives external splines 182 on the shafts, such that the sleeve 180 is rotationally restrained with respect to the shafts 113, 123. The sleeve 180 is also longitudinally restrained with respect to the shaft by roll pins or threaded connectors extending through apertures 184 in the sleeve 180 that align with apertures 186 in the shafts 113, 123.

Figure 16:
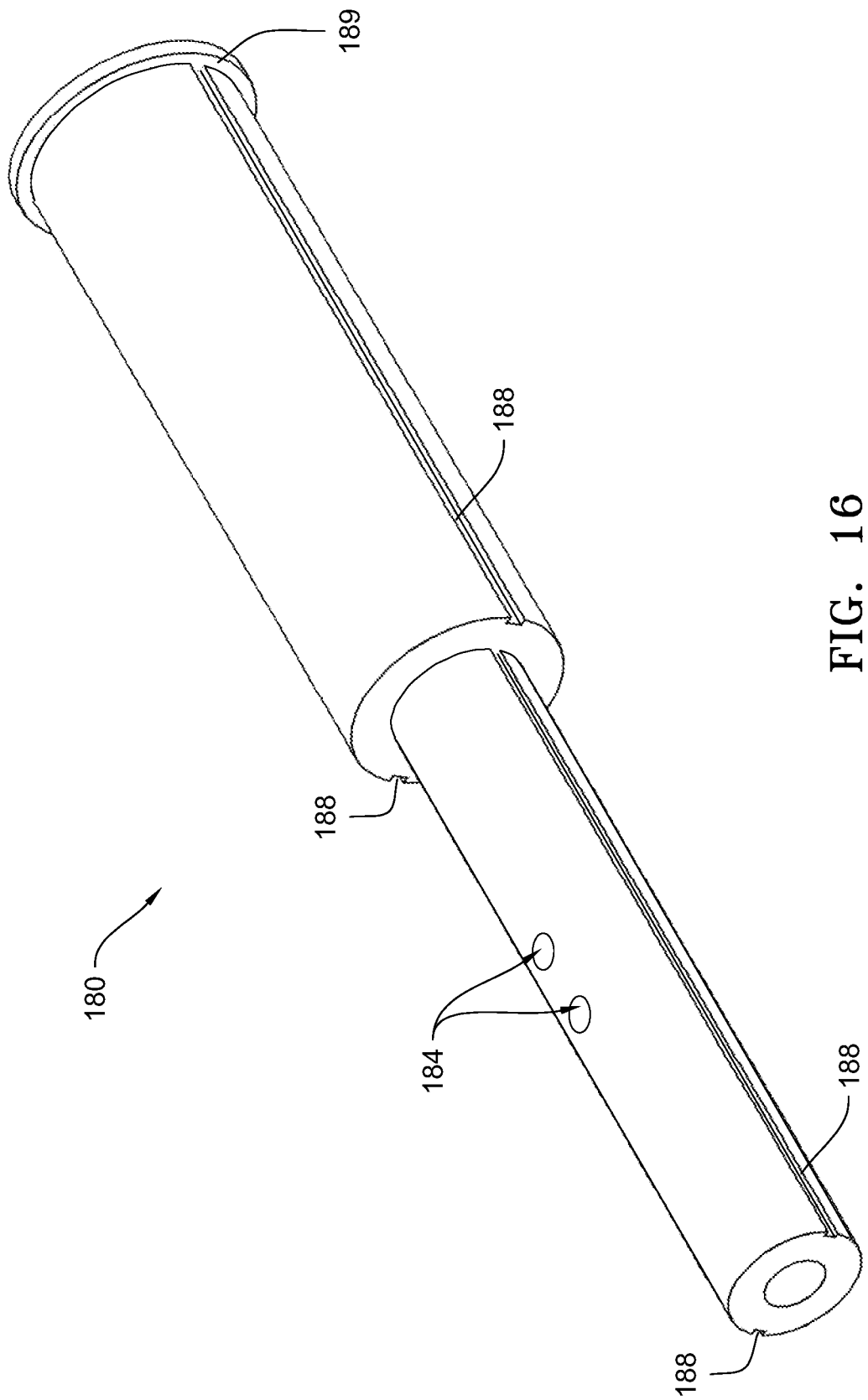
FIG. 16 is an enlarged perspective view of the sleeve depicted in FIGS. 14 and 15.
Figure 17:
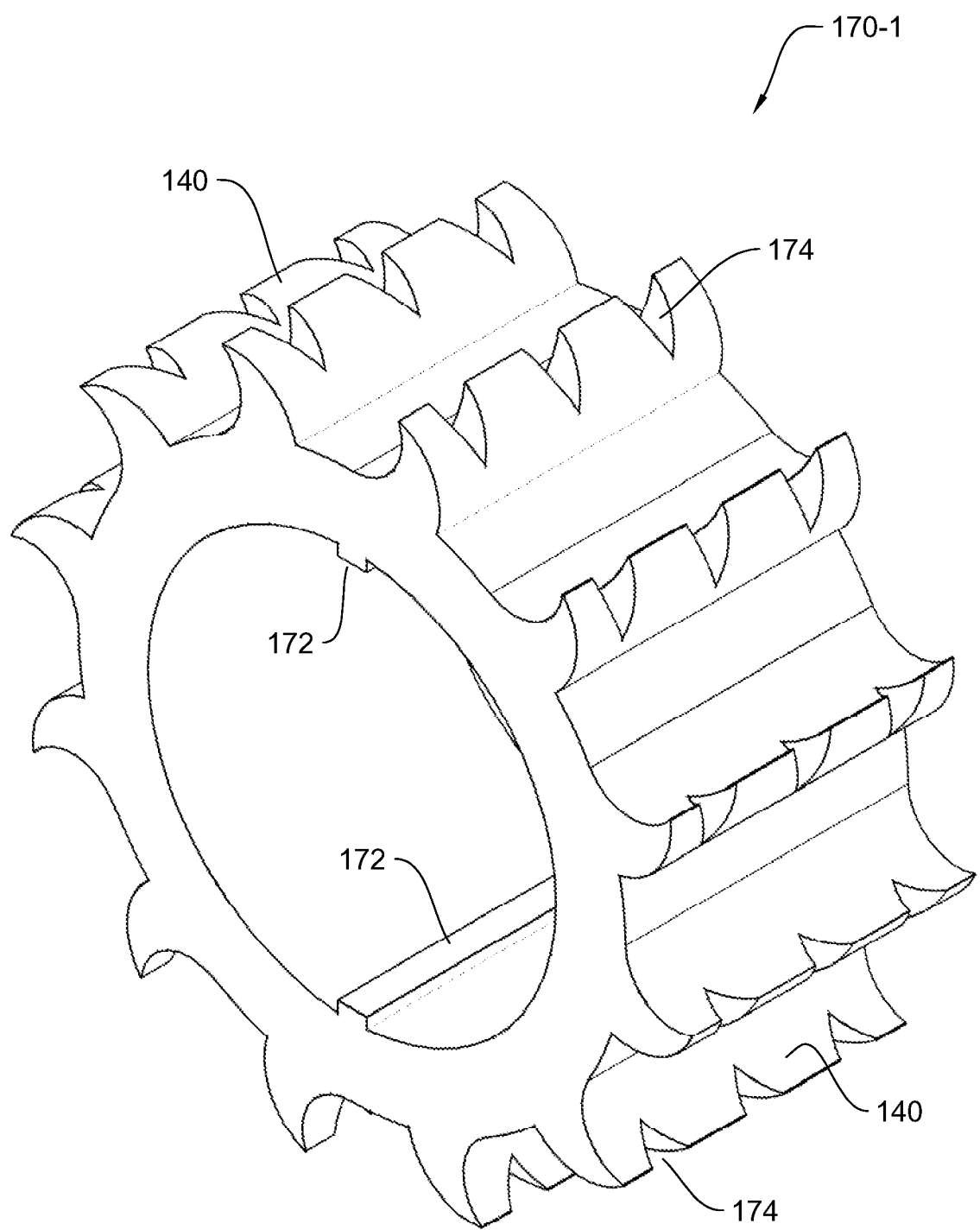
FIG. 17 is an enlarged perspective view of an embodiment of one of the body segments depicted in FIG. 14.

The sleeve 180 includes one or more external slots 188 (FIG. 16) which matingly align with inwardly projecting tabs 172 (see FIGS. 17, 19-20) on the internal diameters of the body segments 170. The mating slots 188 and tabs 172 rotationally restrain the body segments 170 to rotate with the sleeve 180, which in turn rotates with the respective shafts 113, 123. It should be appreciated that the internal diameter of the body segments 170 is sized such that that the body segments 170 easily slide onto the sleeves 180, while ensuring that the tabs 172 are still received within the slots 188 to maintain rotational restraint.

Referring, to FIG. 14A, some OEM row units may have stalk roll shafts with different diameters along their length. Accordingly, a bushing 190 may be provided that is the length of the smaller diameter shaft portion. The bushing 190 has an internal diameter and the same inwardly projecting tabs (not visible in FIG. 14A) as the body segments 170, such that the bushing 190 is rotationally restrained with respect to the sleeve 180 and the shaft 113. The bushing also has an external slot 192 that matingly receives the tabs 172 of the body segments 170 and the tabs 152 of the annular knife blades 150. The bushing 190 minimizes the wall thickness of the body segments 170 that would otherwise be required for the body segments to be slidably received over the smaller diameter portion of the sleeve 180.

Figure 18B:
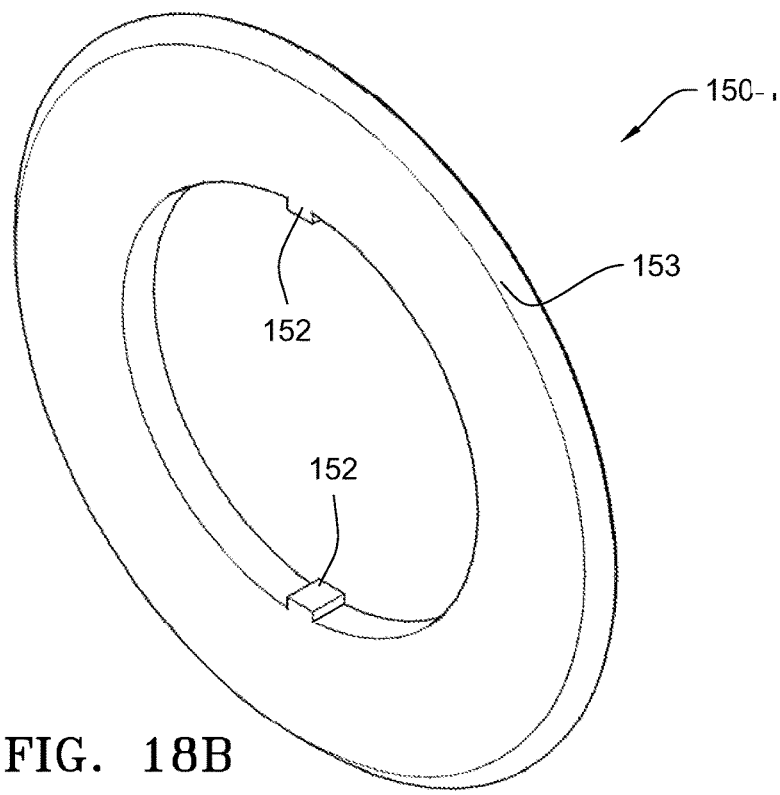
FIGS. 18A and 18B are enlarged front and rear perspective views, respectively, of an embodiment of one of the knife blades depicted in FIG. 14.
Figure 18A:
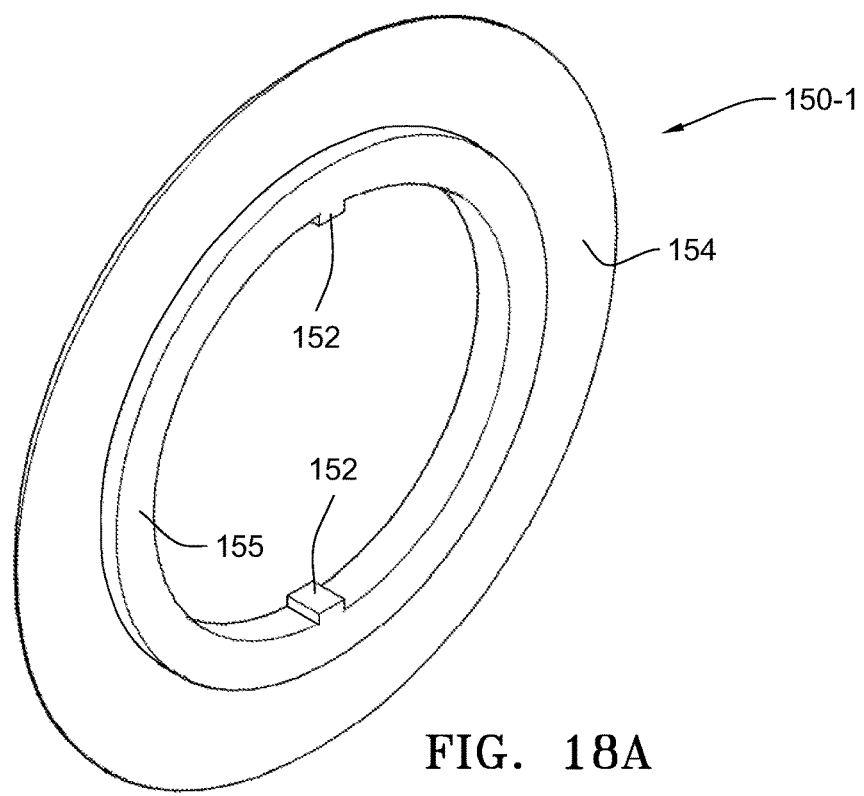
Figure 19:
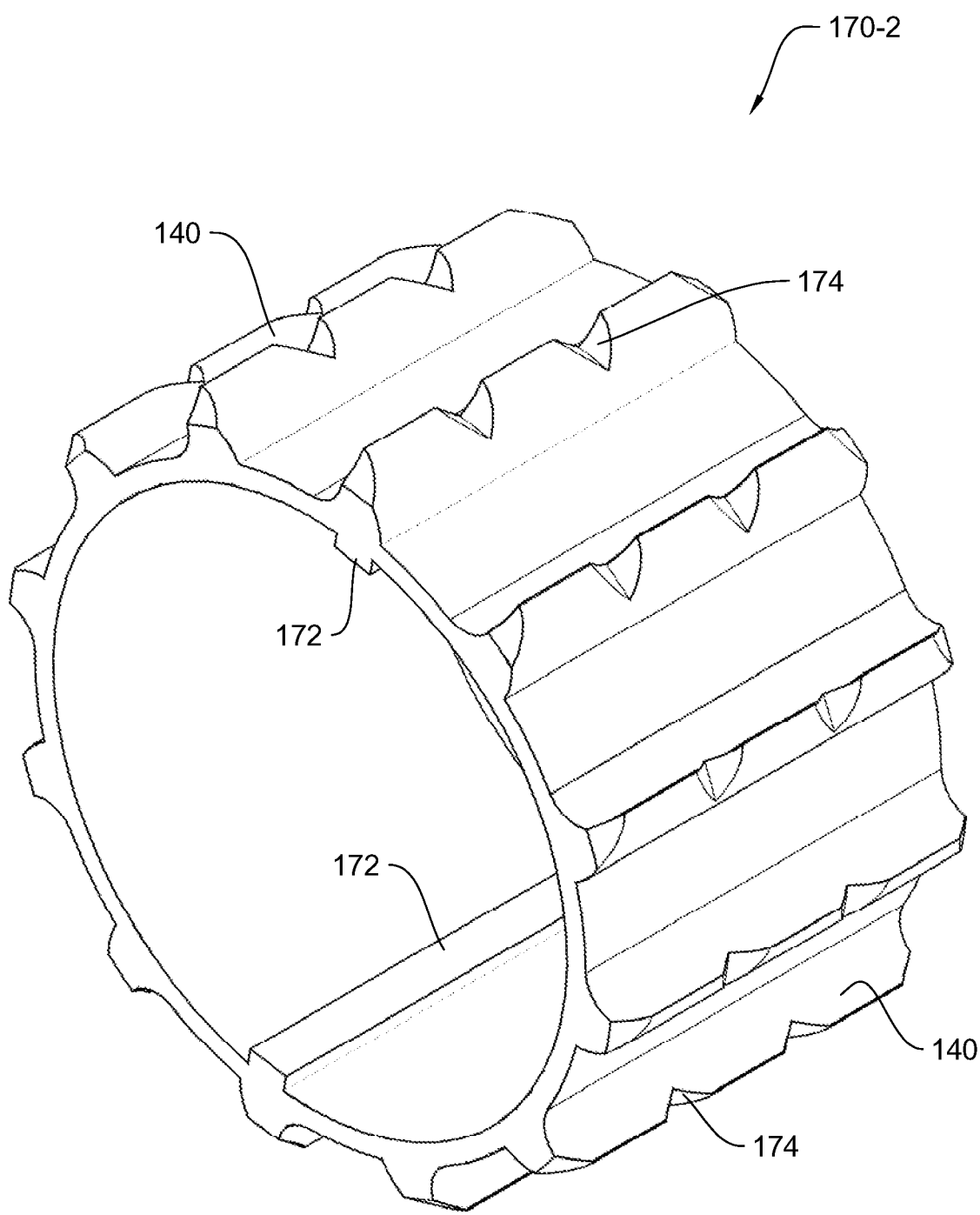
FIG. 19 is an enlarged perspective view of an embodiment of one of the body segments depicted in FIG. 15.
Figure 20:
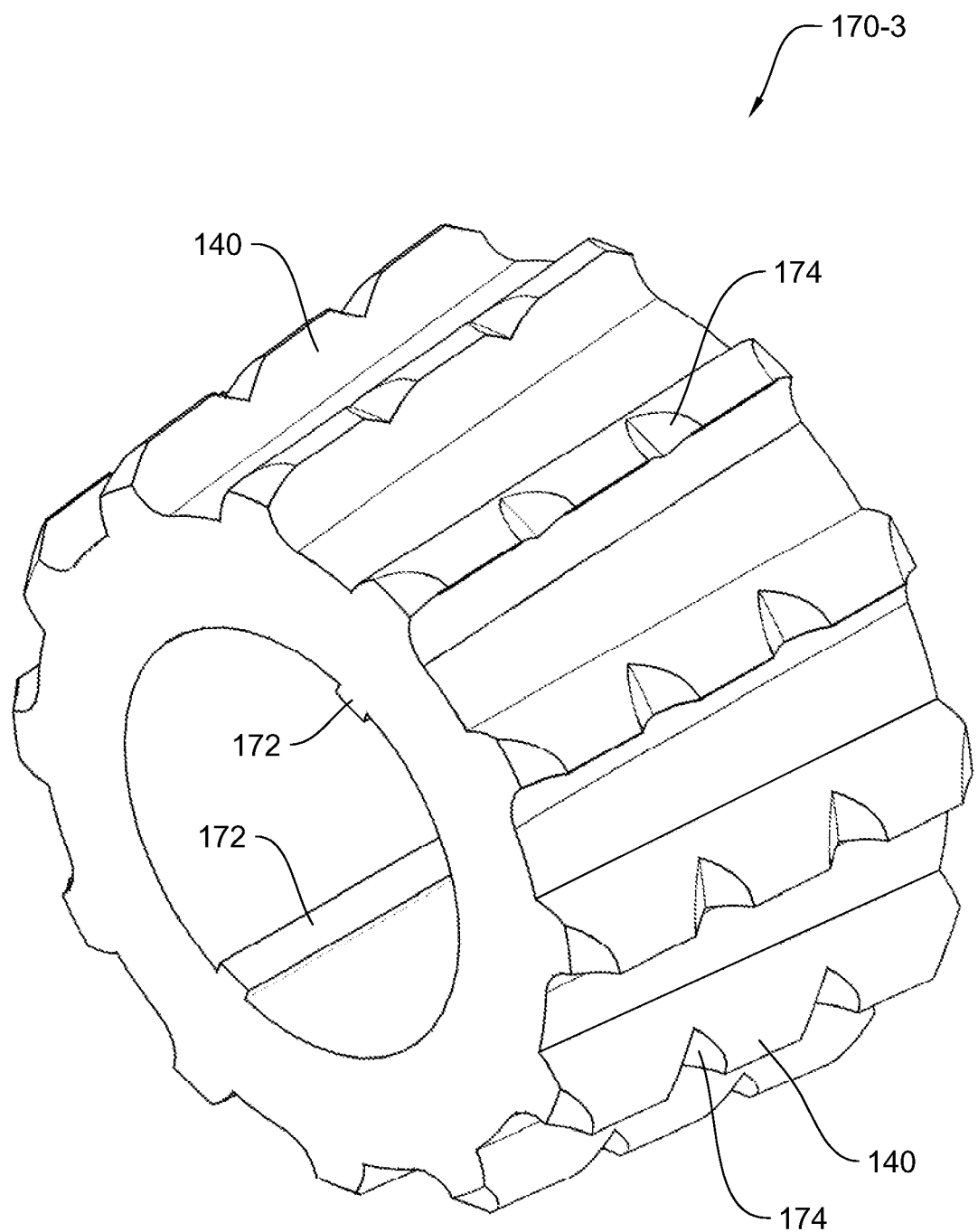
FIG. 20 is an enlarged perspective view of an embodiment of another of the body segments depicted in FIG. 15.
Figure 21:
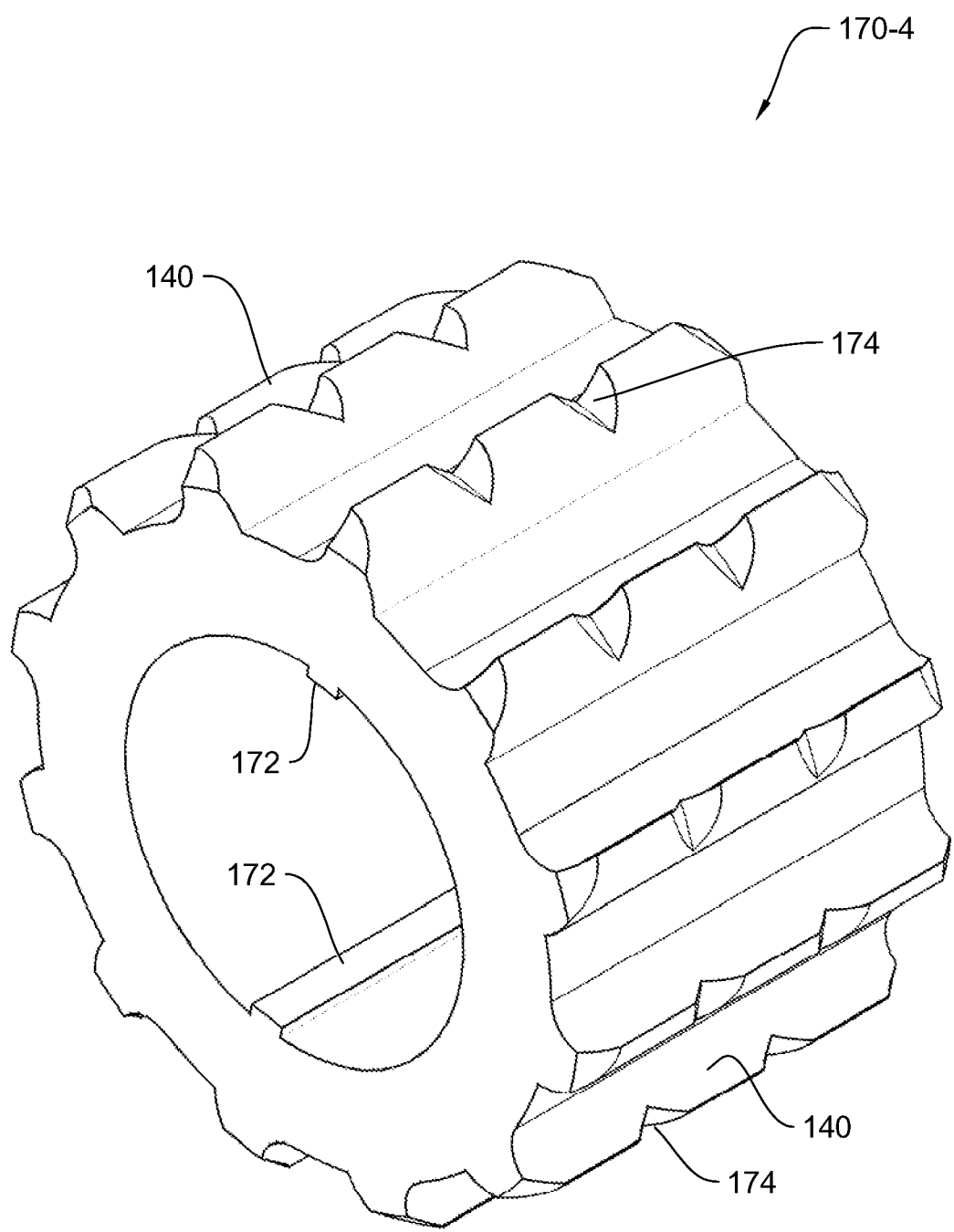
FIG. 21 is an enlarged perspective view of an embodiment of another of the body segments depicted in FIG. 15.
Figure 22B:
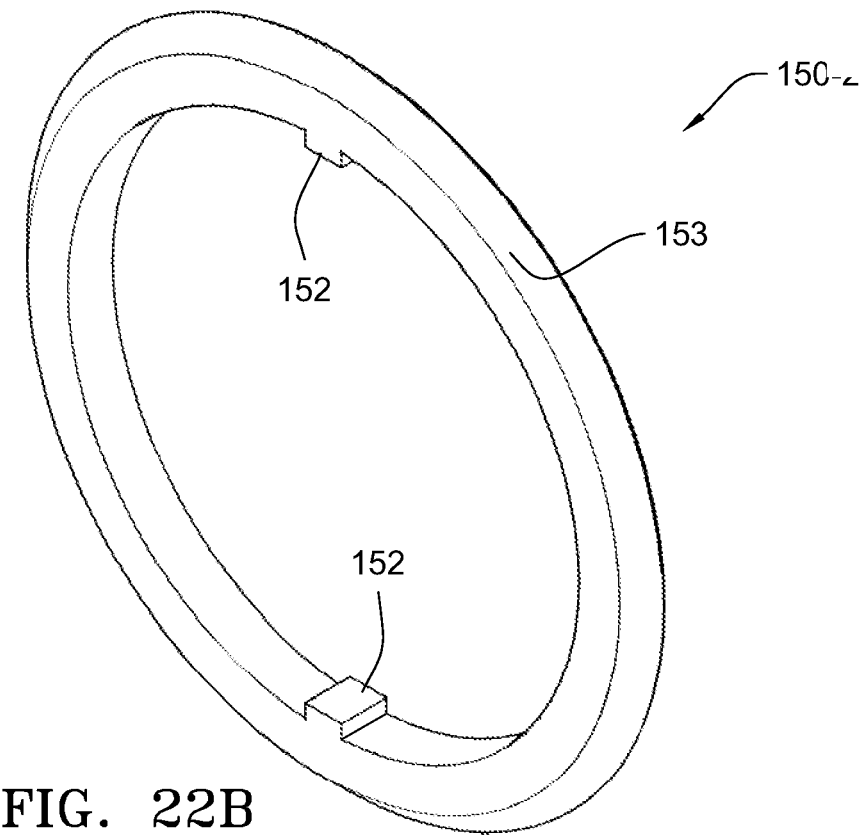
FIGS. 22A and 22B are enlarged front and rear perspective views, respectively, of an embodiment of one of the knife blades depicted in FIG. 15.
Figure 22A:
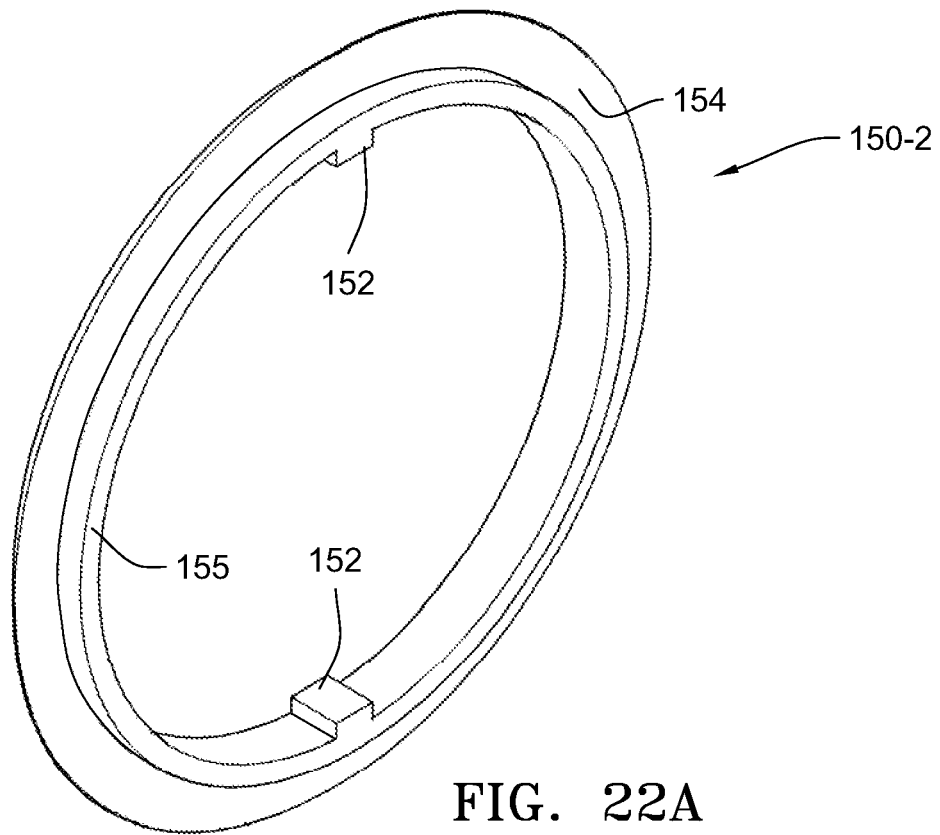
Figure 23B:
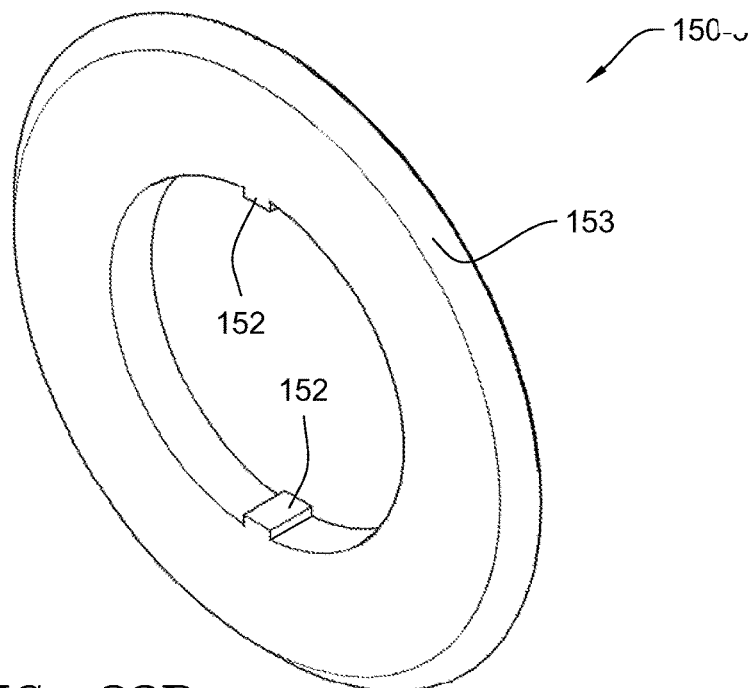
FIGS. 23A and 23B are enlarged front and rear perspective views, respectively, of an embodiment of another knife depicted in FIG. 15.
Figure 23A:
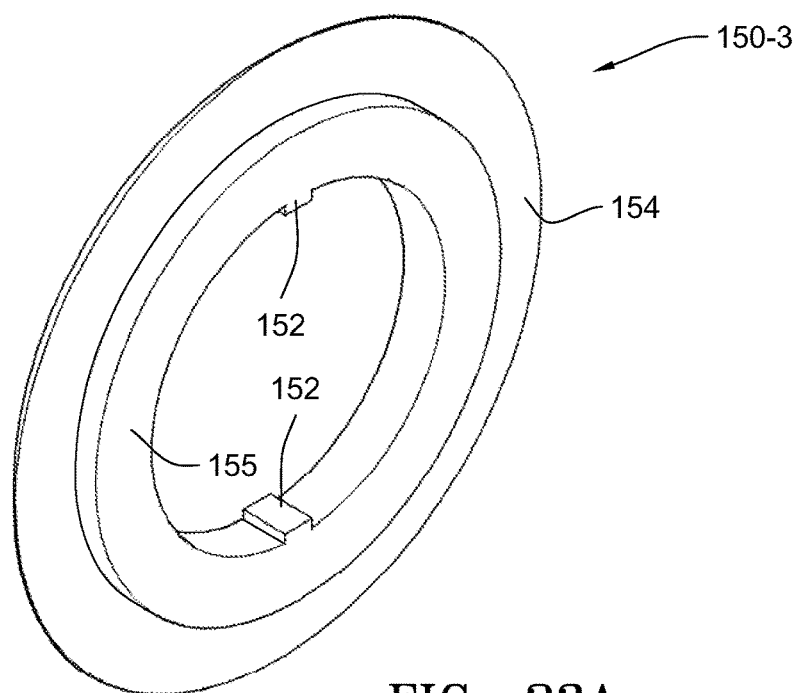
Figure 49:
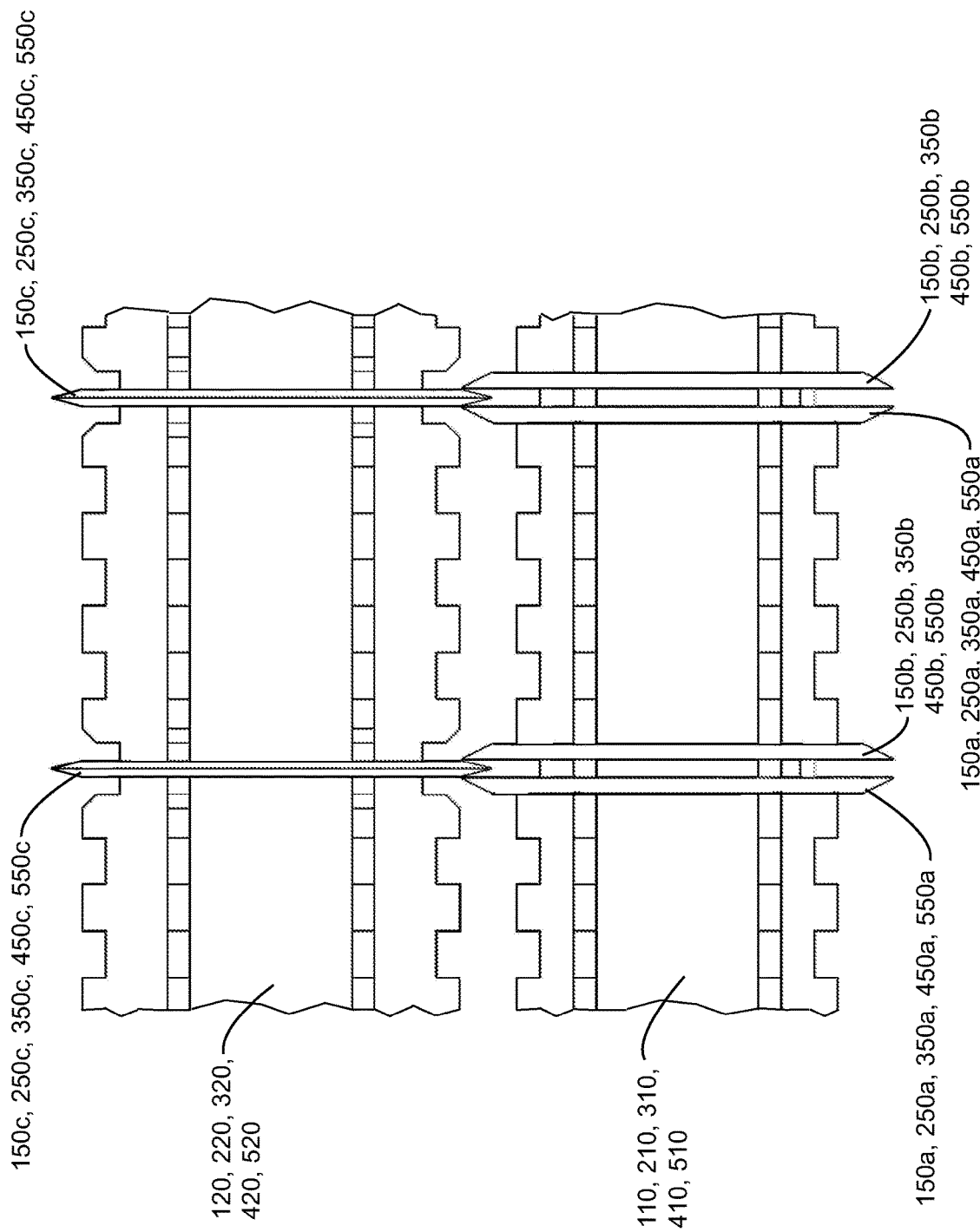
FIG. 49 is a top plan view of an embodiment of the stalk roll assemblies with three overlapping knife blades.

Referring to FIGS. 18 and 22-23, each knife 150-1, 150-2 has a beveled face 153 and a flat face 154. The knife blades 150 are oriented on the respective stalk rolls such that their flat faces 154 are back-to-back, thereby forming a cutting plane. The knife blades 150 may include a projecting flange 154 that serves as a spacer between the abutting body segments 170. While both of the main bodies 112, 122 are shown comprising a plurality of longitudinally spaced knife blades 150 along their length, each stalk roll body 112, 122 may include only one knife 150. Alternatively, one or more knife blades 150 may be utilized on only one of the stalk rolls 110, 120. In still other embodiments, no knife blades may be installed on either stalk roll 110, 120 if the operator wants the stalks to only be crushed or shredded and not severed into smaller stalk segments. In yet another alternative embodiment as shown in FIG. 49, two knife blades 150a, 150b are disposed on one stalk roll with their flat faces 154 spaced back-to-back and with a third knife blade 150c on the adjacent stalk roll disposed between the back-to-back blades 150a, 150b. In this embodiment, the third knife blade 150c has a beveled face 153 on both sides.

The body segments 170 and the knife blades 150 are longitudinally restrained on the sleeve 180 at the rearward end by flange 189 of the sleeve 180 and by the heads 114, 124 on the forward end. The heads 114, 124 are attached to the shafts 113, 123 by bolts (not shown) or other suitable fastening means received in the open forward end of the heads 114, 124 and internally threaded bore 115 (FIG. 14B) in the forward end of the shafts 113, 123. Alternatively, the heads 114, 124 may be secured to the shafts 113, 123 by threaded fasteners or roll pins extending through apertures in the heads and into the shafts 113, 123 transverse to the shaft axis 117, 127.

It should be understood that the configuration of the body segments 170 shown in FIGS. 7-15, 17 and 19-21, including their lengths, diameters, etc. and the shapes and configurations of the flutes 140 on the body segments 170 are intended as examples only and are not intended to limit the present disclosure of the bodies 110, 120 of the differential stalk roll assembly 100. Likewise the knife blades 150 shown in FIGS. 7-15, 18 and 22-23 are provided as examples only and are not intended to limit the present disclosure of the bodies 112, 122 of the stalk rolls 110, 120 of the differential stalk roll assembly 100. Various other configurations of body segments 170 and various other configurations of knife blades 150 may be provided.

Figure 24:
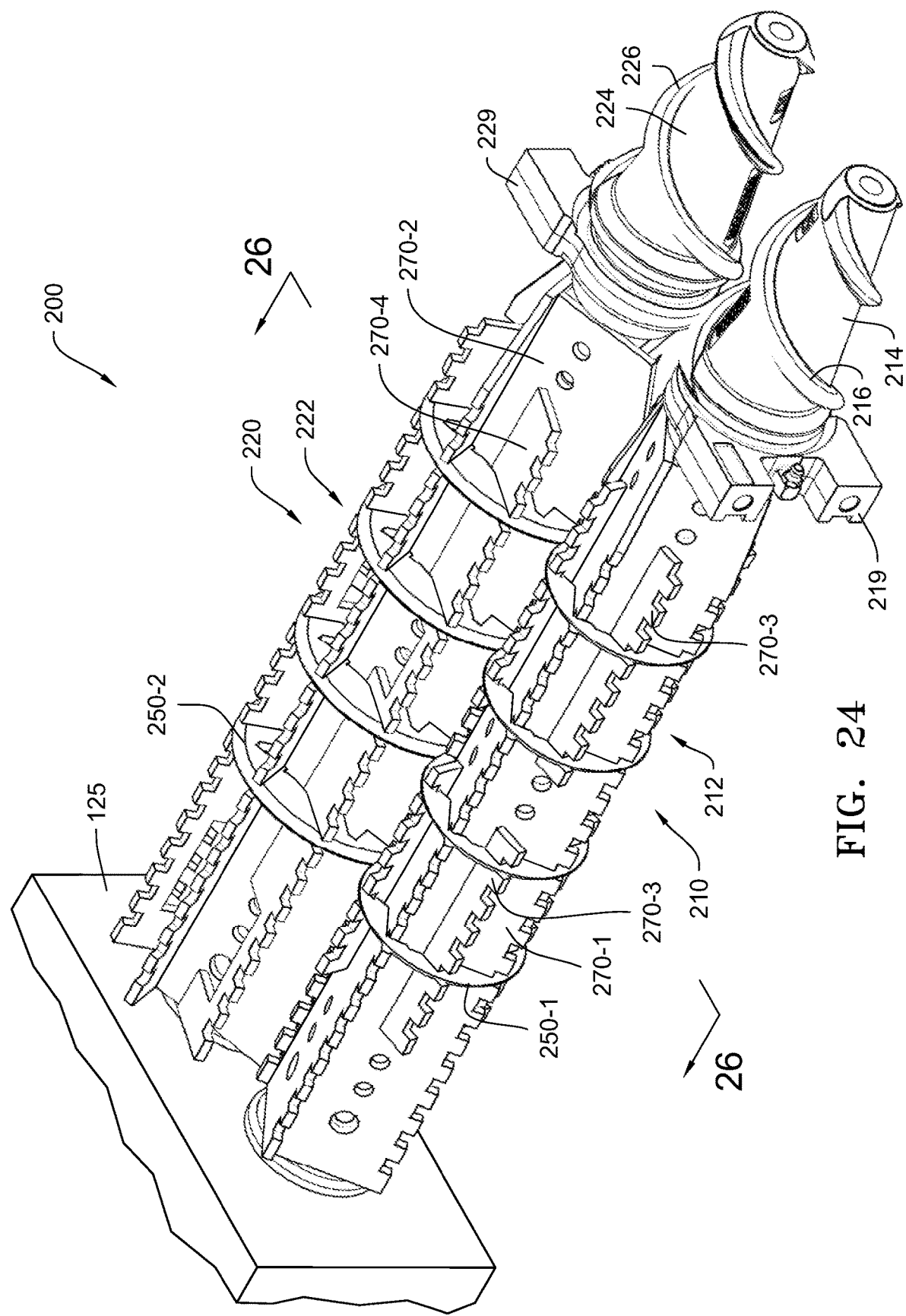
FIG. 24 is a front perspective view of another embodiment of a differential speed stalk roll assembly.
Figure 26:
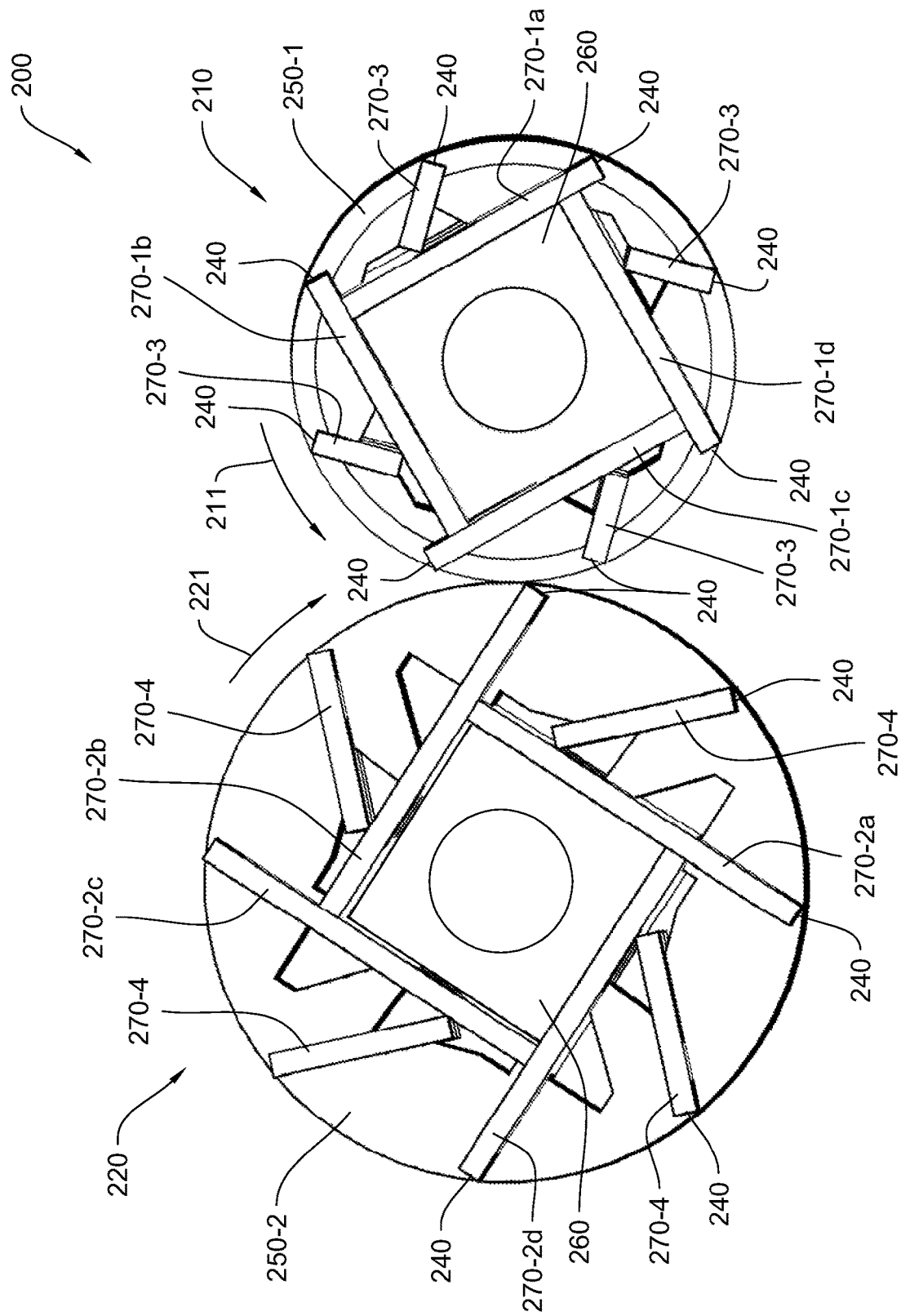
FIG. 26 is a cross-sectional view of the stalk roll assembly as viewed along lines 26-26 of FIG. 24.

FIG. 24 is a front perspective view of another embodiment of a differential speed stalk roll assembly 200. FIG. 26 is cross-sectional view of the differential speed stalk roll assembly 200 as viewed along lines 26-26 of FIG. 24. As with the previous embodiment, this embodiment of the stalk roll assembly 200 comprises laterally spaced first and second stalk rolls 210, 220 each having a main body 212, 222 and a head or nose 214, 224. However, in this embodiment, the main bodies 212, 222 of the stalk rolls 210, 220 are comprised of interchangeable modular body segments 270 in the form of steel plates 270-1, 270-2, 270-3, 270-4, which, when assembled, form radially spaced longitudinally disposed flutes 240 (FIG. 26). One or both of the main bodies 212, 222 may include one or more knife blades 250 spaced longitudinally along their length and defining one or more knife planes normal to the axes of rotation 217, 227 of the stalk rolls 210, 220. Alternatively, one or more knife blades 250 may be utilized on only one of the stalk rolls 210, 220. In still other embodiments, no knife blades may be installed on either stalk roll 210, 220 if the operator wants the stalks to only be crushed or shredded and not severed into smaller stalk segments. In yet another alternative embodiment as shown in FIG. 49, two knife blades 250*a*, 250*b* are disposed on one stalk roll with their flat faces 254 spaced back-to-back and with a third knife blade 250*c* on the adjacent stalk roll disposed between the back-to-back blades 250*a*, 250*b*. In this embodiment, the third knife blade 250*c* has a beveled face 253 on both sides.

The embodiment of the stalk roll assembly 200 is depicted as being adapted for use on the type of row unit 30 produced by the Brazilian OEM, Vence Tudo, which utilizes stalk roll shafts 213, 223 (FIG. 25) supported by forward brackets 219, 229 which mount to frame members (not shown) of the row unit 30 to rotationally support the forward ends of the stalk rolls 210, 220 as opposed to the cantilevered configuration of the previous embodiment. However, it should be appreciated that the features of the stalk roll assembly 200 as described in more detail below are suitable for use with any OEM row unit and are adaptable to the particular stalk roll shaft configurations of such OEM's row units.

Figure 25:
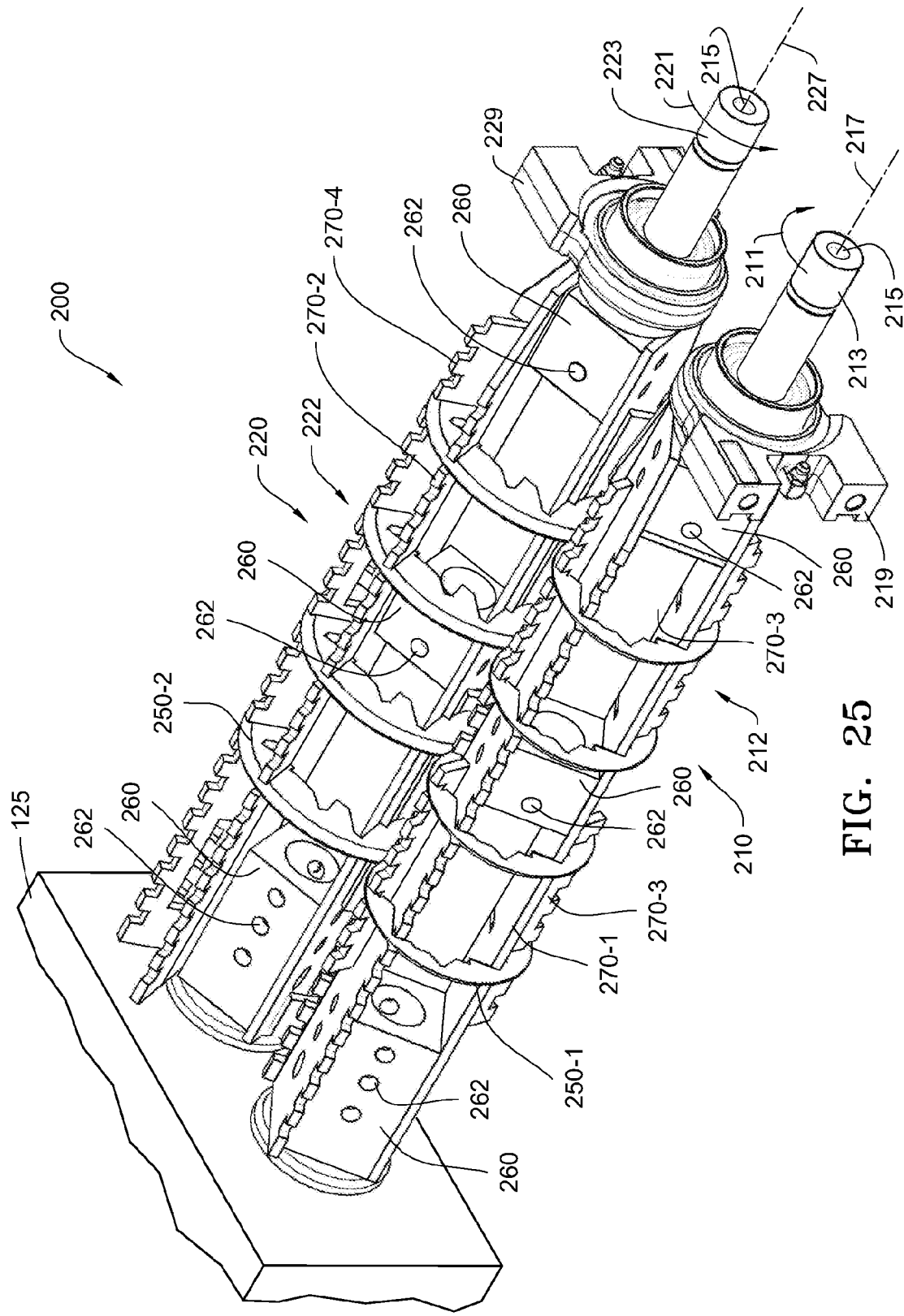
FIG. 25 is a perspective view of the differential speed stalk roll assembly of FIG. 24 with some of the modular body segments removed to show the interior of the stalk rolls.

The head 214, 224 may have helically arranged flights 216, 226 which function as augers to pull the cornstalk rearwardly between the main bodies 212, 222 as the stalk rolls rotate counter to one another as indicated by arrows 211, 221 (FIG. 25). As best viewed in FIG. 25, like the previous embodiment, each stalk roll 210, 220 receives and is rigidly secured to laterally spaced shafts 213, 223 coupled to the gearbox 125 which drives rotation of the shafts about their respective longitudinal axis 217, 227. The heads 214, 224 are attached to the shafts 213, 223 by bolts (not shown) or other suitable fastening means received in the open forward end of the heads 214, 224 and into the internally threaded bore 215 in the forward end of the shafts 213, 223. Alternatively, the heads 214, 224 may be secured to the shafts 213, 223 by threaded fasteners or roll pins extending through apertures (not shown) in the heads and into the shafts 213, 223 transverse to the shaft axis 217, 227.

Figure 27:
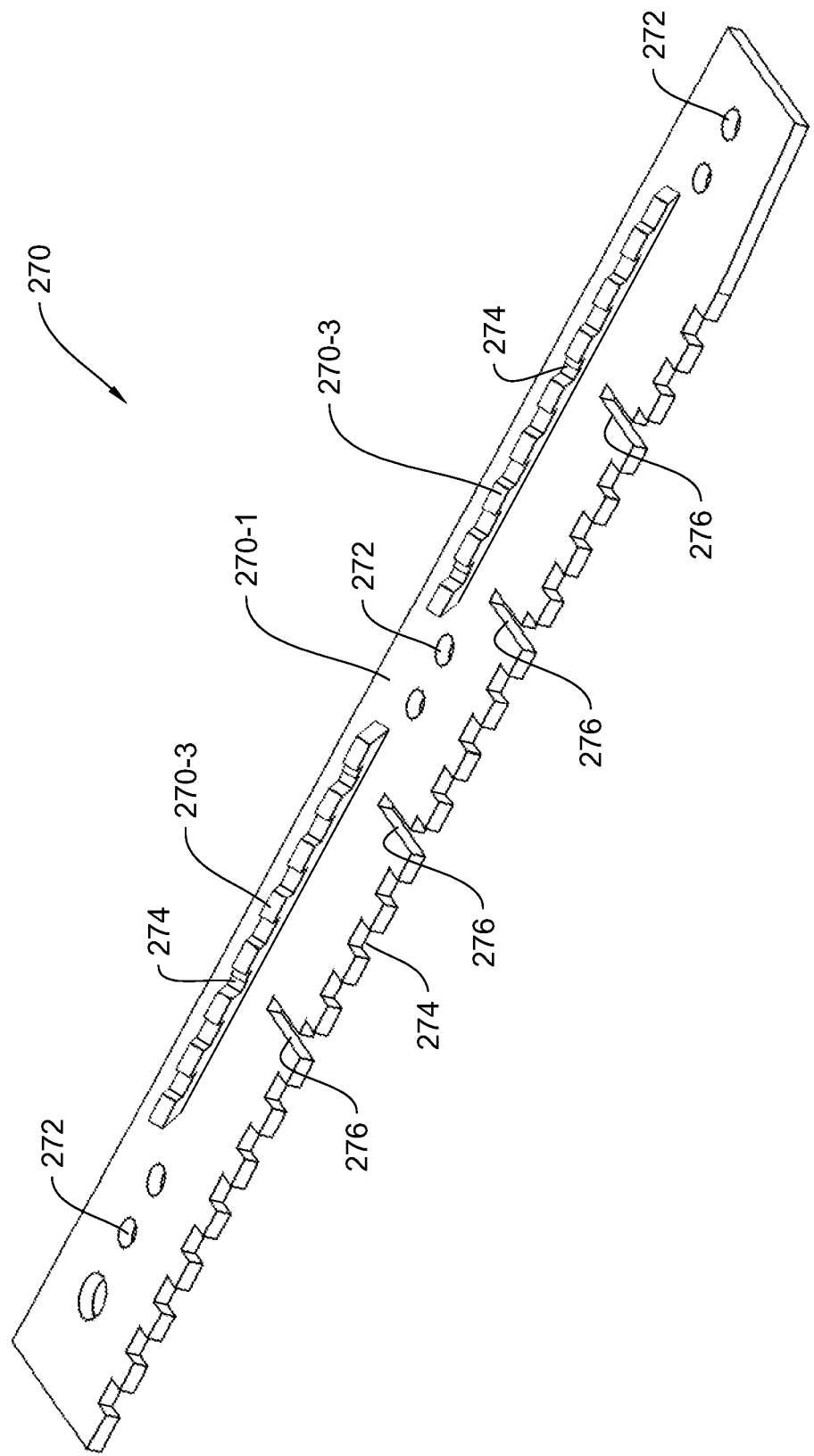
FIG. 27 is a perspective view of an embodiment the body segments of the smaller diameter stalk roll with intermediate plates attached thereto
Figure 28:
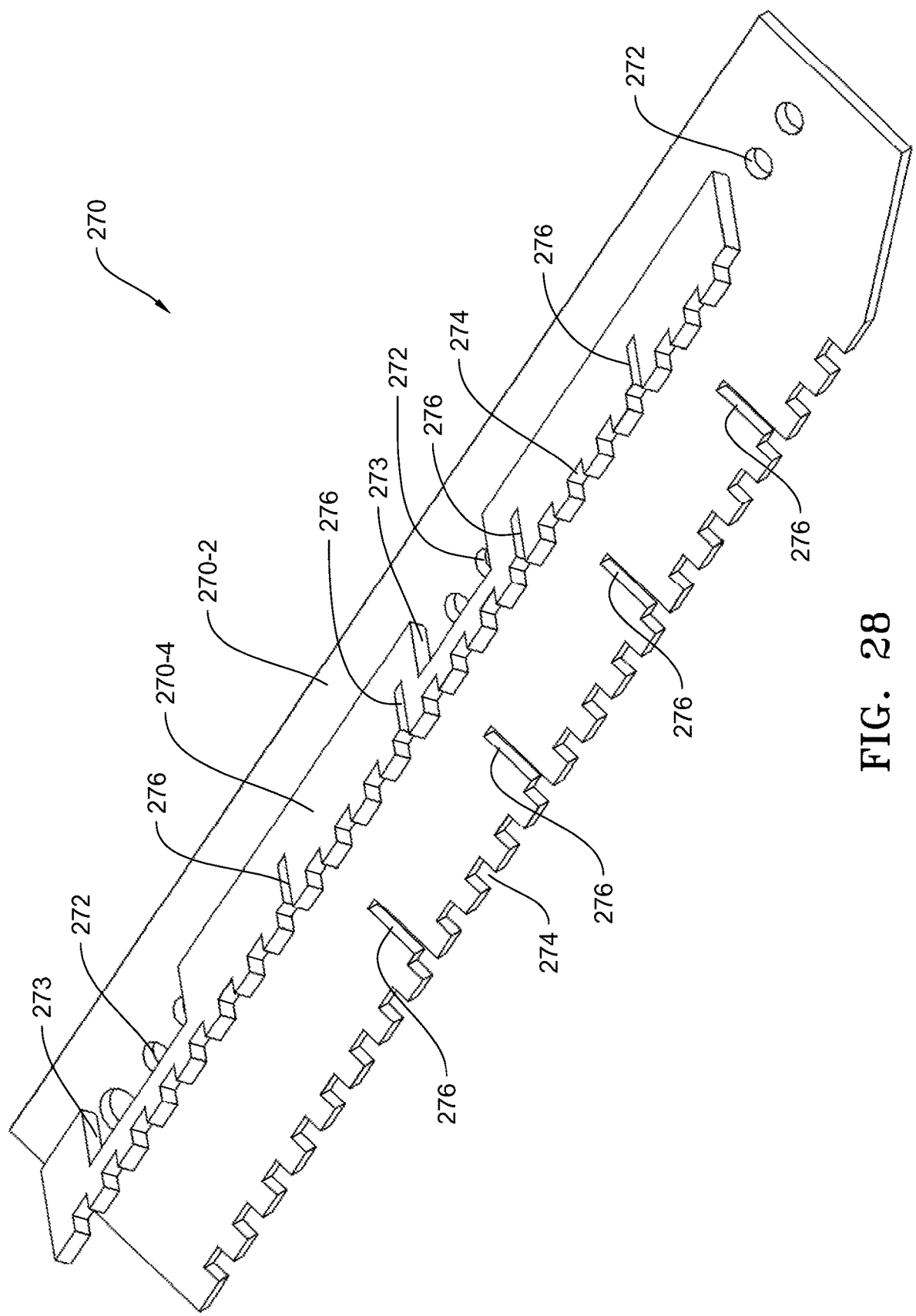
FIG. 28 is a perspective view of an embodiment the body segments of the larger diameter stalk roll with intermediate plates attached thereto.
Figure 30C:
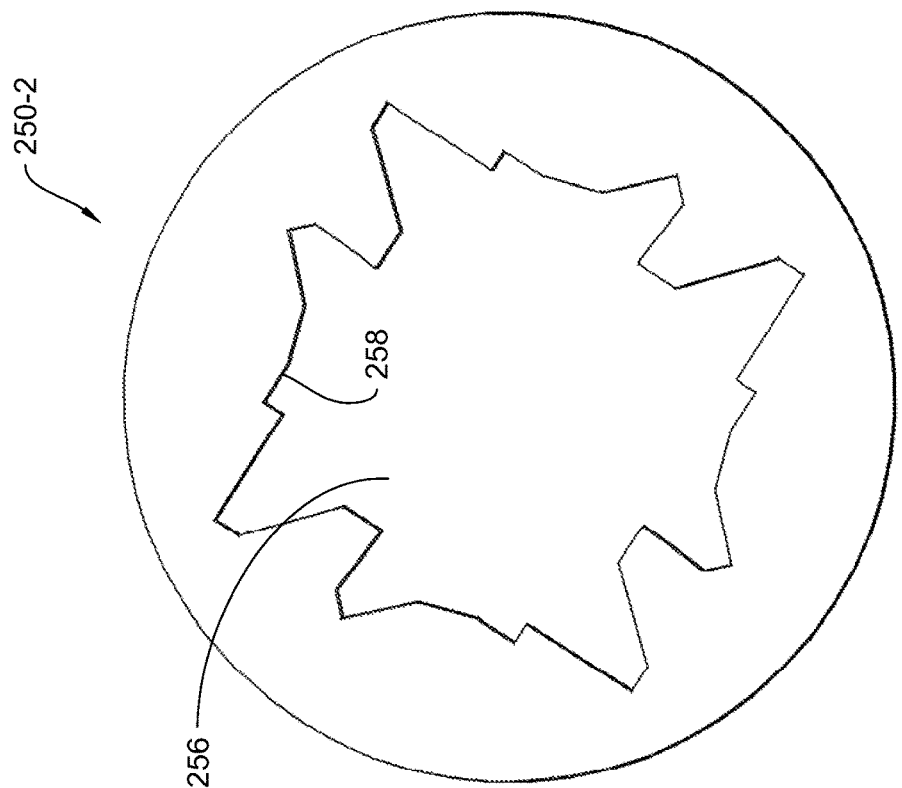
FIGS. 30A-30C are perspective and plan views of the annular knife of the larger diameter stalk roll of FIG. 24.
Figure 30A:
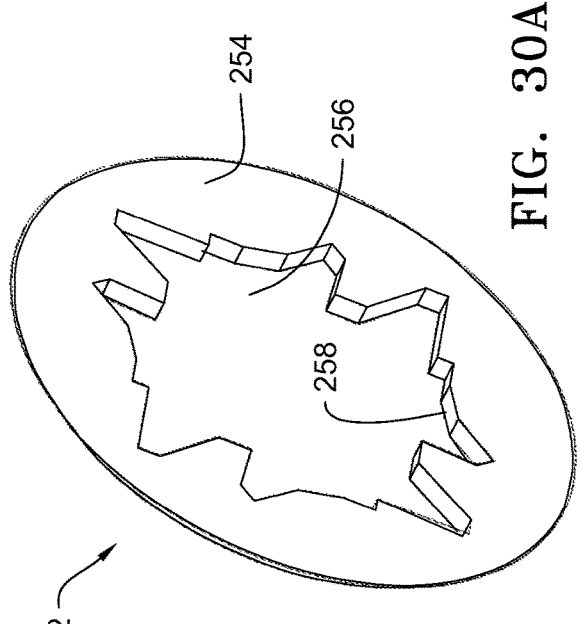
Figure 30B:
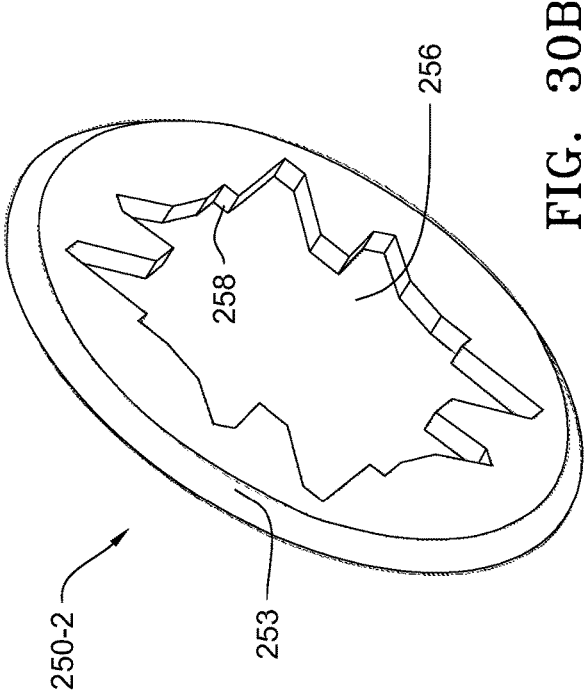

Continuing to refer to FIG. 25, it should be appreciated that one of the modular body segments 270 is removed to show the interior of each of the stalk rolls 210, 220. Referring to FIGS. 25 and 27-28, the body segment plates 270-1, 270-2 include apertures 272 which align with mating apertures 262 of internal blocks 260 disposed at the rearward, intermediate and forward ends of the stalk rolls 210, 220. Bolts (not shown) threadably secure the steel plates 270-1, 270-2 to the blocks 260 through the apertures 272, which align with internally threaded apertures 262 in the blocks 260. The blocks 260 at the rearward ends are rotationally fixed to the shafts 213, 223 so as to rotate therewith. The blocks 260 at the forward end are rotationally fixed to shafts 213, 223 rotationally supported by the forward brackets 219, 229. The blocks 260 may have three, four, five, six, seven, eight or more sides depending on the desired configuration of the stalk rolls 210, 220 and the modular body segments 270 will vary in shape accordingly. As best viewed in FIG. 26, in one embodiment, the stalk roll 210 comprises four modular segments 270-1*a*, 270-1*b*, 270-1*c*, 270-1*d* secured to each side of the four sided block 260. Likewise the stalk roll 220 comprises four modular segments 270-2*a*, 270-2*b*, 270-2*c*, 270-2*d* secured to each side of the four sided block 260.

FIG. 27 is a perspective view of an embodiment of the modular body segment plates 270-1 of the first stalk roll 210. FIG. 28 is a perspective view of an embodiment of the modular body segment plates 270-2 of the second stalk roll 220. The modular body segment plates 270-1, 270-2 may have intermediate plates 270-3, 270-4 welded at an angle thereto such that when the body segment plates 270-1, 270-2 are mounted to the blocks 260 as shown in cross-sectional view of FIG. 26, the outer ends of the body segment plates 270-1, 270-2, 270-3, 270-4 form substantially equally radially spaced flutes 240. The lengths of the intermediate plates 270-3, 270-4 are sized to avoid interference with the bolts securing the plates 270-1, 270-2 to the blocks 260. Alternatively, the intermediate plates 270-1, 270-2 may include cutouts 273 so the bolts can be inserted or removed without interference.

The plate segments 270-1 comprising the first stalk roll body 212 have a substantially uniform width from the rearward end to the forward end until slightly tapering to a narrower width at the forward most end (see FIG. 27). The plate segments 270-2 comprising the second stalk roll body 222 also have a substantially uniform width from rearward end to the forward end until tapering at a sharper slope at the forward most end (see FIG. 28). The different widths of the plates 270-1, 270-2 result in the first stalk roll body 212 having a smaller diameter (as defined by circumscribing a circle around the outermost ends of radially spaced plates 270-1) than the diameter of second stalk roll body 222 (as defined by circumscribing a circle around the outermost ends of radially spaced plates 270-2). This difference in diameters between the first and second stalk roll bodies 212, 222 results in a differential speed between the first and second stalk rolls 210, 220 which produces the desired shredding of the cornstalks 16 during harvesting as described above in connection with the stalk roll assembly 100. It should also be appreciated that the tapered forward most ends of the plate segments 270-1, 270-2 results in a wider spacing between the flutes 240 of the stalk roll bodies 212, 222 at the forward end, such that the larger diameter portions of the cornstalks toward the ground surface are able to feed more readily into the stalk roll assembly 200. Additionally, the tapered forward ends of the stalk roll bodies 212, 222 results in less of a differential speed between the first and second stalk rolls 210, 220 at their forward most ends which also allows the cornstalks to enter the stalk roll assembly 200 before the action of the differential speeds becomes aggressive.

The outer ends of the body segment plates 270-1, 270-2, 270-3, 270-4 forming the radially spaced longitudinal flutes 240 may include notches or teeth 274 which serve to bite into or grip the cornstalk as the flutes rotate to pull the cornstalk downwardly toward the stripper plates 40, 42 for stripping the ears 14 from the stalks 16. As the teeth 274 grip and bite into the stalks, the differential speeds of the rotating stalk rolls rip, shred and crush the stalks as the stalks pass between the outer peripheries or outer surfaces of the adjacent stalk rolls. As with the previous embodiments, the spacing, width, depth and shape of the notches 274 may vary among the modular body segments so the appropriate body segment may be selected and interchanged depending on crop moisture levels, brittleness of the stalks, weather and other crop conditions. For example rather than square notches, the notches may be v-shaped to form pointed teeth, or the notches may be rounded or any combination thereof. Additionally, the plates may be bent along the length of the notched end thereby forming hooked flutes.

It should be appreciated that in embodiments in which the lateral spacing of the stalk rolls 210, 220 and the size of the respective body segments 270 are such that the flutes 240 of the first and second stalk rolls 210, 220 overlap one another, the number of flutes 240 and the radial spacing of the flutes may be matched and oriented such that the flutes are timed to avoid the flutes contacting or interfering with one another as they rotate. Additionally, or alternatively, as shown in FIG. 48, the teeth 274 of the flutes 240 of one of the stalk rolls may be longitudinally offset with the teeth 274 of the flutes 240 of the adjacent stalk roll such that the teeth of one of the stalk rolls are received within the valleys 273 between the teeth of the adjacent stalk roll, resulting in "interlocking" teeth. As shown in FIG. 48, one of the stalk rolls has narrower teeth 274a with wider valleys 273a and the other stalk roll as wider teeth 274b with narrower valleys 273b. As the interlocking teeth rotate past one another, the narrower teeth 274a are received within the narrower valleys 273b of the adjacent stalk roll and the wider teeth 274b are received in the wider valleys 273a of the adjacent stalk roll.

FIGS. 29A-29C and FIGS. 30A-30C show embodiments of the knife blades 250-1, 250-2 for the stalk rolls 210, 220. In this embodiment, the respective knife blades 250-1, 250-2 are shown as having an outer diameter that is substantially the same as the outermost circumscribed diameter of the respective stalk roll bodies 212, 222. Each knife 250-1, 250-2 has a beveled face 253 and a flat face 254. As best viewed in FIGS. 24-26, the knife blades are oriented on the respective stalk rolls such that their flat faces 254 are back-to-back thereby forming a cutting plane. Each knife 250-1, 250-2 has an aperture 256 with an internal periphery 258. The internal peripheries 258 are configured to permit the body segments 270-1, 270-2, 270-3, 270-4 to be inserted through the apertures 256 one at a time and rotated in place. For example, when assembling the first stalk roll body 212, one body segment 270-1a is first bolted to the blocks 260. The knife blades 250-1 are placed over the forward end of the shaft 213 and the first plate 270-1a through the apertures 256 of the knife blades 250-1 and the knife blades 250-1 are then fitted into the slots 276 of the first plate 270-1a. The second plate 270-1b is inserted through the apertures 256 of each of the knife blades 250-1 and rotated in place with the knife blades 250-1 received in the slots 276 of the second plate 270-1b. Each additional body segment 270-1c, 270-1d is sequentially inserted through the blade apertures 256 and rotated into place with each of the knife blades 250-1 being received within the slots 276 of the body segments 270-1c, 270-1d. Each body segment 270-1 is bolted to the blocks 260 through the aligned apertures 272 in the plates with the apertures 262 in the blocks 260 on the first shaft 213. The same process is repeated for the second stalk roll 220 to secure the plates 270-2a, 270-2b, 270-2c, 270-2d and the knife blades 250-2 to the blocks 260 on the second shaft 223.

Figure 54:
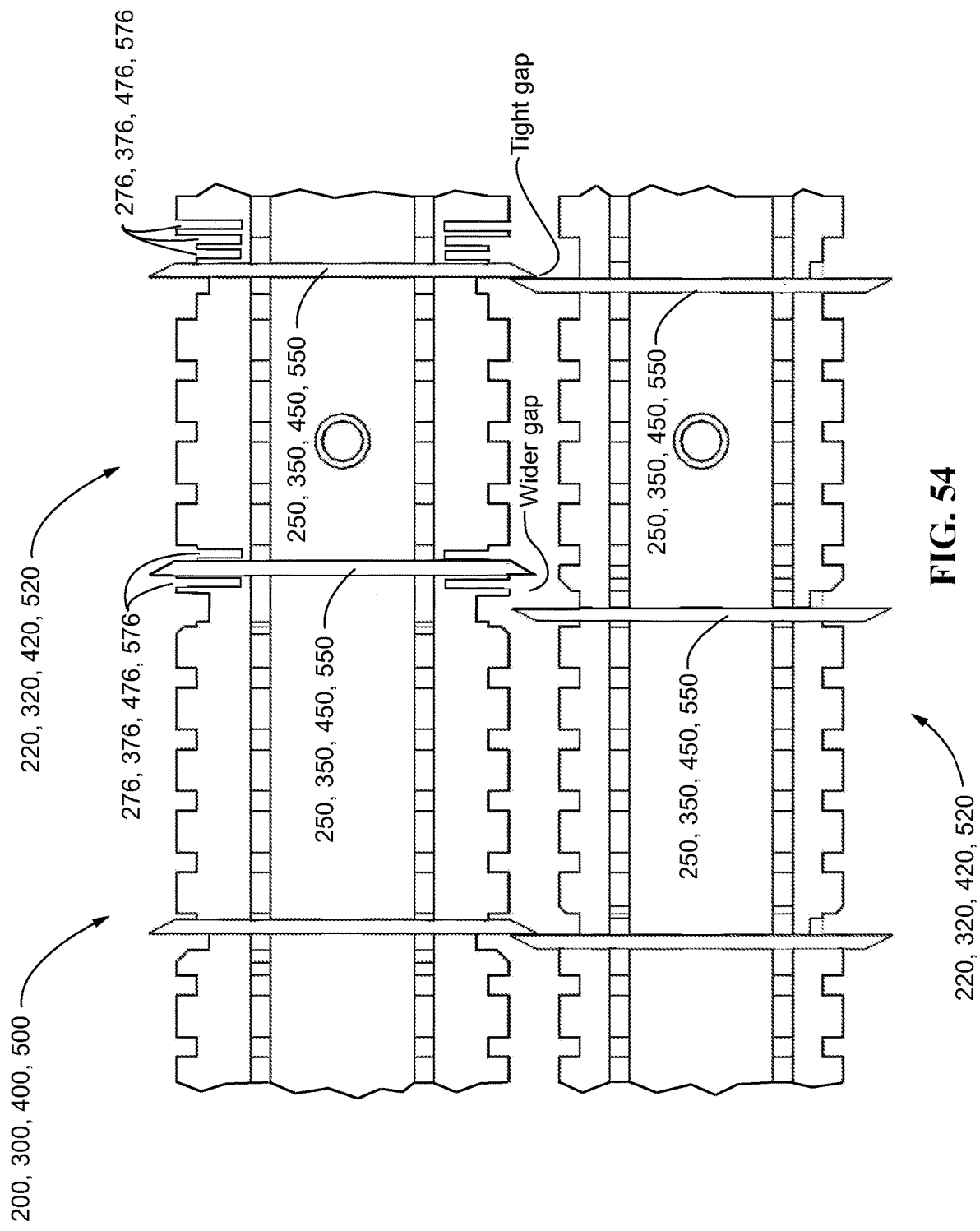
FIG. 54 is a top plan view of an embodiment of the stalk roll assemblies show an embodiment for providing an adjustable longitudinal gap between knife blades.

It may be desirable to be able to adjust or vary the gap between the knife blades 250 of the adjacent stalk roll bodies 212, 222 thereby allowing the operator to choose between a very tight gap or a wider gap. The gap may be a lateral gap (i.e., a gap laterally between the outer diameters of the opposing blades) or the gap may be a longitudinal gap (i.e., a gap longitudinally between the back-to-back spacing of the opposing blades). A tight gap (either laterally or longitudinally) will result in complete cutting or severing the stalk into individual pieces, whereas a wider gap (either laterally or longitundinally) which will only partially cut or sever the stalk resulting in a "chain" of partially severed stalk pieces. The gaps between knife blades may vary along the length of the stalk roll. The lateral gaps between the knife blades can be achieved by selecting from different diameters of knife blades 250 and selecting from corresponding modular body segments 270 having different depths of slots 276. The longitudinal gaps between the knife blades can be achieved by moving one of the knife blades longitudinally from the opposing knife blade on the adjacent stalk roll. To provide such longitudinal gaps, the modular body segments 270 may have a series of longitudinally spaced slots 276 as shown in FIG. 54, which allows the operator to place one of the knife blades in one of the series of longitudinally spaced slots to achieve the desired gap between the back-to-back knife blades 250.

Figure 31:
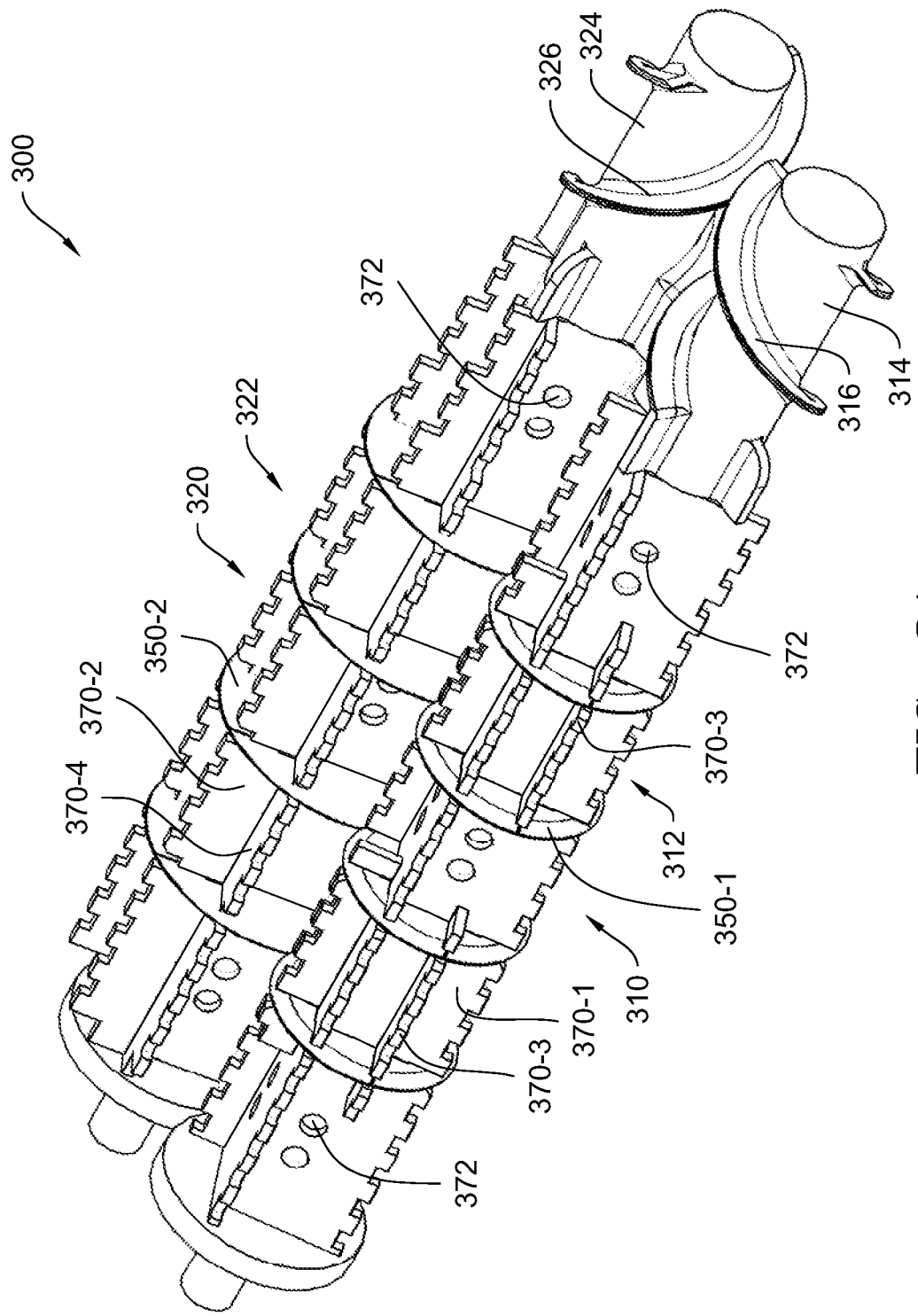
FIG. 31 is a front perspective view of another embodiment of a differential speed stalk roll assembly.
Figure 33:
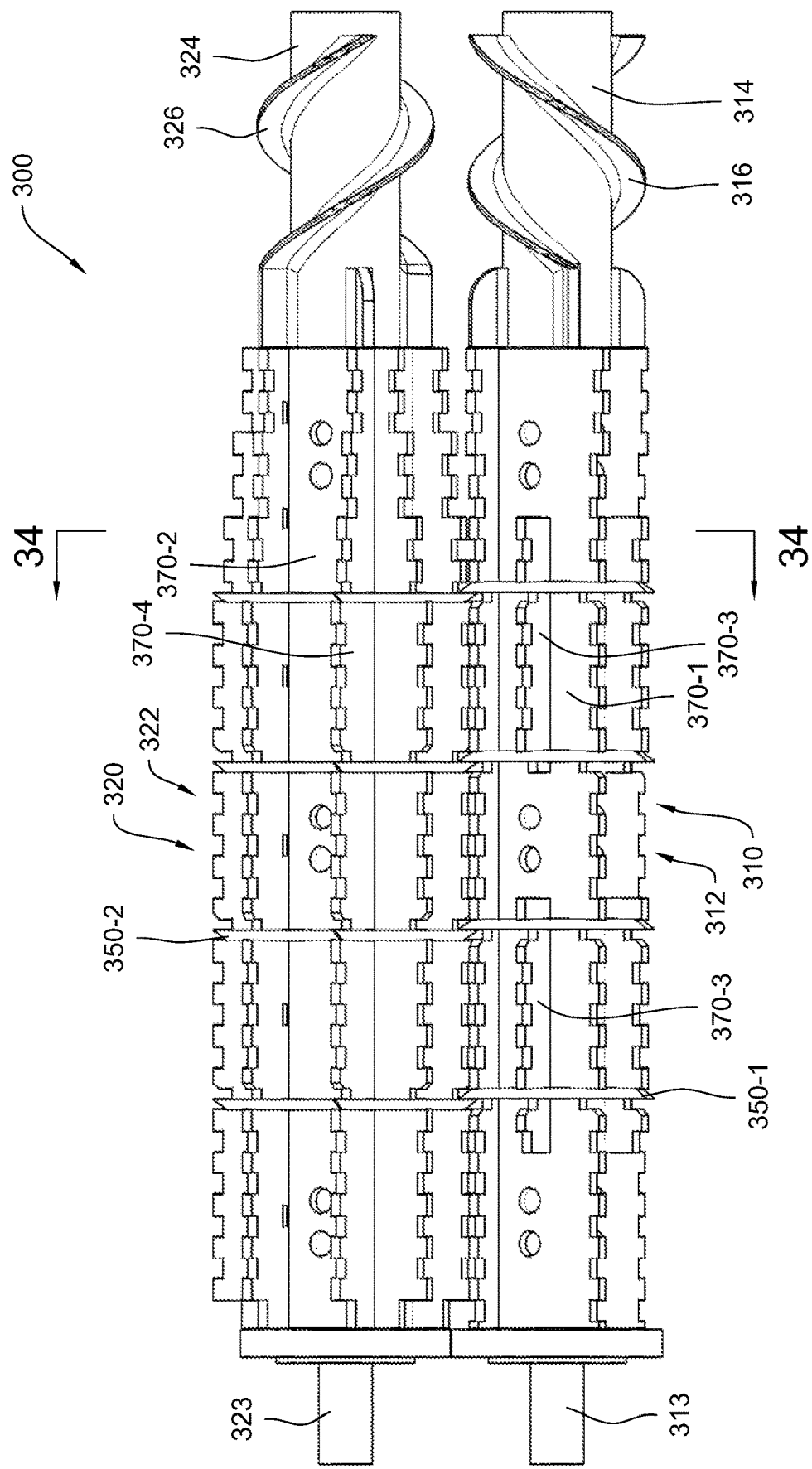
FIG. 33 is a top plan view of the stalk roll assembly of FIG. 31.
Figure 34:
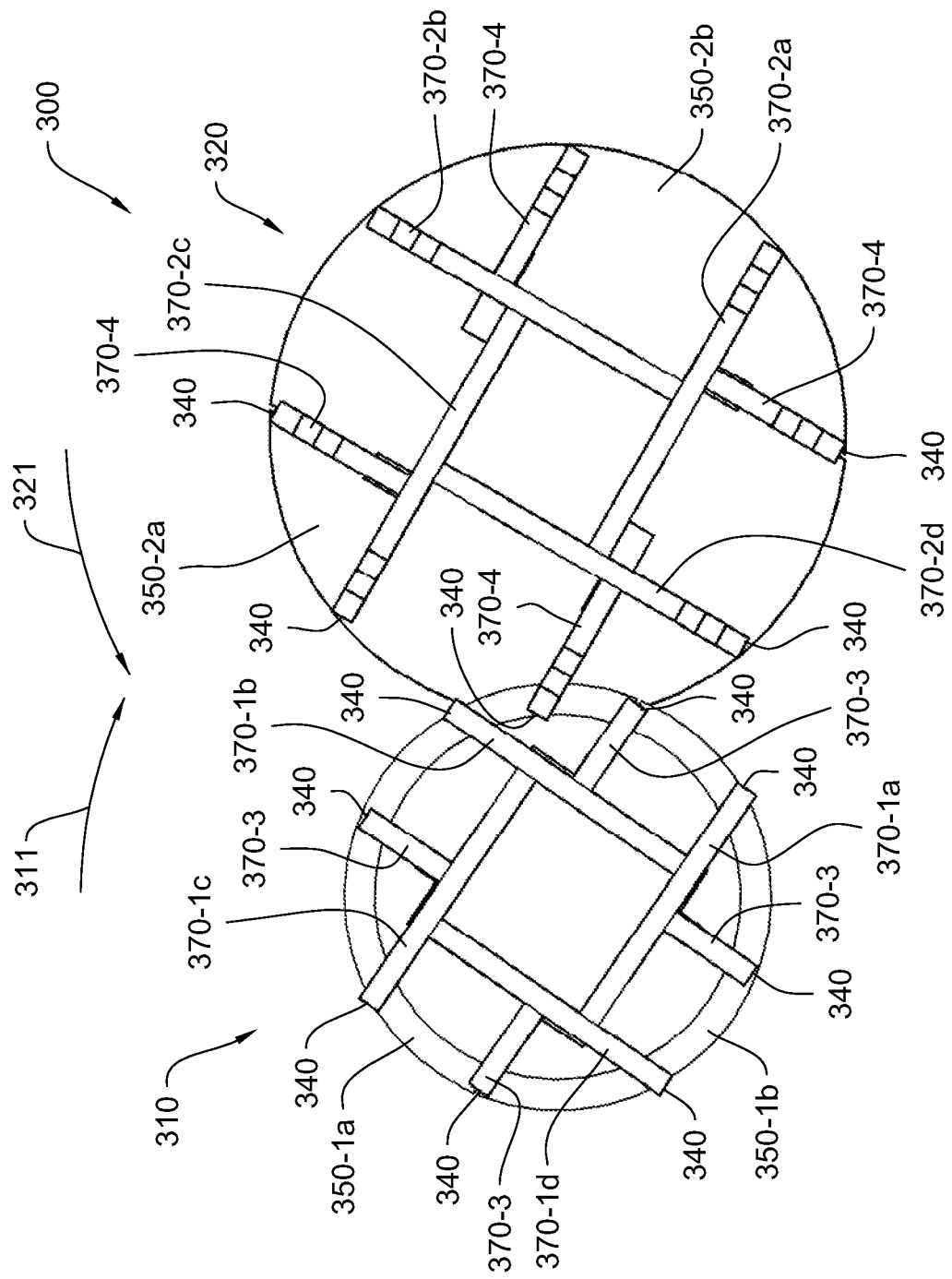
FIG. 34 is a cross-sectional view of the stalk roll assembly as viewed along lines 34-34 of FIG. 33

FIG. 31 is a front perspective view of another embodiment of a differential speed stalk roll assembly 300. FIG. 33 is a top plan view of the stalk roll assembly of FIG. 31. FIG. 34 is cross-sectional view of the differential speed stalk roll assembly 300 as viewed along lines 34-34 of FIG. 33. As with the previous embodiments, the stalk roll assembly 300 comprises first and second laterally spaced stalk rolls 310, 320 each having a main body 312, 322 and a head or nose 314, 324. In this embodiment, the main bodies 312, 322 of the stalk rolls 310, 320 are also comprised of interchangeable modular body segments 370 in the form of steel plates 370-1, 370-2, 370-3, 370-4, which when assembled form radially spaced longitudinally disposed flutes 340. As in the previous embodiments, one or both of the main bodies 312, 322 may include one or more knife blades 350 spaced longitudinally along their length and defining one or more knife planes normal to the axes of rotation 313, 323 of the main bodies 312, 322. Alternatively, one or more knife blades 350 may be utilized on only one of the stalk rolls 310, 320. In still other embodiments, no knife blades may be installed on either stalk roll 310, 320 if the operator wants the stalks to only be crushed or shredded and not severed into smaller stalk segments. In yet another alternative embodiment as shown in FIG. 49, two knife blades 350a, 350b are disposed on one stalk roll with their flat faces 354 spaced back-to-back and with a third knife blade 350c on the adjacent stalk roll disposed between the back-to-back blades 350a, 350b. In this embodiment, the third knife blade 350c has a beveled face 353 on both sides.

Figure 32:
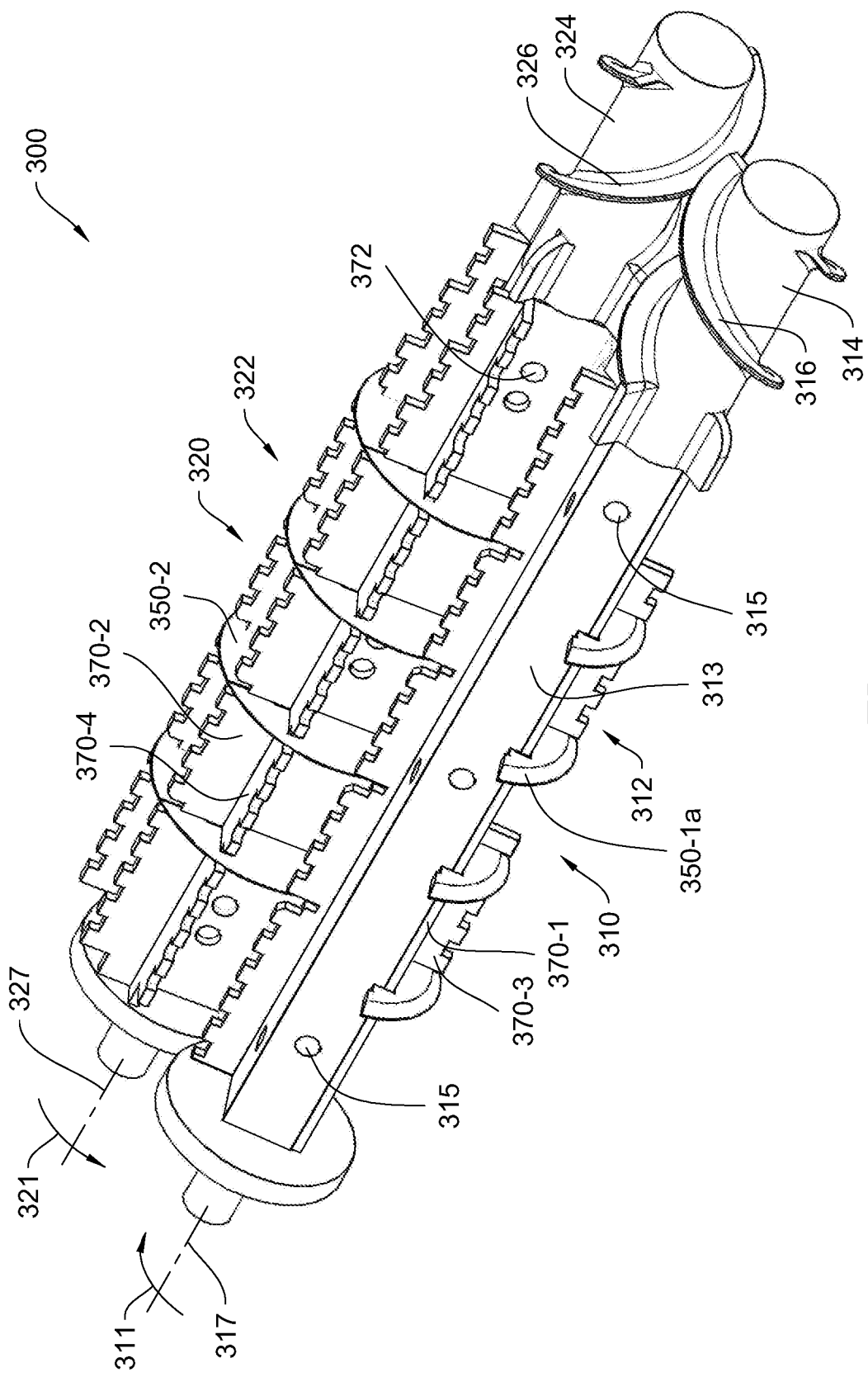
FIG. 32 is a perspective view of the differential speed stalk roll assembly of FIG. 31 with some of the modular body segments removed to show the interior of the stalk rolls.

The embodiment of the stalk roll assembly 300 is depicted as being adapted for use on the type of row unit 30 produced by the German OEM, Geringhoff, which utilizes square stalk roll shafts 313, 323 (FIG. 32). Again, it should be appreciated that the features of the stalk roll assembly 300 as described in more detail below are suitable for use with any OEM row unit and are adaptable to the particular stalk roll shaft configurations of such OEM row units.

The head 314, 324 may have helically arranged flights 316, 326 which function as augers to pull the cornstalk rearwardly between the main bodies 312, 322 as the stalk rolls rotate counter to one another as indicated by arrows 311, 321. As best viewed in FIG. 32, like the previous embodiment, each stalk roll 310, 320 receives and is rigidly secured to laterally spaced shafts 313, 323 coupled to the gearbox 125 which drives rotation of the shafts about their respective longitudinal axis 317, 327. The heads 314, 324 are attached to the shafts 313, 323 by bolts (not shown) or other suitable fastening means received in the open forward end of the heads 314, 324 and into the internally threaded bore (not shown) in the forward end of the shafts 313, 323. Alternatively, the heads 314, 324 may be secured to the shafts 313, 323 by threaded fasteners or roll pins extending through apertures (not shown) in the heads and into the shafts 313, 323 transverse to the shaft axis 317, 327.

Continuing to refer to FIG. 32, it should be appreciated that one of the modular body segment plates 370 is removed to show the interior of the smaller diameter stalk roll 310. The interior of the larger diameter stalk roll 320 is the same. Referring to FIGS. 31-38, the body segment plates 370-1, 370-2 include apertures 372 which align with mating apertures 315 of the stalk roll shafts 313, 323. Nuts and bolts (not shown) threadably secure the steel plates 370-1, 370-2 to the stalk roll shafts 313, 323 through the apertures 372 in the plates and apertures 315 in the stalk roll shafts 313, 323. As best viewed in FIG. 34, in one embodiment, the stalk roll 310 comprises four modular segments 370-1a, 370-1b, 370-1c, 370-1d secured to each side of the four-sided stalk roll shaft 313. Likewise the stalk roll 320 comprises four modular segments 370-2a, 370-2b, 370-2c, 370-2d secured to each side of the four-sided stalk roll shaft 323. It should be appreciated that if the OEM stalk roll shafts 313, 323 had a different number of sides, the size and shape of the modular body segments plates 370 would be sized and configured accordingly.

Figure 35:
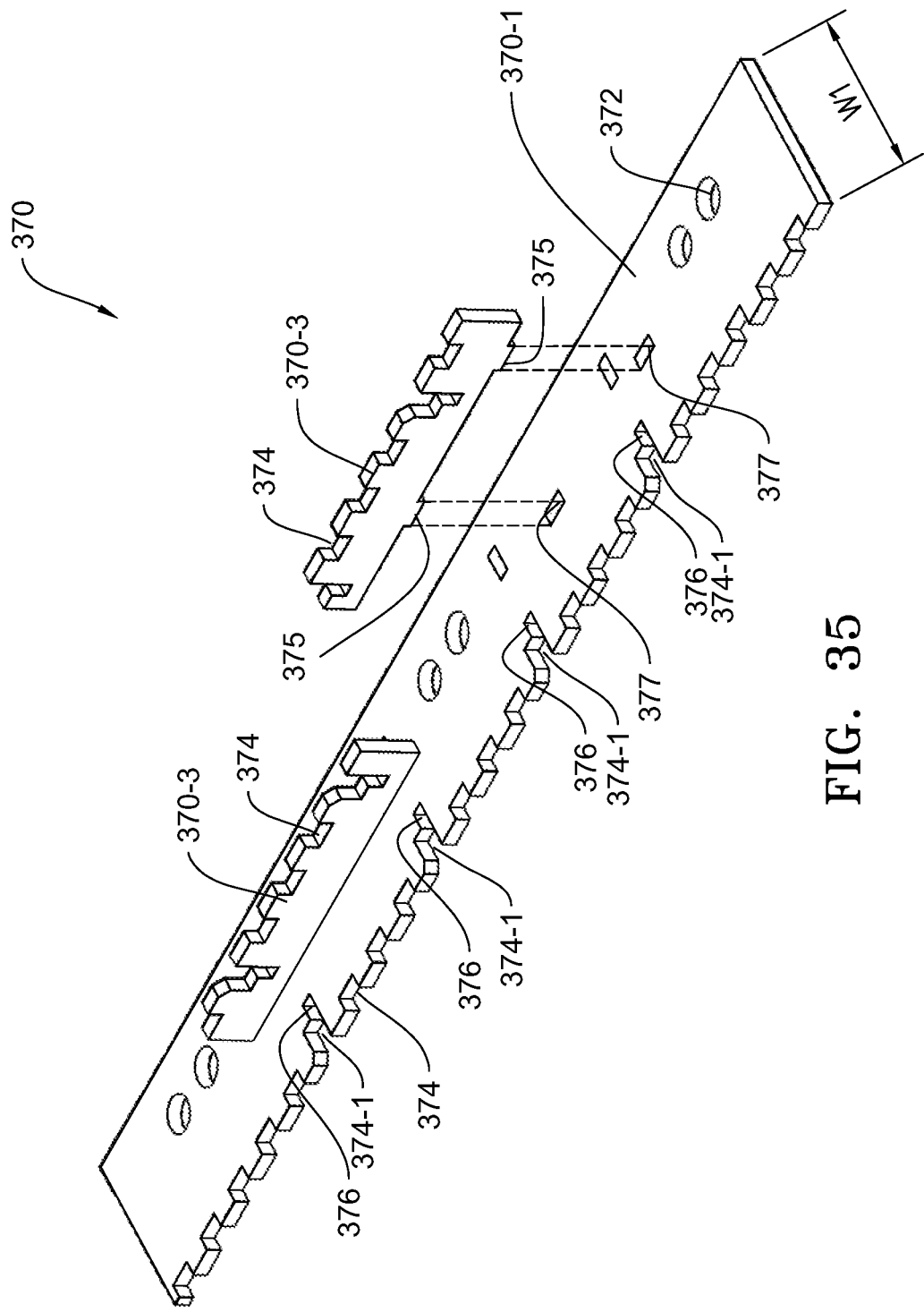
FIG. 35 is a perspective view of an embodiment the body segments of the smaller diameter stalk roll with intermediate plates attached thereto
Figure 38A:
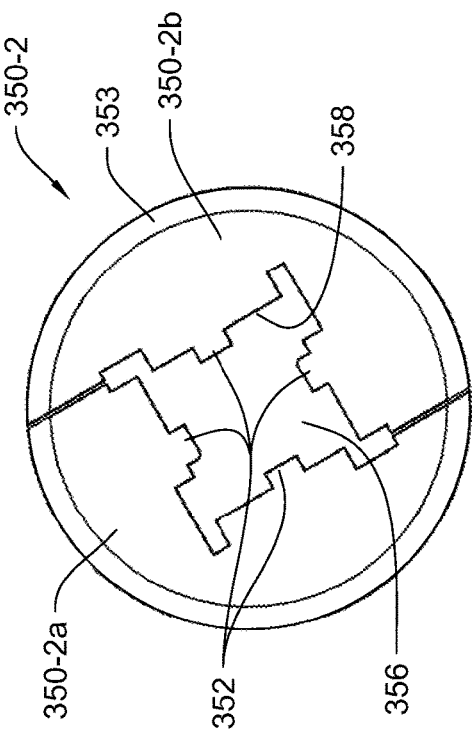
FIG. 38A is a front elevation view of an embodiment of the knife blade of the larger diameter stalk roll of FIG. 31 showing the knife blade segments together.
Figure 38B:
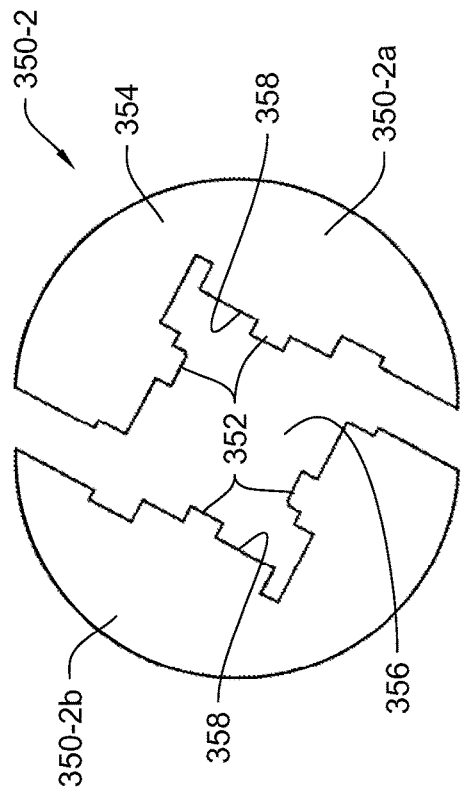
FIG. 38B is a rear elevation view of the knife blade segments of FIG. 38A shown separated.
Figure 37A:
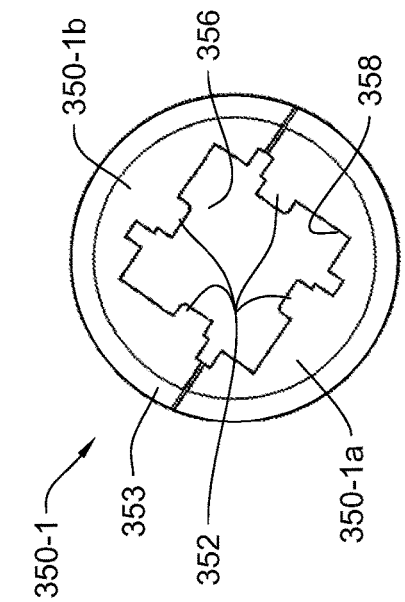
FIG. 37A is a front elevation view of an embodiment of the knife blade of the smaller diameter stalk roll of FIG. 31 showing the knife blade segments together.
Figure 37B:
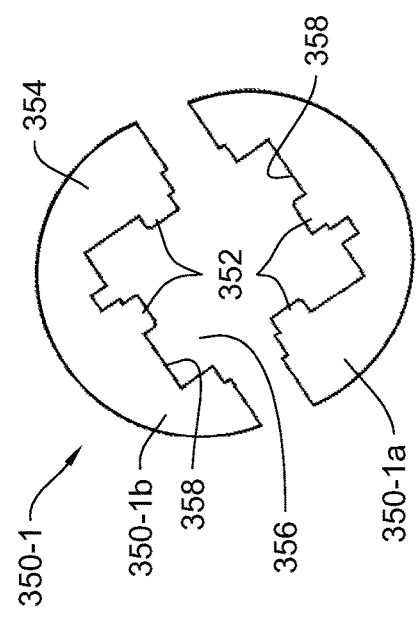
FIG. 37B is a rear elevation view of the knife blade segments of FIG. 37A shown separated.

FIG. 35 is a perspective view of an embodiment of the modular body segment plates 370-1 of the first stalk roll 310. FIG. 36 is a perspective view of an embodiment of the modular body segment plates 370-2 of the second stalk roll 320. The modular body segment plates 370-1, 370-2 may have intermediate plates 370-3, 370-4 welded thereto such that when the body segment plates 370-1, 370-2 are mounted to the stalk roll shafts 313, 323 as shown in cross-sectional view of FIG. 34, the outer ends of the body segment plates 370-1 and 370-3 and the outer ends of body segment plates 370-2, 370-4 are substantially equally radially spaced. The lengths of the intermediate plates 370-3, 370-4 are sized to avoid interference with the bolts securing the plates 370-1, 370-2 to the stalk roll shafts 313, 323. To aid in proper placement of the intermediate plates 370-3, 370-4 onto the respective main body plates 370-1, 370-2, the intermediate plates 370-3, 370-4 may include tabs 375 which are received within mating longitudinal openings 377 in the main body plates 370-1, 370-2. The body segment plates 370-1, 370-2 also include transverse slots 379 for receiving tabs 352 of the blades 350 as discussed later.

The plate segments 370-1 comprising the first stalk roll body 312 have a substantially uniform width from the rearward end to the forward end (see FIG. 35). The plate segments 370-2 comprising the second stalk roll body 322 also have a substantially uniform width from rearward end to the forward end until tapering toward the forward most end (see FIG. 36). The different widths of the plates 370-1, 370-2 result in the first stalk roll body 312 having a smaller diameter (as defined by circumscribing a circle around the outermost ends of radially spaced plates 370-1) than the diameter of second stalk roll body 322 (as defined by circumscribing a circle around the outermost ends of radially spaced plates 370-2). This difference in diameters between the first and second stalk roll bodies 312, 322 results in a differential speed between the first and second stalk rolls 310, 320 which produces the desired shredding of the cornstalks 16 during harvesting as described above in connection with the stalk roll assembly 100. It should also be appreciated that the tapered forward most end of the plate segments 370-2 results in a wider spacing between the flutes 340 of the stalk roll bodies 312, 322 at the forward end, such that the larger diameter portions of the cornstalks toward the ground surface are able to feed more readily into the stalk roll assembly 300. Additionally, the tapered forward end of the stalk roll body 322 results in less of a differential speed between the first and second stalk rolls 310, 320 at their forward most ends which also allows the cornstalks to enter the stalk roll assembly 300 before the action of the differential speeds becomes aggressive.

For example, referring to FIGS. 33, 35 and 36, it may be desirable for the first and second stalk rolls 310, 320 to have the same diameters or about the same diameters at their forward ends such that there is more space between the opposing flutes at the forward end to receive the larger diameter portion of the cornstalks 16 as they enter the stalk roll assembly 300 and such that there is minimal or no differential speed between the stalk rolls at the initial point of entry. But after the initial entry, the diameter of the second stalk roll 320 increases longitudinally rearwardly, in either a gradually increasing taper or a stepped taper until reaching the desired diameter to produce the desired differential speed between the adjacent stalk roll bodies 312, 322. Accordingly, as best shown in FIG. 36, the forward end of the plate segment 370-2 for the second stalk roll 320 is shown as having an initial width "W2" that is substantially the same as the width "W1" (FIG. 35) of the plate segment 370-1 of the first stalk roll 310, and then the plate segment 370-2 gradually increases in width rearwardly in a stepped taper configuration.

Continuing to refer to FIGS. 35 and 36, the outer ends of the body segment plates 370-1, 370-2, 370-3, 370-4 forming the radially spaced longitudinal flutes 340 may include notches or teeth 374 which serve to bite into or grip the cornstalk as the flutes rotate to pull the cornstalk downwardly toward the stripper plates 40, 42 for stripping the ears 14 from the stalks 16. As the teeth 374 grip and bite into the stalks, the differential speeds of the rotating stalk rolls rip, shred and crush the stalks as the stalks pass between the outer peripheries or outer surfaces of the adjacent stalk rolls. As with the previous embodiments, the spacing, width, depth and shape of the notches 374 may vary among the modular body segments so the appropriate body segment may be selected and interchanged depending on crop moisture levels, brittleness of the stalks, weather and other crop conditions. For example rather than square notches, the notches may be v-shaped to form pointed teeth, or the notches may be rounded or any combination thereof. Additionally, the plates may be bent along the length of the notched end thereby forming hooked flutes.

It should be appreciated that in embodiments in which the lateral spacing of the stalk rolls 310, 320 and the size of the respective body segments 370 are such that the flutes 340 of the first and second stalk rolls 310, 320 overlap one another, the number of flutes 340 and the radial spacing of the flutes may be matched and oriented such that the flutes are timed to avoid the flutes contacting or interfering with one another as they rotate. Additionally, or alternatively, as shown in FIG. 48, the teeth 374 of the flutes 340 of one of the stalk rolls may be longitudinally offset with the teeth 374 of the flutes 340 of the adjacent stalk roll such that the teeth of one of the stalk rolls are received within the valleys 373 between the teeth of the adjacent stalk roll, resulting in "interlocking" teeth. As shown in FIG. 48, one of the stalk rolls has narrower teeth 374a with wider valleys 373a and the other stalk roll as wider teeth 374b with narrower valleys 373b. As the interlocking teeth rotate past one another, the narrower teeth 374a are received within the narrower valleys 373b of the adjacent stalk roll and the wider teeth 374b are received in the wider valleys 373a of the adjacent stalk roll.

FIGS. 37A-37B and FIGS. 38A-38B show alternative embodiments of the knife blades 350-1, 350-2 for the stalk rolls 310, 320. In this embodiment, the knife blades 350-1, 350-2 are split into two half-segments 350-1a, 350-1b and 350-2a and 350-2b, respectively, to permit easier assembly of the stalk roll bodies 312, 322 as described below. In this embodiment, the respective knife blades 350-1, 350-2 are shown as having an outer diameter that is substantially the same as the outermost circumscribed diameter of the respective stalk roll bodies 312, 322. Each knife 350-1, 350-2 has a beveled face 353 and a flat face 354. As best viewed in FIG. 33, the knife blades are oriented on the respective stalk rolls such that their flat faces 354 are back-to-back thereby forming a cutting plane. Each knife 350-1, 350-2 has an aperture 356 with an internal periphery 358. The internal peripheries 358 are configured to receive the body segments 370-1, 370-2, 370-3, 370-4. Additionally, the interior peripheries 358 of the apertures 356 may include inwardly projecting tabs 352, which are received in mating transverse slots 379 in the plates 370-1, 370-2. The knife blades 350 are also received within slots 376 of the modular body segment plates 370-1, 370-2, 370-3, 370-4.

It should be appreciated that by splitting the knife blades into two mating half-segments, the stalk roll body segments 312, 322 are easier to assemble, by eliminating the need to insert the modular plate segments through the apertures of the full circle blades and rotating the body segments in place as described in connection with the stalk roll assembly 200 described above. For example, by splitting the blades 350 into two segments, two of the body segment plates 370-1a, 370-1b can be sub-assembled with half-blade segments 350-1a, and then that subassembly can be bolted to the stalk roll shaft 313. Then a second subassembly, comprising the other body segment plates 370-1c, 370-1d can be subassembled with the other half-blade segment 350-1b then bolted to the stalk roll shaft 313. Once bolted to the stalk roll shafts, and with the tabs 352 received within the transverse slots 379 and with the half-blade segments 350-1a, 350-1b, 350-2a, 350-2b received within the slots 376, the half-blade segments are rigidly fixed with respective to the stalk roll bodies 312, 322.

It has been found that it may be desirable for the blades 350-1, 350-2 of the adjacent stalk roll bodies 312, 322 to overlap one another back-to-back by ⅛ to ¼ inch (3 to 6 mm), to produce the desired pinch points or cutting planes 130 for cutting or severing the cornstalks 16. It should be appreciated that a plurality of longitudinally aligned knife blades 350 will form a plurality of pinch points or cutting planes substantially normal to the longitudinal axis 317, 327 of the shafts 313, 323. Referring to FIGS. 33-36, it should be appreciated that the modular plate segments 370-1, 370-2, 37-3, 370-4 include a partial notch 374-1, to avoid interference of the blades 350-1, 350-2 with the plate segments 370 of the adjacent stalk roll bodies 312, 322.

As in the previous embodiment, it may be desirable to be able to adjust or vary the gap between the knife blades 350 of the adjacent stalk roll bodies 312, 322 thereby allowing the operator to choose between a very tight gap or a wider gap. The gap may be a lateral gap (i.e., a gap laterally between the outer diameters of the opposing blades) or the gap may be a longitudinal gap (i.e., a gap longitudinally between the back-to-back spacing of the opposing blades). A tight gap (either laterally or longitudinally) will result in complete cutting or severing the stalk into individual pieces, whereas a wider gap (either laterally or longitundinally) which will only partially cut or sever the stalk resulting in a "chain" of partially severed stalk pieces. The gaps between knife blades may vary along the length of the stalk roll. The lateral gaps between the knife blades can be achieved by selecting from different diameters of knife blades 350 and selecting from corresponding modular body segments 370 having different depths of slots 376. The longitudinal gaps between the knife blades can be achieved by moving one of the knife blades longitudinally from the opposing knife blade on the adjacent stalk roll. To provide such longitudinal gaps, the modular body segments 370 may have a series of longitudinally spaced slots 376 as shown in FIG. 54, which allows the operator to place one of the knife blades in one of the series of longitudinally spaced slots to achieve the desired gap between the back-to-back knife blades 350.

Figure 39:
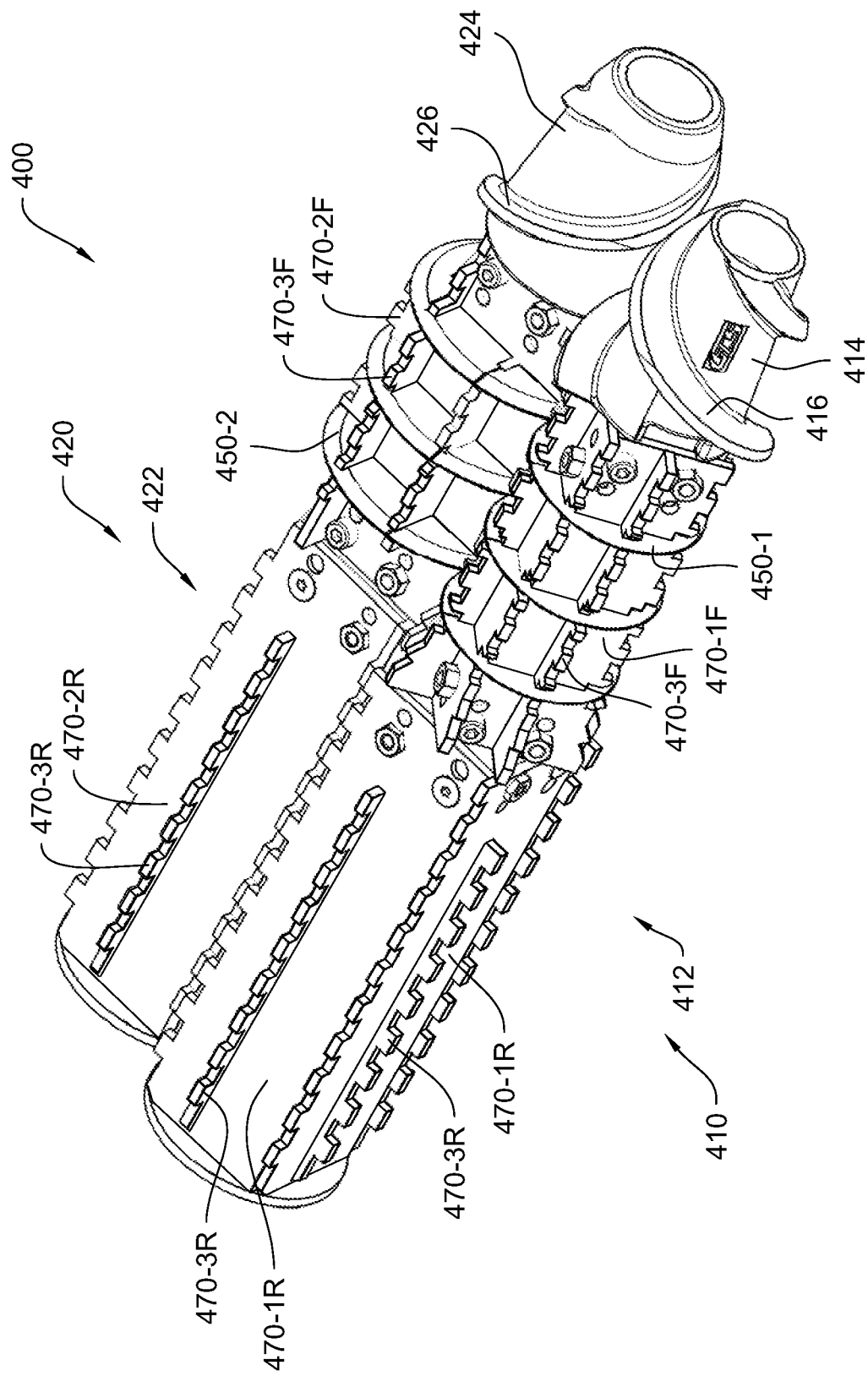
FIG. 39 is a front perspective view of another embodiment of a differential speed stalk roll assembly.

FIG. 39 is a front perspective view of another embodiment of a differential speed stalk roll assembly 400. As with the previous embodiments, this embodiment of the stalk roll assembly 400 comprise laterally spaced first and second stalk rolls 410, 420 each having a main body 412, 422 and a head or nose 414, 424. In this embodiment, the main bodies 412, 422 of the stalk rolls 410, 420 are also comprised of interchangeable modular body segments 470 in the form of steel plates, which when assembled form radially spaced longitudinally disposed flutes 440. As in the previously described embodiments, one or both of the main bodies 412, 422 may include one or more knife blades 450 spaced longitudinally along their length and defining one or more knife planes normal to the axes of rotation 417, 427 of the main bodies 412, 422. Alternatively, one or more knife blades 450 may be utilized on only one of the stalk rolls 410, 420. In still other embodiments, no knife blades may be installed on either stalk roll 410, 420 if the operator wants the stalks to only be crushed or shredded and not severed into smaller stalk segments. In yet another alternative embodiment as shown in FIG. 49, two knife blades 450a, 450b are disposed on one stalk roll with their flat faces 454 spaced back-to-back and with a third knife blade 450c on the adjacent stalk roll disposed between the back-to-back blades 450a, 450b. In this embodiment, the third knife blade 450c has a beveled face 453 on both sides.

Figure 40:
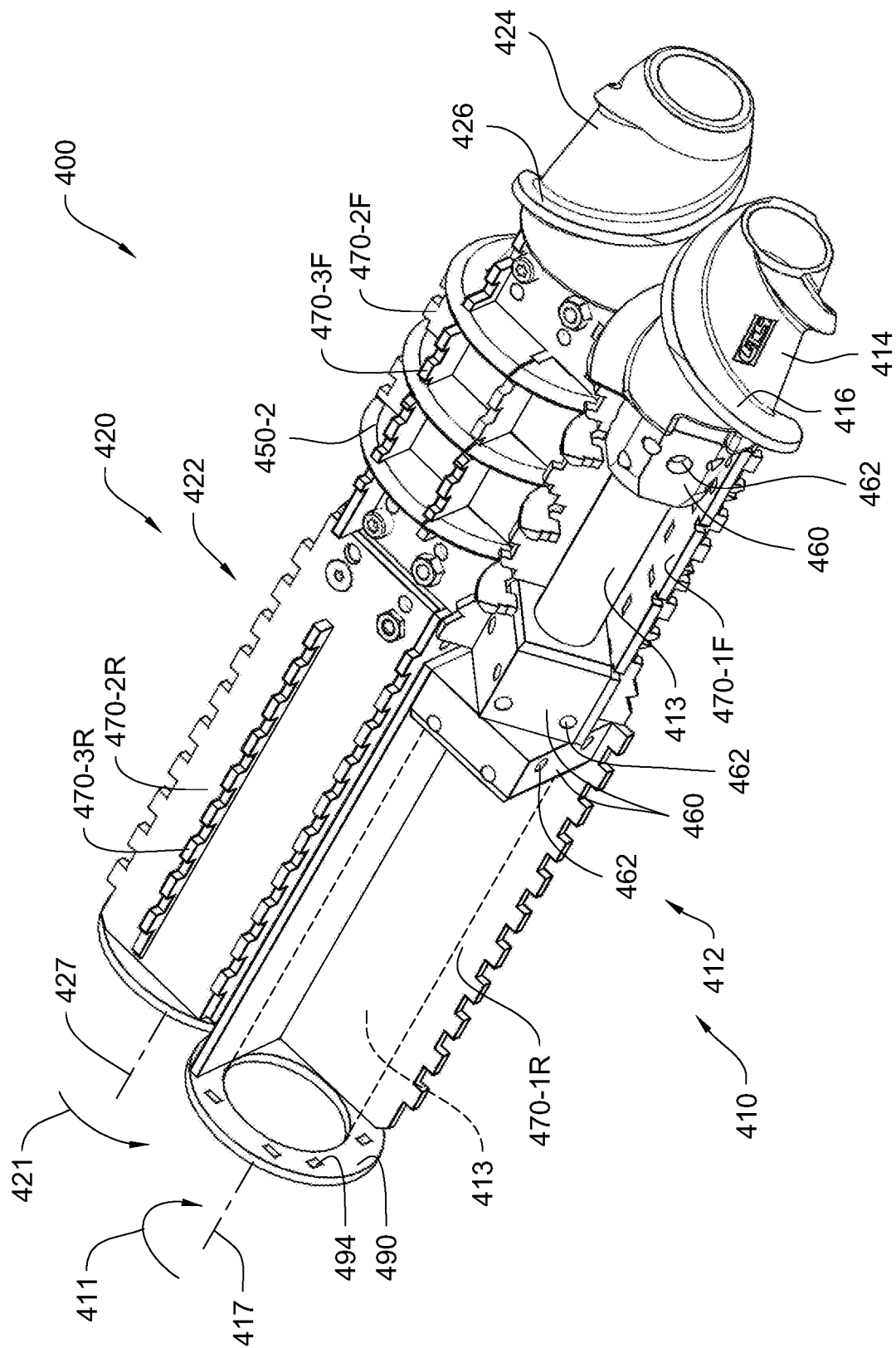
FIG. 40 is a perspective view of the differential speed stalk roll assembly of FIG. 39 with some of the modular body segments removed to show the interior of the stalk rolls.
Figure 41:
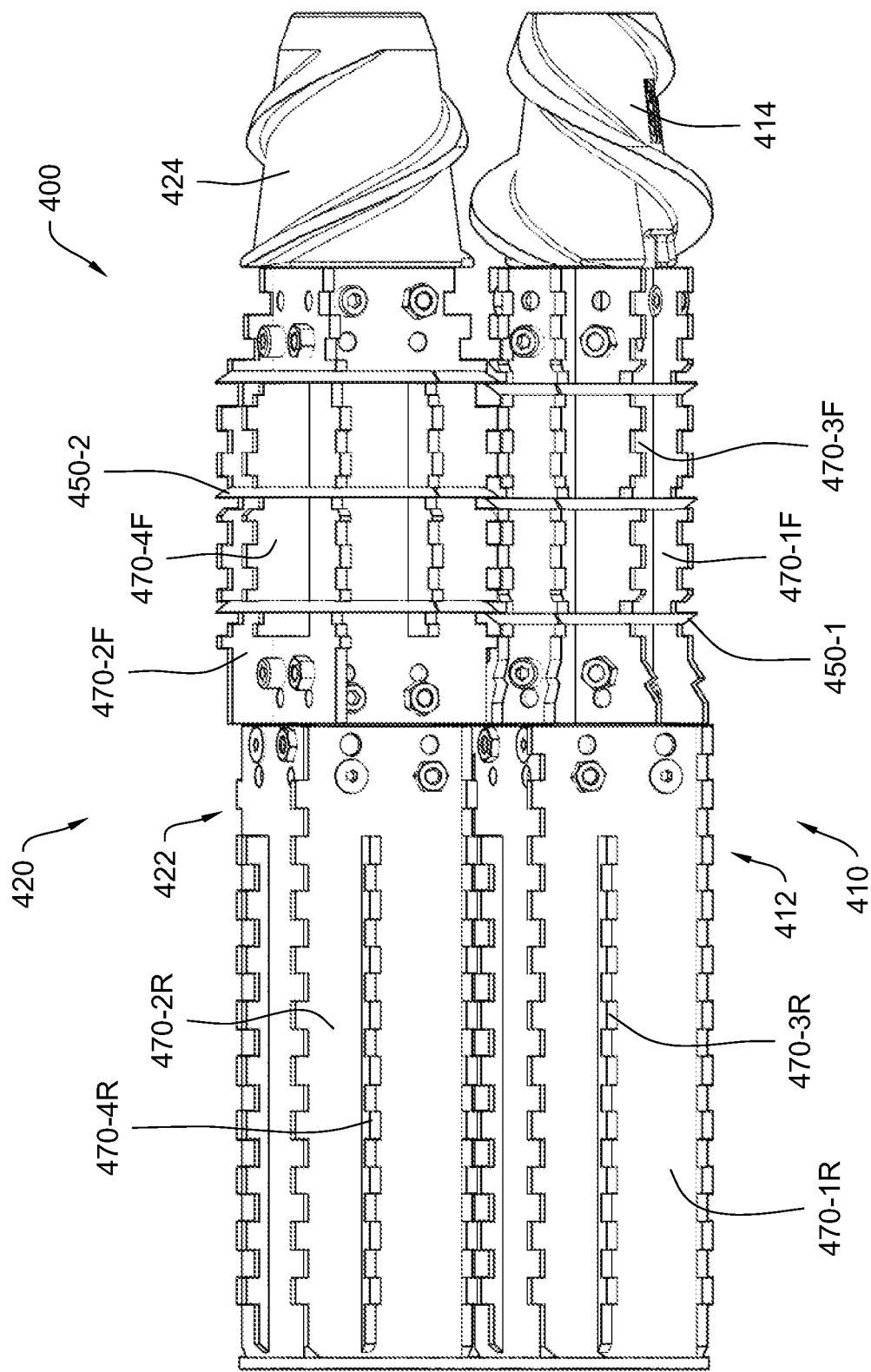
FIG. 41 is a top plan view of the stalk roll assembly of FIG. 39.
Figure 47B:
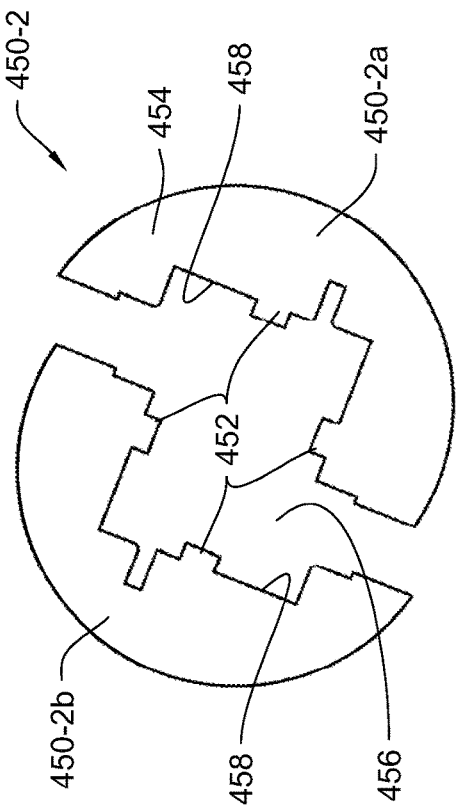
FIG. 47B is a rear elevation view of the knife blade segments of FIG. 47A shown separated.
Figure 47A:
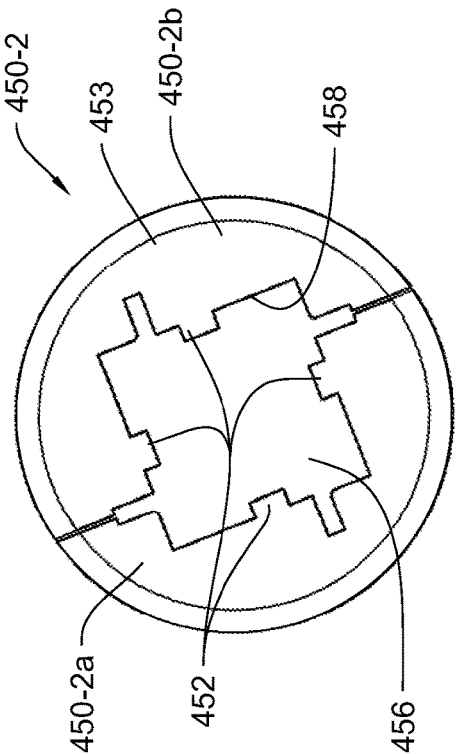
FIG. 47A is a front elevation view of an embodiment of the knife blade of the larger diameter stalk roll of FIG. 31 showing the knife blade segments together.
Figure 46B:
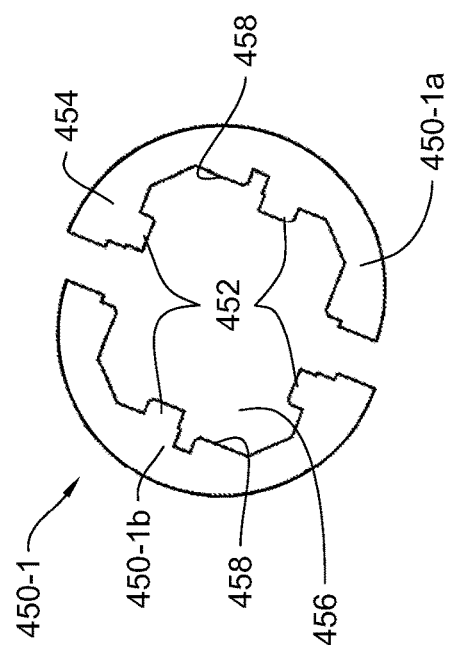
FIG. 46B is a rear elevation view of the knife blade segments of FIG. 46A shown separated.
Figure 46A:
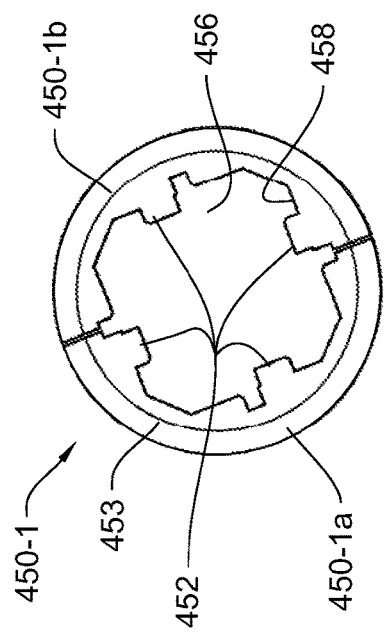
FIG. 46A is a front elevation view of an embodiment of the knife blade of the smaller diameter stalk roll of FIG. 39 showing the knife blade segments together.

The embodiment of the stalk roll assembly 400 is depicted as being adapted for use the type of row unit 30 produced by the OEM, Deere and Company (John Deere), which utilizes cylindrical stalk roll shafts 413, 423 of different diameters (FIG. 40). Again, it should be appreciated that the features of the stalk roll assembly 400 as described in more detail below are suitable for use with any OEM row unit and adapted to the particular stalk roll shaft configurations of such OEM row units.

As in the previous embodiment, the head 414, 424 may have helically arranged flights 416, 426 which function as augers to pull the cornstalk rearwardly between the main bodies 412, 422 as the stalk rolls rotate counter to one another as indicated by arrows 411, 421. As best viewed in FIG. 40, like the previous embodiment, each stalk roll 410, 420 receives and is rigidly secured to laterally spaced shafts 413, 423 coupled to the gearbox 125 which drives rotation of the shafts about their respective longitudinal axis 417, 427.

Continuing to refer to FIG. 40, it should be appreciated that one of the modular body segment plates 470 is removed to show the interior of the first stalk roll 410. The interior of the second stalk roll 420 is the same. Referring to FIGS. 39-46, the body segment plates 470 include apertures 472 which align with mating apertures 462 of internal blocks 460 disposed at the rearward, intermediate and forward ends of the stalk rolls 410, 420. Bolts threadably secure the steel plates 470 to the blocks 460 through the apertures 472, which align with internally threaded apertures 462 in the blocks 460. The rearward ends of the plates 470 are rotationally fixed to the ring 490 via tabs 492 (FIG. 44) projecting from the rearward end of the plates 470 which are received in slots 494 within the ring 490. The blocks 460 may have three, four, five, six, seven, eight or more sides depending on the desired configuration of the stalk rolls 410, 420 and the modular body segments 470 will vary in shape accordingly, likewise the tabs 492 on the plates 470 and slots 494 in the ring 490 will vary.

FIGS. 42-43 are perspective views of an embodiment of the modular body plate segments 470 comprising the first stalk roll 410. The plate segments 470 for the first stalk roll 410 include a rear plate segment 470-1R and a forward plate segment 470-1F. The rear plate segment 470-1R has a substantially uniform rearward width "W1-R" from the rearward end toward the forward end for about ½ the length of the first body 412 (see FIG. 39). The rear plate segment 470-1R may have an intermediate plate 470-3R welded thereto such that when the segment plates 470-1R are mounted to the blocks 460, the outer ends of the plate segments 470-1R and 470-3R are substantially equally radially spaced. The forward plate segment 470-1F has a substantially uniform forward width "W1-F" from its forward end toward the rearward end for about ⅓ the length of the first body 412 before flaring outwardly and rearward to provide an intermediate width "W1-I" as a transition between the narrower forward width W1-F to the wider rearward width W1-R. The forward plate segment 470-1F may have an intermediate plate 470-3F welded thereto such that when the segment plates 470-1F are mounted to the blocks 460, the outer ends of the plate segments 470-1F and 470-3F are substantially equally radially spaced. To aid in proper placement of the intermediate plates 470-3R, 470-3F onto the respective main body plates 470-1R, 470-1F, the intermediate plates 470-3R, 470-3F may include tabs 475 which are received within mating longitudinal openings 477 in the main body plates 470-1R, 470-1F. The body segment plate 470-1F also includes transverse slots 479 for receiving tabs 425 of the blades 450 as discussed later.

FIGS. 44-45 are perspective views of an embodiment of the modular body plate segments 470 comprising the second stalk roll 420. The plate segments 470 for the second stalk roll 420 include a rear plate segment 470-2R and a forward plate segment 470-2F. The rear plate segment 470-2R has a substantially uniform width "W2-R" from the rearward end toward the forward end for about ½ the length of the second body 422 (see FIG. 39). The rear plate segment 470-2R may have an intermediate plate 470-4R welded thereto such that when the segment plates 470-2R are mounted to the blocks 460, the outer ends of the plate segments 470-2R and 470-4R are substantially equally radially spaced. The forward plate segment 470-2F has a substantially uniform intermediate width "W2-I" that is substantially the same as the rearward width W2-R which continues from its rearward end toward the forward end before tapering inwardly to the forward most end to a forward width W2-F. The forward width W2-F is substantially the same width as the forward width W1-F of the first stalk roll body 410. The forward plate segment 470-2F may have an intermediate plate 470-4F welded thereto such that when the segment plates 470-2F are mounted to the blocks 460, the outer ends of the plate segments 470-2F and 470-4F are substantially equally radially spaced. To aid in proper placement of the intermediate plates 470-4R, 470-4F onto the respective main body plates 470-2R, 470-2F, the intermediate plates 470-4R, 470-4F may include tabs 475 which are received within mating openings 477 in the main body plates 470-2R, 470-2F. The body segment plate 470-2F also includes transverse slots 479 for receiving tabs 452 of the blades 450 as discussed later.

Thus, in this embodiment, because the diameters (as defined by circumscribing a circle around the outermost ends of radially spaced plates 470) along the rearward ½ of the length of the first and second stalk roll bodies 412, 422 are the same (i.e., W1-R=W2-R) there is no differential speed between the first and second stalk roll bodies 412, 422 along their rearward ½ length. However, there will be a differential speed between the first and second stalk rolls 410, 420 across most of their forward length due to their different diameters (as defined by circumscribing a circle around the outermost ends of radially spaced plates 470). It should be appreciated that along the flared transition portion of the first stalk roll 410, the differential in the speed between the first and second stalk roll bodies 412, 422 will reduce as the width of the plate 470-1F transitions from its forward width W1-F to the intermediate width W1-I. Likewise, as the second stalk roll body 422 transitions from its rearward width W2-R to its forward width W2-F, the differential in the speed will decrease to little or no differential speed at the forward most end of the stalk roll bodies 412, 422 where the forward width W1-F of the first stalk roll body 412 equals the forward width W2-F of the second stalk roll body 422. The varying differential speeds along the length of the stalk rolls 410, 420 may better shred or fracture the cornstalks as the diameter of the cornstalk changes as it feeds through the stalk roll assembly 400.

The outer ends of the body segment plates 470 forming the radially spaced longitudinal flutes 440 may include notches or teeth 474 which serve to bite into or grip the cornstalk as the flutes rotate to pull the cornstalk downwardly toward the stripper plates 40, 42 for stripping the ears 14 from the stalks 16. As the teeth 474 grip and bite into the stalks, the differential speeds of the rotating stalk rolls rip, shred and crush the stalks as the stalks pass between the outer peripheries or outer surfaces of the adjacent stalk rolls. As with the previous embodiments, the spacing, width, depth and shape of the notches 474 may vary among the modular body segments so the appropriate body segment may be selected and interchanged depending on crop moisture levels, brittleness of the stalks, weather and other crop conditions. For example rather than square notches, the notches may be v-shaped to form pointed teeth, or the notches may be rounded or any combination thereof. Additionally, the plates may be bent along the length of the notched end thereby forming hooked flutes.

It should be appreciated that in embodiments in which the lateral spacing of the stalk rolls 410, 420 and the size of the respective body segments 470 are such that the flutes 440 of the first and second stalk rolls 410, 420 overlap one another, the number of flutes 440 and the radial spacing of the flutes may be matched and oriented such that the flutes are timed to avoid the flutes contacting or interfering with one another as they rotate. Additionally, or alternatively, as shown in FIG. 48, the teeth 474 of the flutes 440 of one of the stalk rolls may be longitudinally offset with the teeth 474 of the flutes 440 of the adjacent stalk roll such that the teeth of one of the stalk rolls are received within the valleys 473 between the teeth of the adjacent stalk roll, resulting in "interlocking" teeth. As shown in FIG. 48, one of the stalk rolls has narrower teeth 474a with wider valleys 473a and the other stalk roll as wider teeth 474b with narrower valleys 473b. As the interlocking teeth rotate past one another, the narrower teeth 474a are received within the narrower valleys 473b of the adjacent stalk roll and the wider teeth 474*b* are received in the wider valleys 473*a* of the adjacent stalk roll.

FIGS. 46A-46B and FIGS. 47A-47B show alternative embodiments of the knife blades 450-1, 450-2 for the stalk rolls 410, 420. Like the previous embodiment, the knife blades 450-1, 450-2 are split into two half-segments 450-1*a*, 450-1*b* and 450-2*a* and 450-2*b*, respectively, to permit easier assembly of the stalk roll bodies 412, 422 as described above in connection with the embodiment of the stalk roll assembly 300. The respective knife blades 450-1, 450-2 are shown as having an outer diameter that is substantially the same as the outermost diameter of the respective stalk roll bodies 412, 422. Each knife 450-1, 450-2 has a beveled face 453 and a flat face 454. As best viewed in FIG. 41, the knife blades are oriented on the respective stalk rolls such that their flat faces 454 are back-to-back thereby forming a cutting plane. Each knife 450-1, 450-2 has an aperture 456 with an internal periphery 458. The internal peripheries 458 are configured to receive the body segments 470-1, 470-2, 470-3, 470-4. Additionally, the interior peripheries 458 of the apertures 456 may include inwardly projecting tabs 452, which are received in mating transverse slots 479 in the plates 470-1, 470-2. The knife blades 450 are also received within slots 476 of the modular body segment plates 470-1, 470-2, 470-3, 470-4.

It has been found that it may be desirable for the blades 450-1, 450-2 of the adjacent stalk roll bodies 412, 422 to overlap one another back-to-back by ⅛ to ¼ inch (3 to 6 mm), to produce the desired pinch point or cutting plane 130 discussed above for cutting or severing the cornstalks 16. Accordingly, referring to FIGS. 41-42, it should be appreciated that the modular plate segments 470-1, 470-2, 470-3, 470-4 include a notch 474-1, to avoid interference of the blades 450-1, 450-2 with the plate segments 470 of the adjacent stalk roll bodies 412, 422.

As in the previous embodiments, it may be desirable to be able to adjust or vary the gap between the knife blades 450 of the adjacent stalk roll bodies 412, 422 thereby allowing the operator to choose between a very tight gap or a wider gap. The gap may be a lateral gap (i.e., a gap laterally between the outer diameters of the opposing blades) or the gap may be a longitudinal gap (i.e., a gap longitudinally between the back-to-back spacing of the opposing blades). A tight gap (either laterally or longitudinally) will result in complete cutting or severing the stalk into individual pieces, whereas a wider gap (either laterally or longitundinally) which will only partially cut or sever the stalk resulting in a "chain" of partially severed stalk pieces. The gaps between knife blades may vary along the length of the stalk roll. The lateral gaps between the knife blades can be achieved by selecting from different diameters of knife blades 450 and selecting from corresponding modular body segments 470 having different depths of slots 476. The longitudinal gaps between the knife blades can be achieved by moving one of the knife blades longitudinally from the opposing knife blade on the adjacent stalk roll. To provide such longitudinal gaps, the modular body segments 470 may have a series of longitudinally spaced slots 476 as shown in FIG. 54, which allows the operator to place one of the knife blades in one of the series of longitudinally spaced slots to achieve the desired gap between the back-to-back knife blades 450.

Figure 50:
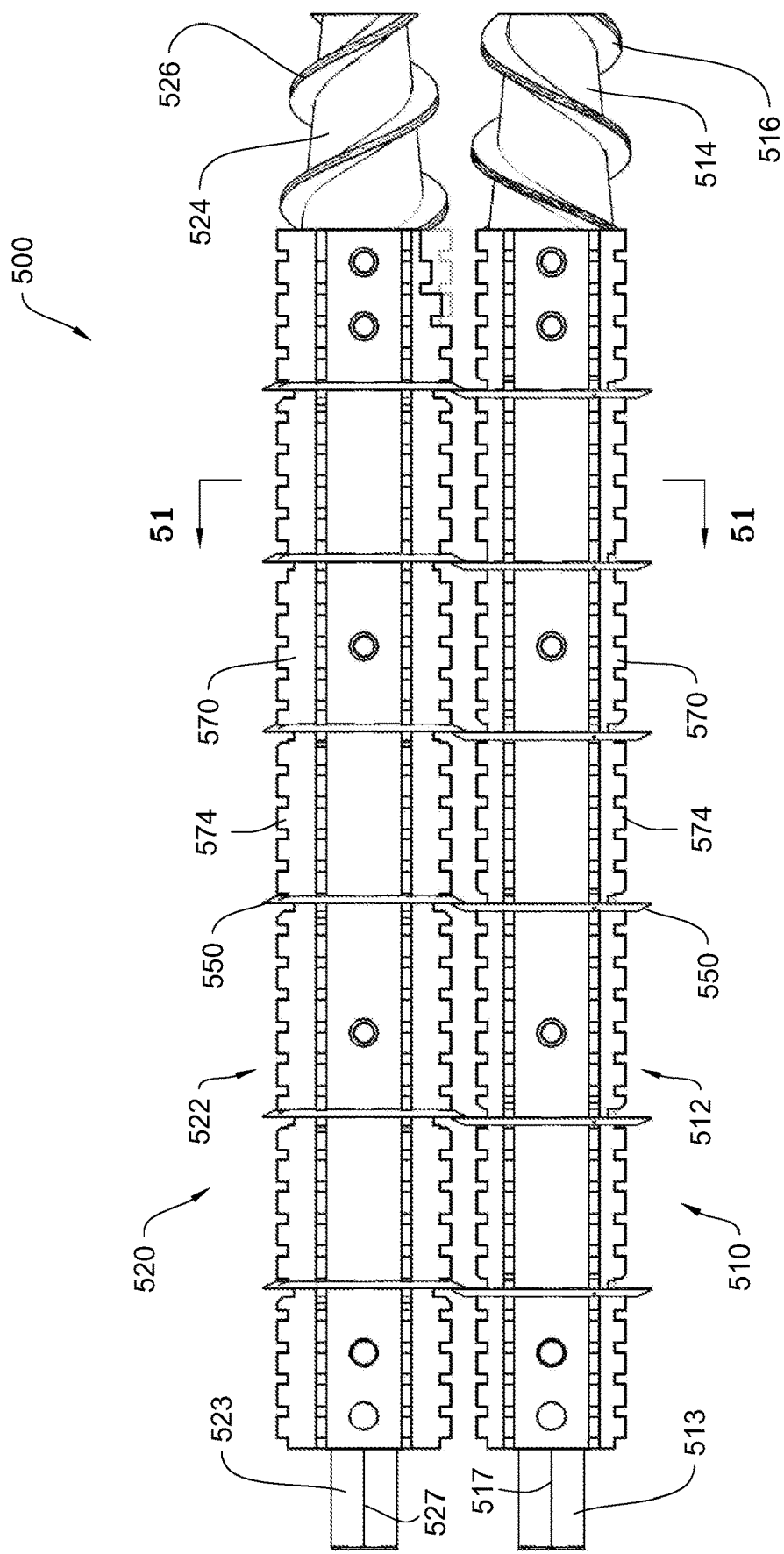
FIG. 50 is a top plan view of another embodiment of a differential speed stalk roll assembly.

FIG. 50 is a top plan view of another embodiment of a differential speed stalk roll assembly 500. As with the previous embodiments, this embodiment of the stalk roll assembly 500 comprise laterally spaced first and second stalk rolls 510, 520 each having a main body 512, 522 and a head or nose 514, 524. In this embodiment, the main bodies 512, 522 of the stalk rolls 510, 520 are also comprised of interchangeable modular body segments 570 in the form of steel plates, which when assembled form radially spaced longitudinally disposed flutes 540. As in the previously described embodiments, one or both of the main bodies 512, 522 may include one or more knife blades 550 spaced longitudinally along their length and defining one or more knife planes normal to the axes of rotation 517, 527 of the main bodies 512, 522. Alternatively, one or more knife blades 550 may be utilized on only one of the stalk rolls 510, 520. In still other embodiments, no knife blades may be installed on either stalk roll 510, 520 if the operator wants the stalks to only be crushed or shredded and not severed into smaller stalk segments. In yet another alternative embodiment as shown in FIG. 49, two knife blades 550*a*, 550*b* are disposed on one stalk roll with their flat faces 454 spaced back-to-back and with a third knife blade 550*c* on the adjacent stalk roll disposed between the back-to-back blades 550*a*, 550*b*. In this embodiment, the third knife blade 550*c* has a beveled face 553 on both sides.

The embodiment of the stalk roll assembly 500 is depicted as being adapted for use the type of row unit 30 produced by the Italian OEM, Drago. Again, it should be appreciated that the features of the stalk roll assembly 500 as described in more detail below are suitable for use with any OEM row unit and adapted to the particular stalk roll shaft configurations of such OEM row units.

Figure 51:
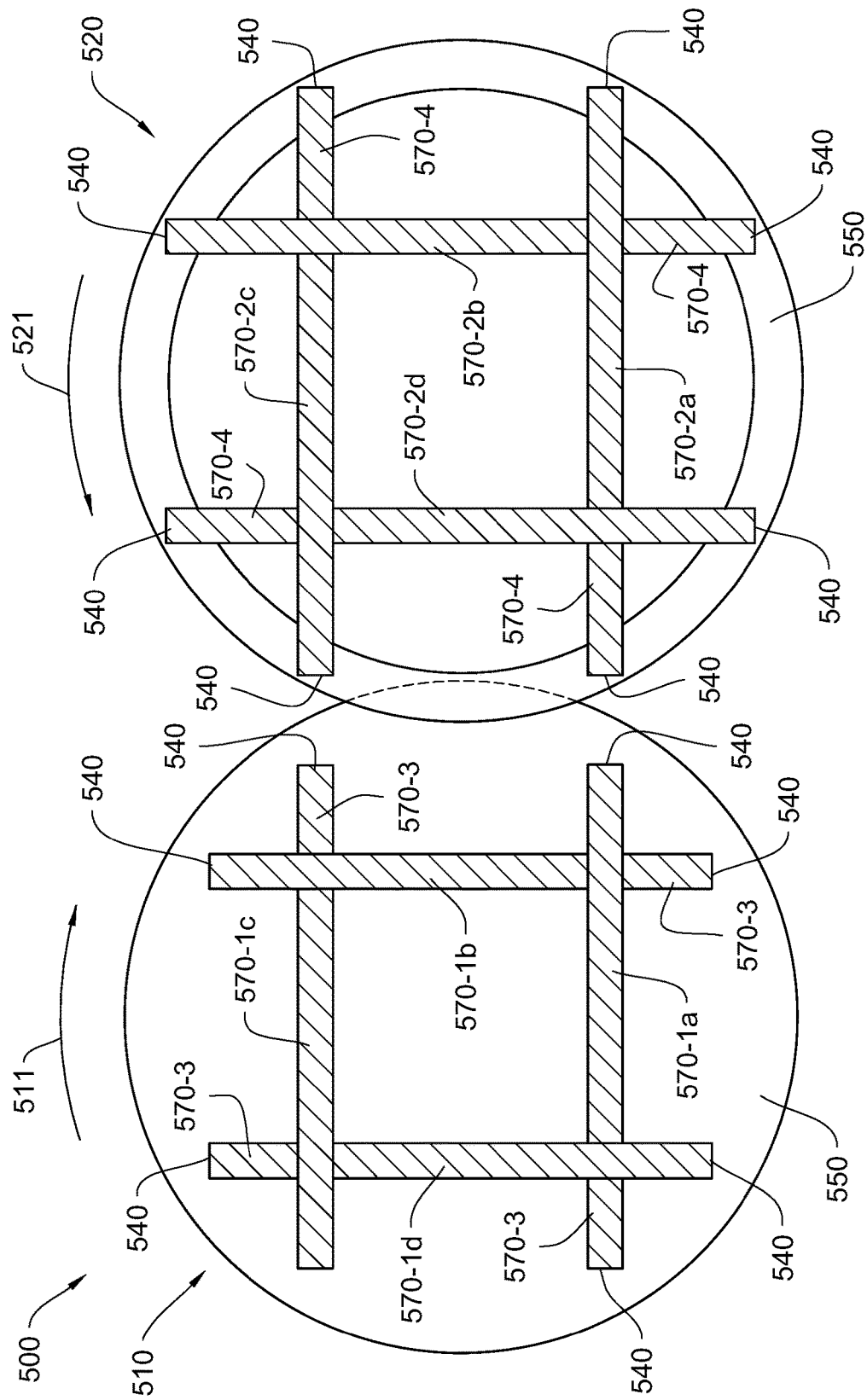
FIG. 51 is a cross-sectional view of the speed stalk roll assembly of FIG. 50 as viewed along lines 51-51 of FIG. 50

As in the previous embodiments, the head 514, 524 may have helically arranged flights 516, 526 which function as augers to pull the cornstalk rearwardly between the main bodies 512, 522 as the stalk rolls rotate counter to one another as indicated by arrows 511, 521 (FIG. 51). Like the previous embodiments, each stalk roll 510, 520 is rigidly secured to laterally spaced shafts 513, 523 coupled to the gearbox (not shown) which drives rotation of the shafts about their respective longitudinal axis 517, 527.

As in the previous embodiments, the body segment plates 570 include apertures 572 which align with mating apertures (not shown) in the shafts 513, 523 or internal blocks (not shown) secured to the shafts. Bolts threadably secure the steel plates 570 to the shafts or blocks through the aligned apertures.

The outer ends of the body segment plates 570 forming the radially spaced longitudinal flutes 540 may include notches or teeth 574 which serve to bite into or grip the cornstalk as the flutes rotate to pull the cornstalk downwardly toward the stripper plates 40, 42 for stripping the ears 14 from the stalks 16. As the teeth 574 grip and bite into the stalks, the differential speeds of the rotating stalk rolls rip, shred and crush the stalks as the stalks pass between the outer peripheries or outer surfaces of the adjacent stalk rolls. As with the previous embodiments, the spacing, width, depth and shape of the notches 574 may vary among the modular body segments so the appropriate body segment may be selected and interchanged depending on crop moisture levels, brittleness of the stalks, weather and other crop conditions. For example rather than square notches, the notches may be v-shaped to form pointed teeth, or the notches may be rounded or any combination thereof. Additionally, the plates may be bent along the length of the notched end thereby forming hooked flutes.

Referring to FIG. 51, it should be appreciated that unlike the previous embodiments in which the opposing flutes of the stalk roll bodies overlap and are timed so as not to interfere with one another as they rotate, in this embodiment, the flutes 540 of the stalk roll bodies 512, 522 are arranged such that as the flutes rotate, the opposing flutes are tip-to-tip.

The knife blades 550 may be the same as any of the embodiments previously described, i.e., annular blades or annular blades with half-blade segments. Each knife blade 550 has a beveled face 553 and a flat face 554. As best viewed in FIG. 50, the knife blades are oriented on the respective stalk rolls such that their flat faces 554 are back-to-back thereby forming a cutting plane. Each knife blade 550 has an aperture 556 with an internal periphery 558. The internal peripheries 558 are configured to receive the body segments 570-1, 570-2, 570-3, 570-4. Additionally, the interior peripheries 558 of the apertures 556 may include inwardly projecting tabs 552, which are received in mating transverse slots 579 in the plates 570-1, 570-2. The knife blades 550 are also received within slots 576 of the modular body segment plates 570-1, 570-2, 570-3, 570-4. Unlike the knife blades shown in the previous embodiments, in this embodiment where the flutes 540 are tip-to-tip, the knife blades 550 have a diameter larger than the circumscribed diameter of the flutes.

As in the previous embodiments, it may be desirable to be able to adjust or vary the gap between the knife blades 550 of the adjacent stalk roll bodies 512, 522 thereby allowing the operator to choose between a very tight gap or a wider gap. The gap may be a lateral gap (i.e., a gap laterally between the outer diameters of the opposing blades) or the gap may be a longitudinal gap (i.e., a gap longitudinally between the back-to-back spacing of the opposing blades). A tight gap (either laterally or longitudinally) will result in complete cutting or severing the stalk into individual pieces, whereas a wider gap (either laterally or longitundinally) which will only partially cut or sever the stalk resulting in a "chain" of partially severed stalk pieces. The gaps between knife blades may vary along the length of the stalk roll. The lateral gaps between the knife blades can be achieved by selecting from different diameters of knife blades 550 and selecting from corresponding modular body segments 570 having different depths of slots 576. The longitudinal gaps between the knife blades can be achieved by moving one of the knife blades longitudinally from the opposing knife blade on the adjacent stalk roll. To provide such longitudinal gaps, the modular body segments 570 may have a series of longitudinally spaced slots 576 as shown in FIG. 54, which allows the operator to place one of the knife blades in one of the series of longitudinally spaced slots to achieve the desired gap between the back-to-back knife blades 550.

Figure 52A:
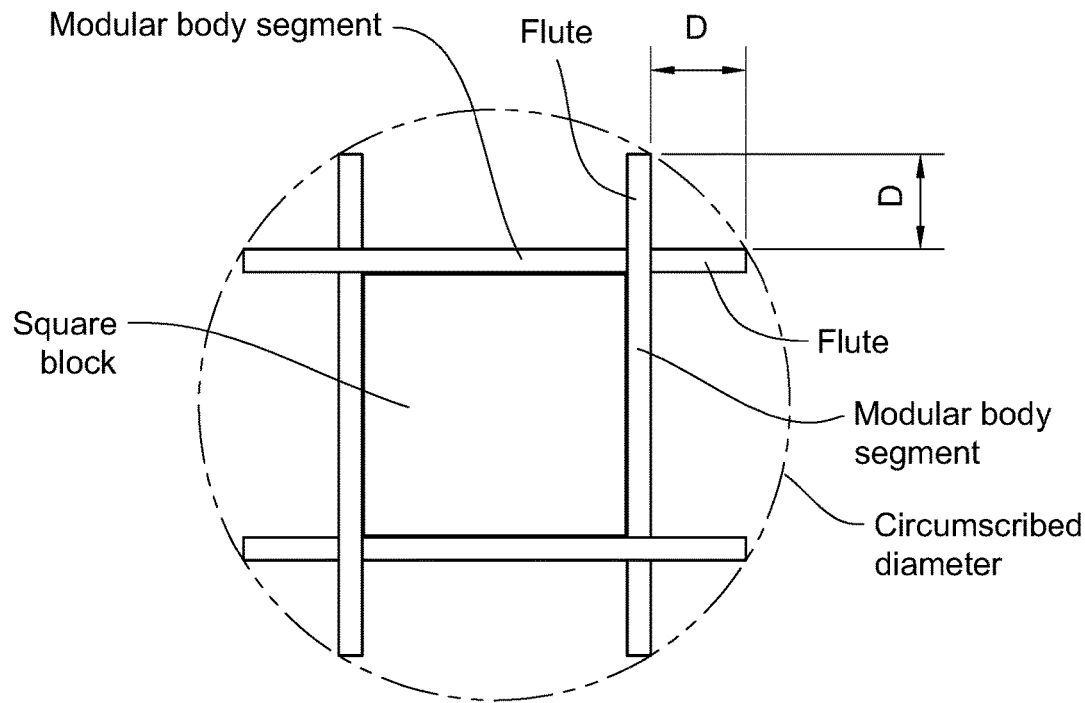
FIG. 52A is a cross-sectional view of an embodiment of the stalk rolls with the modular body segments attached to a square block.
Figure 52B:
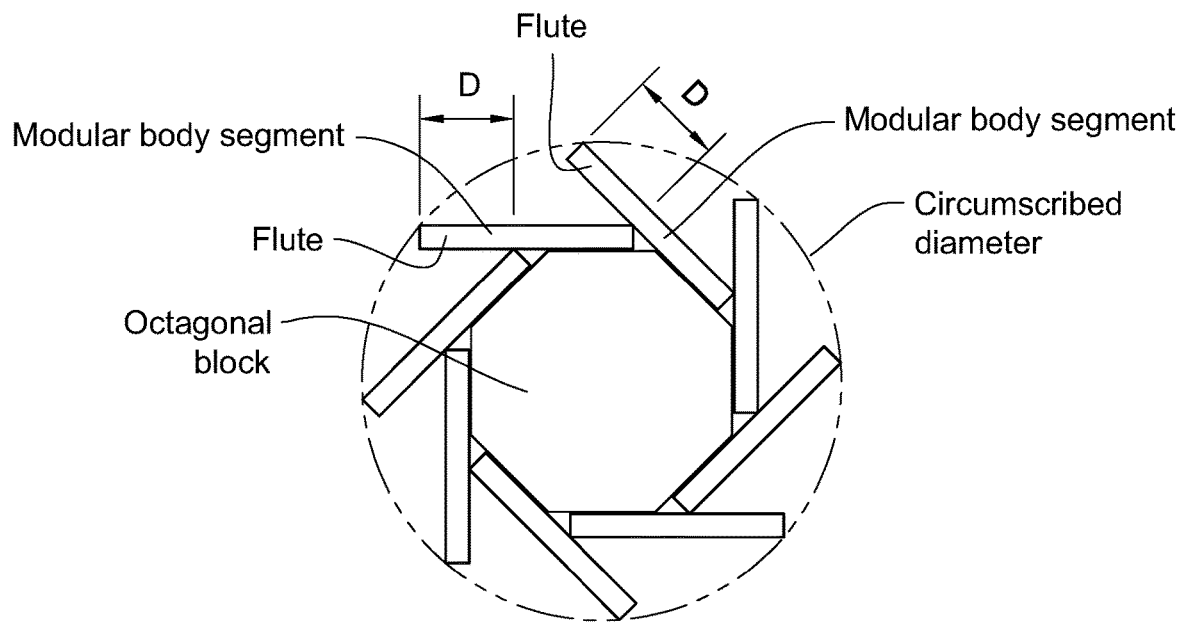
FIG. 52B is a cross-sectional view of an embodiment of the stalk rolls with the modular body segments attached to an octagonal block.

With each of the embodiments of the stalk roll assemblies 200, 300, 400, 500 it should be appreciated that if more or less differential speed is desired between the adjacent first and second stalk rolls, the widths of the modular body segments 270, 370, 470, 570 may be varied to achieve a desired differential speed ratio. It has been found that with stalk rolls configured with the flutes oriented tip-to-tip (e.g., in the embodiment of the stalk roll assembly 500) only a small amount of differential speed (e.g., about one percent (1%) differential speed) between their respective outer peripheries or circumscribed diameters is all that is necessary to achieve the desired crushing and shredding of the corn stalks. In embodiments where the opposing flutes overlap and are timed so as not to interfere with one another a differential speed between their respective outer peripheries or circumscribed diameters of about ten percent (10%) to about fifty percent (50%) (corresponding to differential size ratios between 1:1.1 and 1:1.6) produces the desired crushing and shredding of the corn stalks. In embodiments where the stalk rolls have interlocking teeth, the desired differential speed may be achieved based on the ratio between the outer periphery or circumscribed diameter of the larger stalk roll and the circumscribed diameter of the valleys 273, 373, 473 between the teeth 274, 374, 474 of the smaller stalk roll. If a row unit 30 is configured with limited space such that it is difficult to have sufficiently different sized stalk rolls to achieve the desired differential speed ratios, a stalk roll having six or more sides will reduce the circumscribed diameters of the flutes of the stalk rolls in order to fit in the available space. For example, FIG. 52A shows a cross-sectional view of a stalk roll with four modular body segments mounted to a square block. FIG. 52B shows a cross-sectional view of a stalk roll with eight modular body segments mounted to an octagonal block. In comparing FIG. 52A to FIG. 52B, it should be appreciated that with an eight-sided stalk roll, the stalk roll has a more round or cylindrical shape which allows the circumscribed diameter around the flutes to be smaller while still having the same flute depth "D" when compared to the four sided stalk roll.

The steel plates comprising the body segments 270, 370, 470, 570 may be fabricated from mild carbon steel plate, such as, for example A36, 1010, 1018 and 1020 grade steel. Additionally, or alternatively, AR400 and AR500 grade steel provide more wear resistance with little additional cost. Plate thicknesses of about 3/16 inches has been found suitable, although thinner plates or thicker plates may be equally suitable. Thus, because the stalk roll bodies are fabricated from relatively inexpensive and readily available steel plates, the cost of producing the stalk roll bodies are considerably less expensive to produce than cast or molded stalk rolls.

Figure 53A:
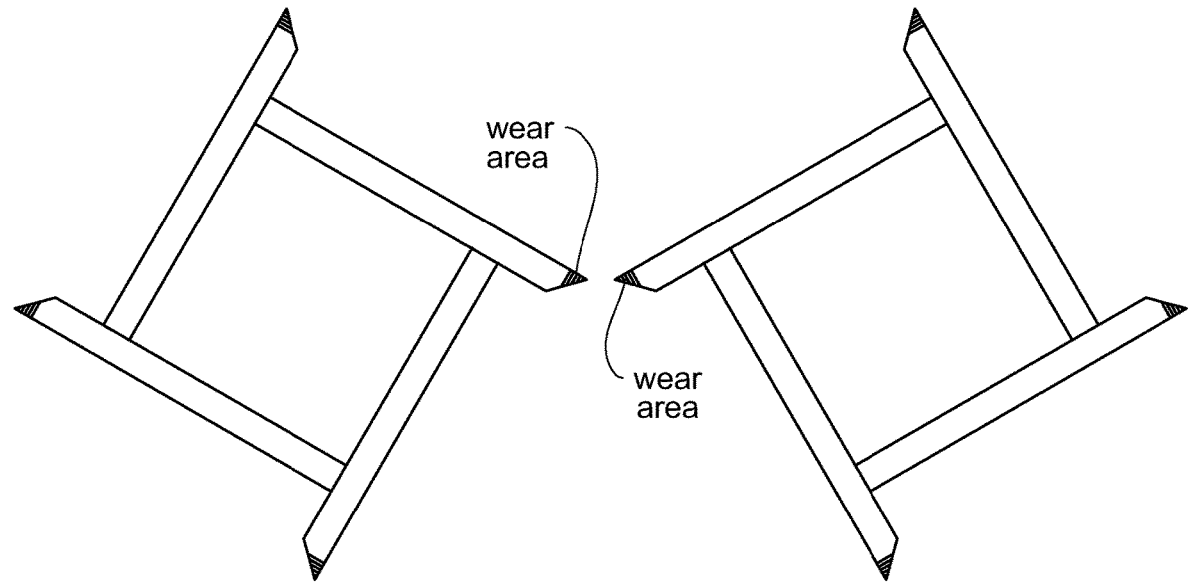
FIG. 53A is a cross-sectional view of a conventional stalk roll with a sharp edge or point, showing the small wear area defined by the hatched triangular area.
Figure 53B:
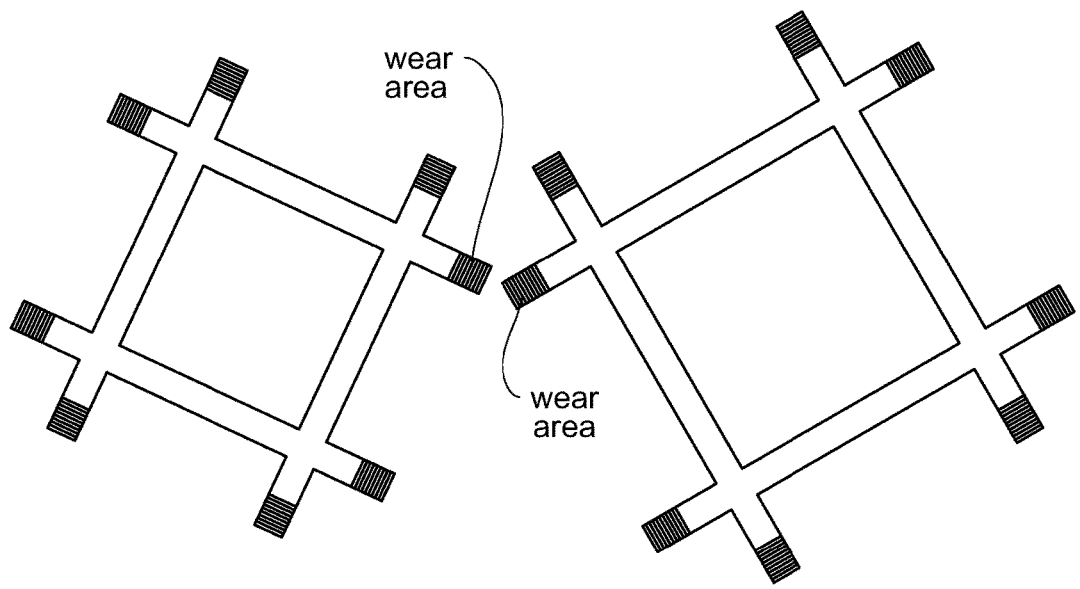
FIG. 53B shows an example of the stalk roll assemblies fabricated from the modular steel plates with square edges showing the large wear area defined by the hatched rectangular area.

Additionally, with respect to the embodiments of the stalk roll assemblies 200, 300, 400, 500 fabricated from the modular steel plates 270, 370, 470, 570, it should be appreciated that the wear area of the stalk rolls corresponds to the thickness of the plate forming the flutes and the depth of the teeth formed in the flutes. Thus, when the flutes are constructed from 3/16 inch steel plate with 1/4 to 1/2 inch deep square notches or teeth, for example, it would require the 3/16 inch thickness of the plate to completely wear down the full depth of the teeth before there would be any noticeable change in performance, which would likely take between three to five harvest seasons to occur. In contrast, conventional stalk rolls assemblies have flutes that come to sharp ends or points, leaving only the thin edge or point as the wear area. These thin edges or points of conventional stalk rolls, even if hardened, will wear down much more rapidly, requiring more frequent replacement. For example, FIG. 53A shows an example of a conventional stalk roll with a sharp edge or point, and showing the small wear area defined by the hatched triangular area. In contract, FIG. 53B shows an example of the stalk roll assemblies 200, 300, 400, 500 fabricated from the modular steel plates 270, 370, 470, 570 with square edges, and showing the large wear area defined by the hatched rectangular area. Thus, it should be appreciated that the stalk roll assembly embodiments 200, 300, 400, 500 (as fabricated with the modular steel plates 270, 370, 470, 570) have a useful life that is at least three times longer than conventional stalk rolls which have sharp edge or pointed flutes for wear areas. Furthermore, it should be appreciated that because conventional stalk rolls use the longitudinal flutes with thin edges to both cut the stalks and to pull the stalks down, if the thin edges wear down even slightly, the stalks will no longer be effectively cut and the stalks will not be as effectively pulled down by the worn flutes. However, in the embodiments of the stalk roll assemblies 200, 300, 400, 500, the stalks are pulled down by the flutes 240, 340, 440, 540 and the annular knife blades 250, 350, 450, 550 perform the cutting operation. If the annular knife blades 250, 350, 450, 550 become worn, they are relatively inexpensive and easily replaceable without needing to replace the modular body segments 270, 370, 470, 570. With conventional stalk rolls having the sharp edge flutes which perform both the cutting function and the down-pulling function, the entire stalk roll must be replaced.

In addition, most conventional stalk rolls are fabricated using a casting or molding process which requires expensive molds, specialized equipment and highly skilled workers to produce. The stalk roll assembly embodiments 200, 300, 400 (as fabricated from the modular steel plates 270, 370, 470), on the other hand, can be produced from relatively inexpensive and readily available mild steel plate which is easily cut, punched or stamped and welded using conventional equipment and tools that can be found at virtually all contract steel fabricator shops and in most growers' workshops. As such, the stalk roll assembly embodiments 200, 300, 400 as fabricated from the modular steel plates 270, 370, 470 can be produced at a fraction of the cost of cast or molded stalk rolls.

Furthermore, in addition to the increased useful life and the significant reduced fabrication costs, the stalk roll assembly embodiments 200, 300, 400 operating at differential speeds, offer several benefits over stalk rolls that do not operate at differential speeds. Namely, the differential speed will crush or partially shred the cornstalk so the stalk sections are opened up permitting the stalks to break down and decompose quickly. Additionally, the differential speed will partially explode or shred the corn stalk well below the point that the stalk is broken or snapped off by the stalk rolls, such that the remaining stalk stubble will not cause as much tire wear and is less likely to puncture tires due to the partially exploded or shredded stubble ends. This also allows faster breakdown and decomposition of the stalk stubble.

Additionally, the modular design of the differential speed stalk roll assembly embodiments 200, 300, 400 allows operators to vary the number of knife blades in order to vary the length at which the stalks are cut or chopped depending on crop, soil and weather conditions, while also ensuring that stalk sections are sufficiently short such that the corn stalk segments or pieces are more easily thrown out of the way by row cleaners during the next year's planting operations. For example, the operator can choose to use fewer knife blades or no knife blades if the operator wants to leave behind longer sections of cornstalks or as previously described the operator can vary the gap between some or all of the knife blades to achieve the desired amount stalk severing and stalk segment lengths. Also, the modular design of the differential speed stalk roll assembly embodiments 200, 300, 400 allows operators to vary the teeth and the amount of differential speed to increase the aggressiveness of the crushing or shredding of the cornstalks depending on crop conditions, soil conditions and weather conditions.

The differential stalk roll assembly embodiments 200, 300, 400 also avoids the need for stalk choppers and offer several advantages over stalk choppers. For example, the differential speed stalk roll assembly embodiments 200, 300, 400 not only cut or chop the stalks like head mounted stalk choppers or flail mowers, the differential stalk roll assembly embodiments 200, 300, 400 provide the added ability to crush or partially shred the cornstalk sections permitting the stalks to break down and decompose quickly, which head mounted stalk choppers or flail mowers do not do.

Furthermore, the differential stalk roll assembly embodiments 200, 300, 400 avoids the significant initial investment associated with head mounted stalk choppers, requires less horsepower to operate than head mounted stalk choppers and reduces weight, thereby burning less fuel and decreasing operating costs. Furthermore, because head mounted stalk choppers require the blades or knives to be replaced one or more times per year, the differential stalk roll assembly embodiments 200, 300, 400 result in much lower maintenance costs and downtime.

Various modifications to the embodiments and the general principles and features of the apparatus, systems and methods described herein will be readily apparent to those of skill in the art. Thus, the foregoing description is not to be limited to the embodiments of the apparatus, systems and methods described herein and illustrated in the drawing figures.

The invention claimed is:

1. A differential speed stalk roll assembly mountable to a row unit of a row crop head, the assembly comprising:
a first stalk roll body rotatable about a first axis of rotation, said first stalk roll body comprising a plurality of first modular plate segments arranged about said first axis of rotation such that an end of each of said plurality of first modular plate segments extends radially outwardly from said first axis of rotation thereby forming a plurality of first longitudinal flutes, whereby a circle circumscribing said plurality of first longitudinal flutes defines a first stalk roll body diameter, wherein rotation of said first stalk roll body about said first axis or rotation results in said first stalk roll body diameter having a first outer peripheral speed;
a second stalk roll body rotatable about a second axis of rotation, said second stalk roll body comprising a plurality of second modular plate segments arranged about said second axis of rotation such that an end of each of said plurality of second modular plate segments extends radially outwardly from said second axis of rotation thereby forming a plurality of second longitudinal flutes, whereby a circle circumscribing said plurality of second longitudinal flutes defines a second stalk roll body diameter, wherein rotation of said second stalk roll body about said second axis of rotation results in said second stalk roll body diameter having a second outer peripheral speed;
wherein said second stalk roll body diameter is sufficiently greater than said first stalk roll body diameter such that said second outer peripheral speed is at least about one percent greater than said first outer peripheral speed
wherein at least one of said first and second stalk roll bodies includes at least one knife blade defining a knife plane substantially perpendicular to said first and second axes of rotation.

2. The differential speed stalk roll assembly of claim 1, wherein said axes of rotation of said first and second stalk roll bodies are laterally spaced and said first and second stalk roll body diameters are sized such that said respective first and second longitudinal flutes overlap one another as said first and second stalk roll bodies rotate about their respective axes of rotation.

3. The differential speed stalk roll assembly of claim 2, wherein said first and second longitudinal flutes are numbered and oriented on said respective first and second stalk roll bodies such that said first and second longitudinal flutes avoid contact with one another as said first and second stalk roll bodies rotate about their respective axes of rotation.

4. The differential speed stalk roll assembly of claim 1, wherein said axes of rotation of said first and second stalk roll bodies are laterally spaced and said first and second stalk roll body diameters are sized such that said respective first and second longitudinal flutes do not overlap one another as said first and second stalk roll bodies rotate about their respective axes of rotation.

5. The differential speed stalk roll assembly of claim 4, wherein said first and second longitudinal flutes are numbered and oriented on said respective first and second stalk roll bodies such that each one of said longitudinal flutes on said first stalk roll has an opposing one of said longitudinal flutes on said second stock roll, whereby as each one of said opposing first and second longitudinal flutes rotate about their respective axes, each one of said first longitudinal flutes is tip-to-tip with said opposing one of said second longitudinal flutes.

6. The differential speed stalk roll assembly of claim 1, wherein at least one of said first plurality of longitudinal flutes and at least one of said second plurality of longitudinal flutes each includes a plurality of longitudinally spaced teeth.

7. The differential speed stalk roll assembly of claim 2, wherein at least one of said first plurality of longitudinal flutes and at least one of said second plurality of longitudinal flutes each includes a plurality of longitudinally spaced teeth.

8. The differential speed stalk roll assembly of claim 3, wherein at least one of said first plurality of longitudinal flutes and at least one of said second plurality of longitudinal flutes each includes a plurality of longitudinally spaced teeth.

9. The differential speed stalk roll assembly of claim 4, wherein at least one of said first plurality of longitudinal flutes and at least one of said second plurality of longitudinal flutes each includes a plurality of longitudinally spaced teeth.

10. The differential speed stalk roll assembly of claim 5, wherein at least one of said first plurality of longitudinal flutes and at least one of said second plurality of longitudinal flutes each includes a plurality of longitudinally spaced teeth.

11. The differential speed stalk roll assembly of claim 7, wherein said plurality of longitudinally spaced teeth of each of said plurality of first longitudinal flutes are offset longitudinally from said plurality of longitudinal spaced teeth of each of said second plurality of longitudinal flutes, such that an outer end of each of said plurality of spaced teeth of each of said plurality of first longitudinal flutes are received within an opposing valley between each of said plurality of spaced teeth of each of said plurality of second longitudinal flutes.

12. The differential speed stalk roll assembly of claim 1, wherein said first stalk roll body includes at least one first knife blade and said second stalk roll body includes at least one second knife blade, each of said first and second knife blades defining a knife plane substantially perpendicular to said first and second axes of rotation.

13. The differential speed stalk roll assembly of claim 12, wherein each of said at least one first and second knife blades includes a flat face and a beveled face, and wherein said at least one first and second knife blades are oriented on said respective first and second stalk roll bodies such that said flat face of said at least one first knife blade is disposed back-to-back with said flat face of said at least one second knife blade.

14. The differential speed stalk roll assembly of claim 1, wherein one of said first and second stalk roll bodies includes a first knife blade and a second knife blade in longitudinal spaced relation with opposing flat faces, and wherein another of said first and stalk roll bodies, includes a third knife blade having opposing beveled faces, wherein said third knife blade is disposed between said opposing flat faces of said first and second knife blades, each of said first, second and third knife blades defining a knife plane substantially perpendicular to said first and second axes of rotation.

15. The differential speed stalk roll assembly of claim 12, wherein said at least one first knife blade has an outer diameter that is substantially the same as said first stalk roll body diameter and said at least one second knife blade has an outer diameter that is substantially the same as said second stalk roll body diameter.

16. The differential speed stalk roll assembly of claim 15, wherein said outer diameter of said at least one first knife blade overlaps with said outer diameter of said at least one second knife blade.

17. The differential speed stalk roll assembly of claim 12, wherein said at least one first knife blade has an outer diameter greater than said first stalk roll body diameter and said at least one second knife blade has an outer diameter greater than said second stalk roll body diameter.

18. The differential speed stalk roll assembly of claim 17, wherein said outer diameter of said at least one first knife blade overlaps with said outer diameter of said at least one second knife blade.

19. The differential speed stalk roll assembly of claim 12, wherein each of said first and second stalk roll bodies includes a plurality of slots, each of said plurality of slots of said first stalk roll body adapted to receive one of said at least one first knife blades and each of said plurality of slots of said second stalk roll body adapted to receive one of said at least one second knife blades.

20. The differential speed stalk roll assembly of claim 19, wherein a longitudinal spacing between said at least one first knife blade and said at least one second knife blade is selectively adjustable.

21. The differential speed stalk roll assembly of claim 1, wherein each of said first and second modular plate segments has a thickness of about 3/16 inches.

22. The differential speed stalk roll assembly of claim 21, wherein an outer end of each of said first and second plurality of flutes has a thickness of about 3/16 inches.

23. The differential speed stalk roll assembly of claim 6, wherein a profile of said longitudinally spaced teeth is rectangular.

24. The differential speed stalk roll assembly of claim 23, wherein said teeth have a thickness of about 3/16 inches.

* * * * *